(12) United States Patent
Dhillon et al.

(10) Patent No.: US 8,762,197 B2
(45) Date of Patent: Jun. 24, 2014

(54) SOCIAL ENABLEMENT OF MOBILE CASUAL GAMES ENABLING MOBILE USERS TO CONNECT WITHIN AND OUTSIDE GAMES WITH OTHER MOBILE USERS, BRANDS, GAME DEVELOPERS, AND OTHERS ONLINE, ON MOBILE DEVICES, AND IN SOCIAL NETWORKS

(75) Inventors: Jasjit S. Dhillon, Santa Barbara, CA (US); Jason Adam Seldon, Los Angeles, CA (US); Bhatt Lakshmi Vadlamani, Pasadena, CA (US)

(73) Assignee: P4RC, Inc., Culver City, CA (US)

( * ) Notice: Subject to any disclaimer, the term of this patent is extended or adjusted under 35 U.S.C. 154(b) by 0 days.

(21) Appl. No.: 13/424,721

(22) Filed: Mar. 20, 2012

(65) Prior Publication Data

US 2012/0244948 A1   Sep. 27, 2012

Related U.S. Application Data

(60) Provisional application No. 61/454,608, filed on Mar. 21, 2011.

(51) Int. Cl.
| | |
|---|---|
| *G06Q 30/00* | (2012.01) |
| *G07F 17/32* | (2006.01) |
| *A63F 13/12* | (2006.01) |
| *G06Q 30/02* | (2012.01) |

(52) U.S. Cl.
CPC ........ *G06Q 30/0209* (2013.01); *G06Q 30/0201* (2013.01); *G07F 17/3244* (2013.01); *A63F 2300/407* (2013.01)
USPC ...................................... 705/14.12; 705/14.1

(58) Field of Classification Search
USPC ....................................................... 705/14.12
See application file for complete search history.

(56) References Cited

U.S. PATENT DOCUMENTS

| | | | |
|---|---|---|---|
| 5,871,398 A * | 2/1999 | Schneier et al. | 463/16 |
| 2002/0039923 A1 * | 4/2002 | Cannon et al. | 463/42 |
| 2002/0128916 A1 * | 9/2002 | Beinecke, III | 705/26 |
| 2006/0085261 A1 * | 4/2006 | Chu | 705/14 |
| 2010/0228617 A1 * | 9/2010 | Ransom et al. | 705/14.25 |

* cited by examiner

*Primary Examiner* — John G Weiss
*Assistant Examiner* — Scott C Anderson
(74) *Attorney, Agent, or Firm* — White-Welker & Welker, LLC; Matthew T. Welker, Esq.

(57) ABSTRACT

A gamer engagement platform within games and social networks to engage gamers in novel ways during the game play and during interstitial periods between game level transitions to promote loyalty to games while exposing them gracefully the rewards and advertisements of brands and location based service providers with whom they are likely to have high affinity on just-in-time and just-in-location basis, whether the games are being played online or offline. Gamer can invite friends in platform and social networks for social game challenge across heterogeneous games. Brands, location based service providers, and game developers can conduct and track campaigns using the optimized points conversion engine and offer recommendation engine of the platform. Software code embedded in the games conducts campaigns during game play and interstitial times during game level transitions to convert game points earned into platform points that can be exchanged by gamer to redeem rewards in-game or later.

20 Claims, 50 Drawing Sheets

Points Conversion Engine (PCE)
*Illustration for Game X with Points*

Game X

Game developer 1 inputs that their average player earns an average of 10,000 points during 10 minutes of gameplay of "Game X". So G/T = 10,000/10 = 1,000 "Game X" Points per P4RC point. This exchange rate is applied to all points earned by all gamers playing "Game X".

- Player 1 spends 5 minutes playing "Game X" and earns 2,500 "Game X" points. This converts into 2.5 P4RC points.

- Player 2 spends 10 minutes playing "Game X" and earns 15,000 "Game X" points. This converts into 15 P4RC points.

- Player 3 spends 15 minutes playing "Game X" and earns 15,000 "Game X" points. This also converts into 15 P4RC points despite the fact that it took Player 3 fifteen minutes vs. only 10 minutes for Player 2 to earn the same number of points.

Fig. 2(a)

Points Conversion Engine (PCE)
*Illustration for Game Y with Points*

Game Y with Points

Developer 2 inputs that their average player earns an average of 1 million points during 10 minutes of gameplay of "Game Y". So G/T = 1,000,000/10 = 100,000 "Game Y" Points per P4RC point. This exchange rate is applied to all points earned by all gamers playing "Game Y".

- Player A spends 5 minutes playing "Game Y" and earns 250,000 "Game Y" points. This converts into 2.5 P4RC points.
- Player B spends 10 minutes playing "Game Y" and earns 1,500,000 "Game Y" points. This converts into 15 P4RC points.
- Player C spends 15 minutes playing "Game Y" and earns 1,500,000 "Game Y" points. This also converts into 15 P4RC points.

Fig. 2(b)

Points Conversion Engine (PCE)
*Illustration for Game Z without Points*

| Achievement or Level | Frequency in 1 Minute of Game Play | Skill Weight (100% apportioned across levels) | Value of Achievement Level in P4RC points | P4RC Points Assigned at each level |
|---|---|---|---|---|
| Column (1) | Column (2) | Column (3) | Column (4) = Column (3) / Column (2) | Column (5) = X* Column (2) * Column (4) |
| 1 | 15 | 10% | 0.0067 | 0.1 X |
| 2 | 10 | 15% | 0.015 | 0.15 X |
| 3 | 8 | 20% | 0.025 | 0.2 X |
| 4 | 1 | 25% | 0.25 | 0.25 X |
| 5 | 0.5 | 30% | 0.6 | 0.3 X |
| TOTAL | 34.5 | 100% | | X |

Fig. 2(c)

Social Engagement Platform

Social Game Challenge Types

Social Game Challenge Types

| Number | Social Game Challenge Type | Different Games | Switching Games Allowed? | Bet Type | Number of Players | Number of Rounds | Visibility | Allow Observers? | Winning Criteria | Winner Gets |
|---|---|---|---|---|---|---|---|---|---|---|
| 1 | Private Snap Duel -- Same Game | No | Yes/No | Limited/Add-in | 2 | 1 | Private | Yes/No | Highest SEP Points | SEP Pool of SEP Points |
| 2 | Public Snap Duel -- Same Game | No | Yes/No | Limited/Add-in | 2 | 1 | Public | Yes/No | Highest SEP Points | SEP Pool of SEP Points |
| 3 | Private Snap Duel -- Any Game in a Genre | Yes | Yes/No | Limited/Add-in | 2 | 1 | Private | Yes/No | Highest SEP Points | SEP Pool of SEP Points |
| 4 | Public Snap Duel -- Any Game in a Genre | Yes | Yes/No | Limited/Add-in | 2 | 1 | Public | Yes/No | Highest SEP Points | SEP Pool of SEP Points |
| 5 | Private Snap Duel -- Games of Different Genres | Yes | Yes/No | Limited/Add-in | 2 | 1 | Private | Yes/No | Highest SEP Points | SEP Pool of SEP Points |
| 6 | Public Snap Duel -- Games of Different Genres | Yes | Yes/No | Limited/Add-in | 2 | 1 | Public | Yes/No | Highest SEP Points | SEP Pool of SEP Points |
| 7 | Private Duel -- Same Game | No | Yes/No | Limited/Add-in | 2 | N | Private | Yes/No | Highest SEP Points | SEP Pool of SEP Points |
| 8 | Public Duel -- Same Game | No | Yes/No | Limited/Add-in | 2 | N | Public | Yes/No | Highest SEP Points | SEP Pool of SEP Points |
| 9 | Private Duel -- Any Game in a Genre | Yes | Yes/No | Limited/Add-in | 2 | N | Private | Yes/No | Highest SEP Points | SEP Pool of SEP Points |
| 10 | Public Duel -- Any Game in a Genre | Yes | Yes/No | Limited/Add-in | 2 | N | Public | Yes/No | Highest SEP Points | SEP Pool of SEP Points |
| 11 | Private Duel -- Games of Different Genres | Yes | Yes/No | Limited/Add-in | 2 | N | Private | Yes/No | Highest SEP Points | SEP Pool of SEP Points |
| 12 | Public Duel -- Games of Different Genres | Yes | Yes/No | Limited/Add-in | 2 | N | Public | Yes/No | Highest SEP Points | SEP Pool of SEP Points |
| 13 | Private Knockout -- Same Game | No | Yes/No | Limited/Add-in | N | 1 | Private | Yes/No | Highest SEP Points | SEP Pool of SEP Points |
| 14 | Public Knockout -- Same Game | No | Yes/No | Limited/Add-in | N | 1 | Public | Yes/No | Highest SEP Points | SEP Pool of SEP Points |
| 15 | Private Knockout -- Any Game in a Genre | Yes | Yes/No | Limited/Add-in | N | 1 | Private | Yes/No | Highest SEP Points | SEP Pool of SEP Points |
| 16 | Public Knockout -- Any Game in a Genre | Yes | Yes/No | Limited/Add-in | N | 1 | Public | Yes/No | Highest SEP Points | SEP Pool of SEP Points |
| 17 | Private Knockout -- Games of Different Genres | Yes | Yes/No | Limited/Add-in | N | 1 | Private | Yes/No | Highest SEP Points | SEP Pool of SEP Points |
| 18 | Public Knockout -- Games of Different Genres | Yes | Yes/No | Limited/Add-in | N | 1 | Public | Yes/No | Highest SEP Points | SEP Pool of SEP Points |
| 19 | Private Tournament -- Same Game | No | Yes/No | Limited/Add-in | N | N | Private | Yes/No | Highest SEP Points | SEP Pool of SEP Points |
| 20 | Public Tournament -- Same Game | No | Yes/No | Limited/Add-in | N | N | Public | Yes/No | Highest SEP Points | SEP Pool of SEP Points |
| 21 | Private Tournament -- Any Game in a Genre | Yes | Yes/No | Limited/Add-in | N | N | Private | Yes/No | Highest SEP Points | SEP Pool of SEP Points |
| 22 | Public Tournament -- Any Game in a Genre | Yes | Yes/No | Limited/Add-in | N | N | Public | Yes/No | Highest SEP Points | SEP Pool of SEP Points |
| 23 | Private Tournament -- Games of Different Genres | Yes | Yes/No | Limited/Add-in | N | N | Private | Yes/No | Highest SEP Points | SEP Pool of SEP Points |
| 24 | Public Tournament -- Games of Different Genres | Yes | Yes/No | Limited/Add-in | N | N | Public | Yes/No | Highest SEP Points | SEP Pool of SEP Points |

Fig. 47

SOCIAL ENABLEMENT OF MOBILE CASUAL GAMES ENABLING MOBILE USERS TO CONNECT WITHIN AND OUTSIDE GAMES WITH OTHER MOBILE USERS, BRANDS, GAME DEVELOPERS, AND OTHERS ONLINE, ON MOBILE DEVICES, AND IN SOCIAL NETWORKS

CROSS REFERENCE TO RELATED APPLICATIONS

This application claims priority from U.S. Provisional Patent Application Ser. No. 61/454,608, entitled "Method for connecting casual gamers and brands within and outside games to enable optimal distribution of rewards and coupons online, on mobile devices, and social networks", filed on 21 Mar. 2011. The aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to social networking of gamers who play casual games on their mobile phones, social networking sites, and other computer devices that provide Internet connectivity for playing games. More specifically, the present invention relates to a social engagement platform for the casual gaming market that connects consumer brands, location based service providers, and game developers to casual gamers via a new kind of loyalty rewards and promotions network.

BACKGROUND OF THE INVENTION

There are several trends that support value of the invention described.

First, the number of people who use mobile phones and tablets that allow playing of casual games is increasing at a rapid pace globally. Mobile application downloads are projected to grow at a compound annual growth rate of approximately 41% globally over the next five years with games representing approximately 75% of downloads. The estimated number of gamers who play casual games at least once a day is increasing rapidly towards hundred million in US alone by 2014.

Second, gamers who play casual games currently spend time with skill and effort in earning points but all those points expire when they exit from the game. The present invention enables casual gamers to gain monetary benefits from the points they earned from casual games, which are currently worthless.

Third, we are witnessing a trend of 'gamification' of life. Gamification refers to an engagement technique that is based on the successful mechanics used to makes game popular to be applied to day-to-day chores such as shopping, completing surveys, or reading web site (Wikipedia). Despite the early successes in the gamification techniques to promote advertising and marketing, the power of gamification has not been applied to promote the social engagement of the casual game playing experience itself, which has been predominantly focused on single casual game playing experience. This invention fills that gap by developing novel social engagement techniques that allow a gamer to compete with his/her friends who play different casual games to increase the playing time of casual games, increase loyalty to the game, and promote behavior that supports the exchange of game points into the redemption of rewards and promotions by brands and location based service providers (LBS).

Fourth, the games that are being downloaded are increasingly free games and game developers are looking for ways of monetizing the games. This trend towards high quality, free to-play games is quite compelling. Typical monetization opportunities for game developers include pop-up advertising banners while playing a game, which tend to intrude into the game experience itself. The present invention enables gamers to have uninterrupted game experience while providing innovative avenues for game developers such as using the interstitial screens between the levels of a game play to promote social engagement that can result in realizing additional revenue, several orders more than the current monetization opportunities.

Fifth, the popularity of social networking based online coupons is increasing and the present invention extends those practices with a specific focus on making offer redemptions more social.

Sixth, gamers have psychological barriers in viewing advertising banners during the action of playing a game. This negative attitude has made the utilization of coupons very low, discouraging brands to depend on coupons to generate additional revenue in action settings such as playing casual games, despite the increase in the number of people with desirable demographics who are playing those casual games. The present invention provides a novel approach for gamers to develop positive attitude towards the coupons by engaging them in the behavior of collecting coupons that they value, as they were acquired by using their hard earned in-game points and achievements.

Seventh, the typical demographic profile of casual gamer is a female in the age range of 35 to 45. This group also has the predisposition where the availability of coupon favorably influences them in their purchase decisions. However, a gamer has to leave the game playing session to explore coupon sites to locate coupons that are useful for their intended purchases. The present invention provides an easy experience to active coupon seekers to keep collecting relevant coupons with minimal interruptions to their casual game playing experience. In addition, the present invention draws in passive coupon seekers to acquire the habit of collecting coupons that might help them monetarily in their purchases, thereby deliver a channel of net new valuable consumers to brands for distributing their coupons.

Moreover, consumers are increasingly spending more time in games and virtual environments. The present invention provides a friendly linkage of the achievements in the virtual world to the monetary benefits in the real world, thereby making their virtual experience more rewarding and reinforces the behavior of spending more time in virtual world. Moreover, consumers are increasingly using GPS enabled mobile phones. The present invention enables brands and LBS to deliver time, context, and location aware offerings to the gamers. In doing so, the present invention also benefits brands and LBS to increase the likelihood of revenues from the offers they distribute.

SUMMARY OF THE INVENTION

The present invention is a novel and non-obvious social engagement platform for casual gamers (called 'SEP') that enables a casual gamer to connect with friends in SEP and other social networks, game developers, consumer brands, and LBS via a new kind of loyalty rewards and promotions network using three intelligent engines—Social Game Challenge (SGC) Engine, points conversion engine (PCE) and offers Recommendation Engine (ORE). The present invention works across all gaming platforms (including but not limited to IOS, ANDROID, and FACEBOOK) and enables game developers to enhance the loyalty of gamers to their often free casual games through social engagement generated by SGC that often will result in increased duration of game play, additional downloads, and increased traditional advertising revenue such as banner advertisements due to increased downloads and play duration.

More importantly, this invention creates entirely new streams of revenue from the interstitial screens between the levels of a casual game playing session through rewards and promotions recommended by ORE and sponsored Social Game Challenges (SGC). SGC is an innovative way for a casual gamer to enable the creation of an amalgamated one-time social game where his/her friends in SEP and other social networks can combine heterogeneous free or premium casual games that are connected to SEP to compete simultaneously for a standard duration where each contestant of SGC will play his/her favorite casual game that is connected to SEP. Each participant of SGC will stake certain number of SEP points to enter SGC and the winner of SGC will win the pool of SEP points and make use of those points to productive use such as redemption of rewards and promotions or donate them for social causes.

PCE is a proprietary algorithm for converting a wide range of points-based and non-points-based achievement levels in casual games into standardized points called SEP in the platform. PCE normalizes points earned from a casual game by accounting for variations in different casual games for the number of game levels, points achieved, outcomes achieved, time spent, skill levels, resources bought to augment game achievement, and the potential of the game to connect with the brands, Location Base Service (LBS) providers, and friends in SEP and other social networks who can participate actively in the platform. Gamers now can exchange points earned for gameplay on any game from any participating game developer, for standardized SEP points.

The invention describes a unique method called Social Game Challenge (SGC) to enable casual gamers to creatively extend casual game playing experience into more fulfilling social engagement experience. Social Game Challenges can be several types as described in FIG. 47, where a participant can bet SEP points and win the pool of SEP points when he or she wins the SGC. In SGC, each participant can choose his or her favorite casual game to compete with. The invention uses PCE to normalize the game achievements of SGC participants into common SEP points so that leaderboards and an eventual winner can be determined for SGC even when participants play a wide range of causal games connected to SEP to compete.

SEP points earned by either playing casual games or winning SGC can then be exchanged for offers and rewards from sponsoring brands and LBS that can result in real world savings during shopping or downloading premium games. The invention describes an Offer Recommendations Engine (ORE) method that maximizes the monetary value to all the participants in SEP using a proprietary learning algorithm for identifying and constantly refining in real-time the offer recommendations to help brands, LBS, and creators of SGC to make informed choices for distributing their rewards and promotions across SEP.

To summarize, gamers will then continue to earn SEP points as they play casual games or participate in SGC to increase their SEP points, and redeem them to get rewards and promotions from brands and LBS that provide monetary benefits to gamers as they shop online or in stores.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 2(a) and 2(b) provide an illustration of the points allocation algorithm in PCE for two games;

FIG. 2(c) describes the algorithm for converting achievements in non-points based games to SEP points in PCE;

FIG. 12 shows the 'SEP Main Menu' page of SEP (Page 100) listing the SEP Main Modules;

FIG. 13 shows 'SEP Admin Console Menu' page of SEP (Page 101) listing the SEP Admin Console Modules;

FIG. 14 shows 'Profile Manager Menu' page of SEP (Page 102) listing the SEP Profile Manager Modules;

FIG. 15 shows 'SEP Campaign Designer Menu' page of SEP (Page 103) listing the SEP Campaign Designer Modules;

FIG. 16 shows 'SEP Campaign Execution Manager Menu' page of SEP (Page 104) listing the SEP Campaign Execution Modules;

FIG. 17 shows 'Analytics & Reporting Menu' page of SEP (Page 105) listing an illustration of available 'Operational Reports' and 'Model Optimization' reports;

FIG. 18 shows 'User Profile Manager' module of SEP (Page 106) illustrating the typical information elements required for the SEP User Profile Manager Module to configure user profile with appropriate roles and privileges in SEP;

FIG. 19 shows 'Gamer Profile Manager' module of SEP (Page 107) illustrating the typical information elements required for the SEP Gamer Profile Manager Module to configure gamer profile with appropriate roles and privileges in SEP;

FIG. 20 shows 'Game Profile Manager' module of SEP (Page 108(a)) illustrating the typical information elements required for the SEP Game Profile Manager Module to configure a game in SEP;

FIG. 21 shows 'Game Profile Manager' module of SEP (Page 108(b)) illustrating the typical information elements required for the SEP Game Profile Manager Module to configure a game in SEP;

FIG. 22 shows 'Brand Profile Manager' module of SEP (Page 109) illustrating the typical information elements required for the SEP Brand Profile Manager Module to configure a brand in SEP;

FIG. 23 shows 'LBS Affiliate Profile Manager' module of SEP (Page 110) illustrating the typical information elements required for the SEP LBS Affiliated Profile Manager Module to configure an LBS Affiliate in SEP;

FIG. 24 shows 'Brand Campaign Designer' module of SEP (Page 111) illustrating the typical information elements required for the SEP Brand Campaign Designer Module to configure a marketing or advertising campaign within SEP by a brand;

FIG. 25 shows 'Game Developer Campaign Designer' module of SEP (Page 112) illustrating the typical information elements required for the SEP Game Developer Campaign Designer Module to configure a marketing or advertising campaign within SEP by a game developer;

FIG. 26 shows 'LBS Affiliate Campaign Designer' module of SEP (Page 113) illustrating the typical information elements required for the SEP LBS Affiliate Campaign Designer Module to configure a marketing or advertising campaign within SEP by an LBS Affiliate;

FIG. 27 shows 'SGC Designer' module of SEP (Page 114) illustrating the typical information elements required for the SEP SGC Designer Module to configure a Social Game Challenge (SGC) event within SEP by any gamer;

FIG. 28 shows 'Campaign Tracker' module of SEP (Page 115) illustrating the typical information elements required for the SEP Campaign Tracker Module to track the execution metrics and performance of any campaign in SEP;

FIG. 29 shows 'PCE Model Manager' module of SEP (Page 116) illustrating the typical PCE Model Management tasks and setting up global parameters that propagate to all PCE models in real-time when altered in this page;

FIG. 30 shows 'SGC Tracker' module of SEP (Page 117) that allows an SEP administrator, sponsoring brand, sponsoring LBS Affiliate, or gamer to review the progress of ongoing social game challenges they are either participating or following;

FIG. 31 shows 'ORE Model Manager' module of SEP (Page 118) illustrating the typical ORE Model Management tasks and setting up global parameters that propagate to all ORE models in real-time when altered in this page;

FIG. 32 shows 'SEP Network Performance Optimizer' module of SEP (Page 119) illustrating the typical SEP Network Management tasks and setting up global optimization parameters that propagate to all SEP clients in computer or smart phones or personal digital assistants in asynchronous modes when the parameters are altered in this page;

FIG. 33 shows 'PCE Model Optimizer' module of SEP (Page 120) that allows SEP researchers to select and modify a PCE model by adding, including, and removing additional factors when market conditions change. This module also allows a model to override the global PCE parameters to further optimize a PCE model to the business context of the game points and achievements conversion;

FIG. 34 shows 'PCE circuit breaker' module of SEP (Page 121) illustrating the typical PCE circuit breaker policies that can be applied to tune PCE to prevent fraud;

FIG. 35 shows 'ORE Model Optimizer' module of SEP (Page 122) that allows SEP researchers to select and modify an ORE model by adding, including, and removing additional factors when market conditions change. This module also allows a model to override the global ORE parameters to further optimize a ORE model to the business context of the offers in SEP;

FIG. 36 shows 'ORE circuit breaker' module of SEP (Page 123) illustrating the typical ORE circuit breaker policies that can be applied to tune ORE to prevent fraud;

FIG. 37 shows 'Software Development Kit (SDK) for Game Developer' of SEP (Page 200(a)) illustrating the typical application program interfaces and the software library provided in this invention to the game developers to configure how each of their games and their gamers behave within SEP;

FIG. 38 shows 'Software Development Kit (SDK) for Game Developer' of SEP (Page 200(b)) for an illustrative implementation of this SDK by a game developer in a game;

FIG. 39 shows 'Home Page for Gamer' of SEP (Page 300) that allows a gamer to log into SEP and access the modules of SEP such as accounts, games, and offers;

FIG. 40 shows 'Review Social Account' module of SEP (Page 301) that allows a gamer to review the net SEP points balance, SEP earned in the period, and the use of these SEP points in this period towards offers redemption or game downloads;

FIG. 41 shows 'Browse Rewards' module of SEP (Page 302) that allows a gamer to review the rewards in the SEP for the SEP points available, and choose a reward for redemption;

FIG. 42 shows 'Browse Games' module of SEP (Page 303) that allows a gamer to review the games in the SEP and choose a game for download;

FIG. 43 shows 'Browse Social Challenges' module of SEP (Page 304) that allows a gamer to review the social challenges in the SEP that he or she participates in or observes;

FIG. 44 shows 'Redeem Rewards' module of SEP (Page 305) that allows a gamer to redeem a selected reward or promotion in exchange for SEP points; The module also shows the embodiment of this step in terms of printing or showing online or on the mobile device the reward that can be claimed by buy at the point of sale in an online or traditional store using short form of bar code for the reward;

FIG. 45 shows 'Download Games' module of SEP (Page 306) that allows a gamer to download a selected game in the SEP in exchange for the SEP points or for a payment;

FIG. 46 shows 'Track Social Challenges' module of SEP (Page 117) that allows a gamer to review the progress of ongoing social game challenges in which he or she is either participating or following; and FIG. 47 shows some illustrative Social Game Challenge types that can be implemented for method step 47 of the invention and can potentially be extended similar social game challenge situations.

DETAILED DESCRIPTION OF THE INVENTION

Figure 1:
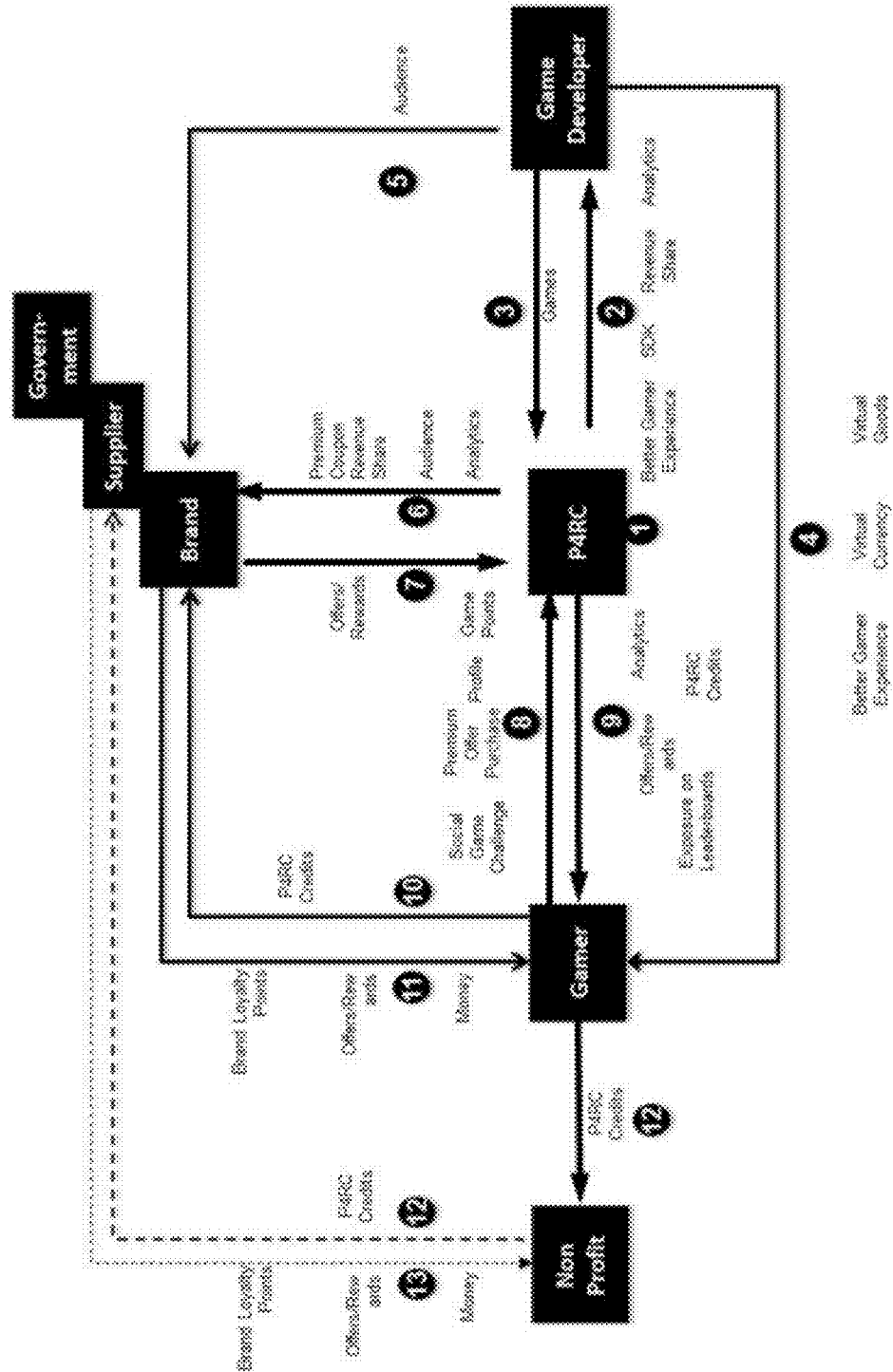
FIG. 1 provides an overview of the ecosystem for social engagement and monetization of casual games using steps 1 through 13.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The present invention is a method for connecting gamers, game developers, brands, and location based service providers (LBS) using the social engagement platform (SEP) described in FIGS. 11 through 46.

FIGS. 1, 2, 3, and 4 provide an overview of the present invention before detailing the steps of the present invention. The present invention enables game developer to provide social engagement tools such as converting perishable game points into useful real world rewards using PCE and Social Game Challenge (SGC) to casual gamers to increase game loyalty, game playing time, and share the SEP platform experience to their friends online and in social networks. As gamers look for exchanging their hard earned SEP points into rewards and promotions from brand and LBS, this invention opens up a new fertile marketing and advertising ecosystem in existing and emerging consumer channels for brands, LBS, and game developers to offer highly targeted rewards and promotions to gamers in SEP as described below in FIG. 1. The range of offers covered by the present invention of exchanging game points and achievements for rewards and promotions include but not limited to redemption of rewards, redemption of coupons, redemption of promotions, upgrades of coupons into premium offers by paying points and/or cash, direct rewards to members, sweepstakes for members, game downloads, access to celebrities to engage in SGC, and prizes for winning tournaments and contests as described in FIG. 47.

The present invention as shown in FIG. 1 through FIG. 4 creates the social engagement and rewards ecosystem for casual gamers, which is a new social engagement and monetization platform for the casual gaming market that connects consumer brands and LBS to casual gamers via a new kind of loyalty rewards and promotions network. Key players in this ecosystem include game developers, brands, LBS, and gamers. In addition, it is envisioned that several digital media entities, social media entities, non-profit entities, and government participating in this ecosystem to benefit from this newly emerging digital advertising space in mobile and social casual game industry. The present invention is captured using a plurality of steps of interactions shown above among the participants of the platform based ecosystem. Each of the steps that are participant facing are summarized in FIG. 38 through FIG. 46 below.

The present invention provides game developers with a new monetization platform that offers up to a 4 times increase in average revenue per user vs. current monetization models. Since the present invention uses different in-game "real estate" between level transitions than traditional advertising banners and pop-ups that intrusively show up during the actual game play, developers can add SEP enabled rewards and promotions in the interstitial game transition duration to their existing portfolio of monetization methods to maximize their return on investment. Alternatively, developers that desire a less intrusive monetization platform can elect to replace their existing methods of monetization with the SEP enabled monetization, which closely integrates with, and actually enhances, the gaming experience by reinforcing game achievements and tying them to real-world rewards and offers.

The SEP marketplace shown in FIG. 1 can be accessed via web page links found in games, via the mobile application, or via a website. Within the marketplace, gamers can search for brands and games or game developers by category, geography (i.e. location based promotions) and/or keyword. They can also choose to follow the brands, games, and game developers they care about via an "activity stream." The marketplace also features a robust recommendation engine that recommends certain offers, brands and games based on the user's preferences, past activity, and available points in the user's points Bank. Once an offer is selected, gamers can chose to transact within the marketplace by spending their available points on Standard offers as well as upgrading to Premium offers by charging upgrade fees to a credit card. Brands can also message directly to desirable target consumer via display advertising units available in the marketplace.

All Standard offers within the marketplace will be priced initially at the same number of points (e.g. 1,000 points per Standard Offer). For Premium offers, brands can set their own cash upgrade price, which will vary depending on the nature of the offer. The marketplace provides a rich environment for both brands, LBS Affiliates, and game developers to acquire new customers. Both brands and game developers can pay a premium for featured placement within the marketplace. Such premium listings will also allow the ability for brands to discount the number of points for certain Standard offers as a promotional tool to increase number of coupons they get into the hands of their consumers. Similarly, these premium listings will also allow game developers to offer bonus points for game play on certain games as a promotional tool to drive more users to their games and increase the time spent playing their games.

All user activity within the marketplace can automatically integrate with FACEBOOK and other social networks sites to allow for viral propagation of events of social interest within SEP and the social networks of all the participants including gamers, gamer developers, games, brands, and LBS Affiliates.

Leaderboards allow for social recognition of game achievement. Leaderboards include the top earners of points during specified time periods (e.g. today, this week, this month, all time) as well as allow for promotion of the most active games within the leaderboards. The leaderboards also allow for contests and tournaments, which form a key component of social engagement of gamers to support the marketing strategy of the game developers, brands, and LBS Affiliates.

Figure 17:
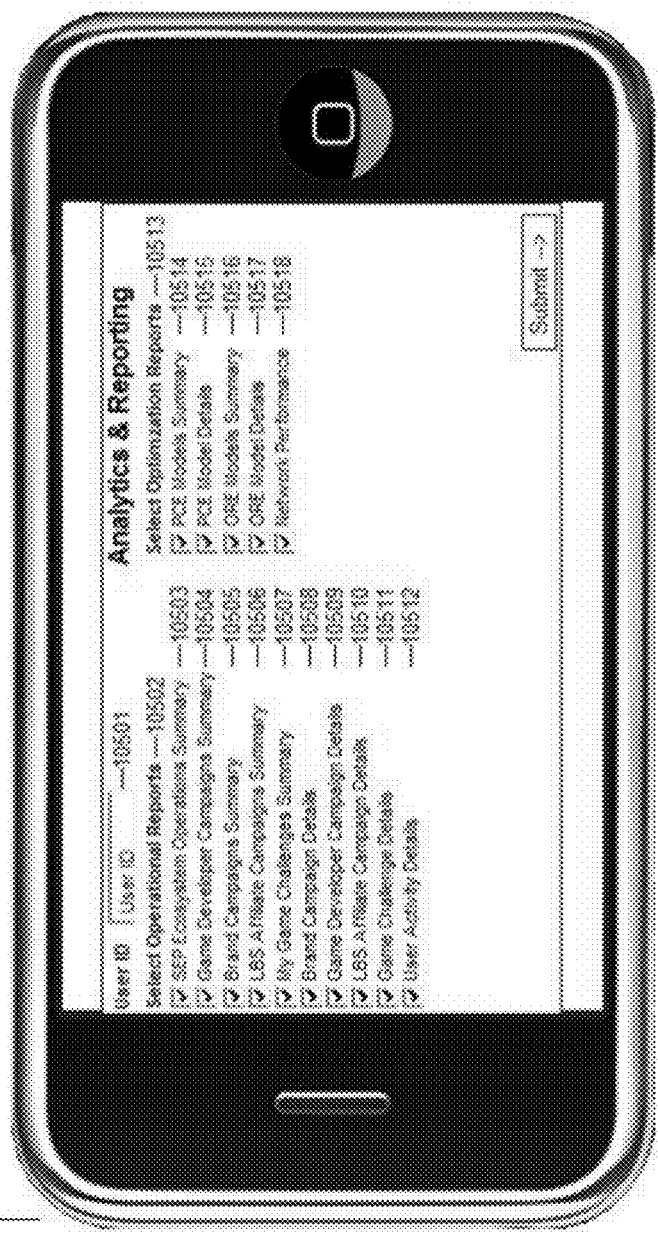

Moreover, the present invention provides rich Business Intelligence analytics to support game developer in understanding the revenue streams from relationship and tuning their game integration strategies to maximize the benefits from the ecosystem. FIG. 17 provides an illustration of typical Reporting/Analytics from SEP to provide real-time campaign performance metrics to help brands, LBS Affiliates, and game developers tune their marketing and advertising campaigns.

Each arrow in this ecosystem shown in FIG. 1 depicts an activity where one initiating participant delivers to recipient participant the goods and services shown with that arrow. Each of the thirteen steps shown FIG. 1 above is an atomic transaction between two platform participants and does not imply any serial nature in which these steps have to be executed. Instead, FIG. 1 is a schematic depiction of the set of steps required to enable rich interactions among participants to create and share value in the ecosystem.

Step 1 in FIG. 1 shows that an illustrative marketing and advertising exchange called Social Engagement Platform (SEP), which can build and foster the growth of interactions within the ecosystem using a software platform which is described using FIG. 11 through FIG. 46.

Figure 37:
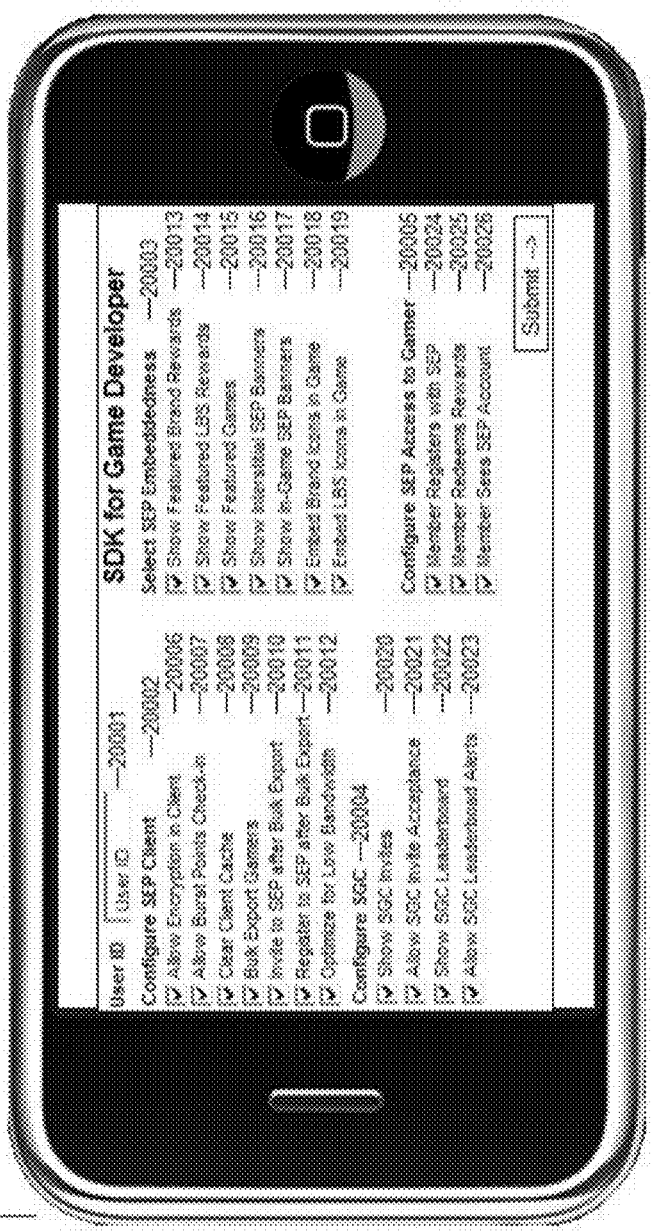
Figure 38:
Figure 39:
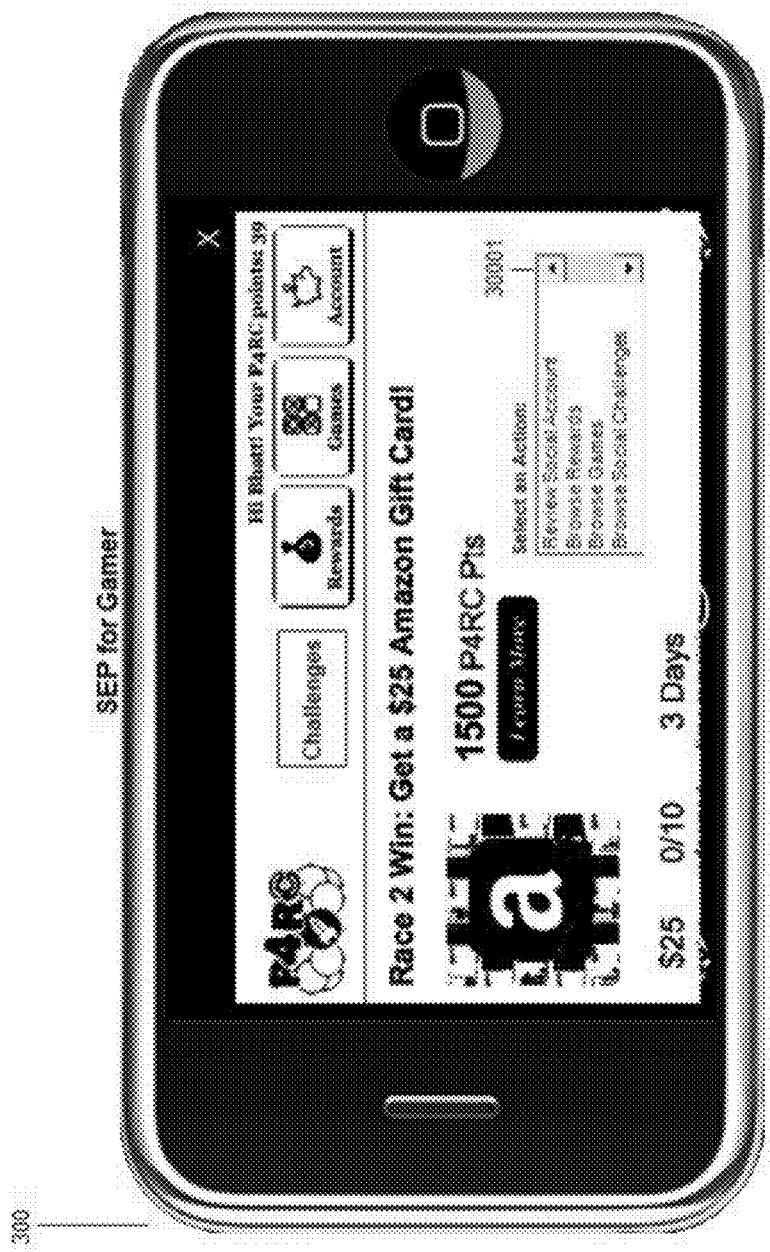

Step 2 in FIG. 1 shows that such an exchange can deliver SEP Software Development Kit (SEP SDK) to the game developer. Now referring to step two in FIG. 1 of supporting a game developer by providing a software development kit (SEP SDK) to integrate their games to participate in the platform. FIG. 37 illustrates typical features provided in SEP SDK to allow different levels and types of integration of a game into the SEP ecosystem shown in FIG. 1. FIG. 38 shows an example of how a game developer can use SEP SDK to provide access to a gamer to participate in SEP ecosystem during the interstitial duration between game transitions within a game. In addition, the present invention provides SEP SDK in multiple languages to support game developers include within their games the ability to display account information, automatically deposit game points into account, display featured promotions, and enable redemption of offers. Game developers have to adhere to the policies set by the platform from time to time in incorporating those functionalities recommended by the platform into their games using the SDK to ensure that all the games connected to SEP participate effectively in implementing SEP rewards and promotions.

Figure 20:
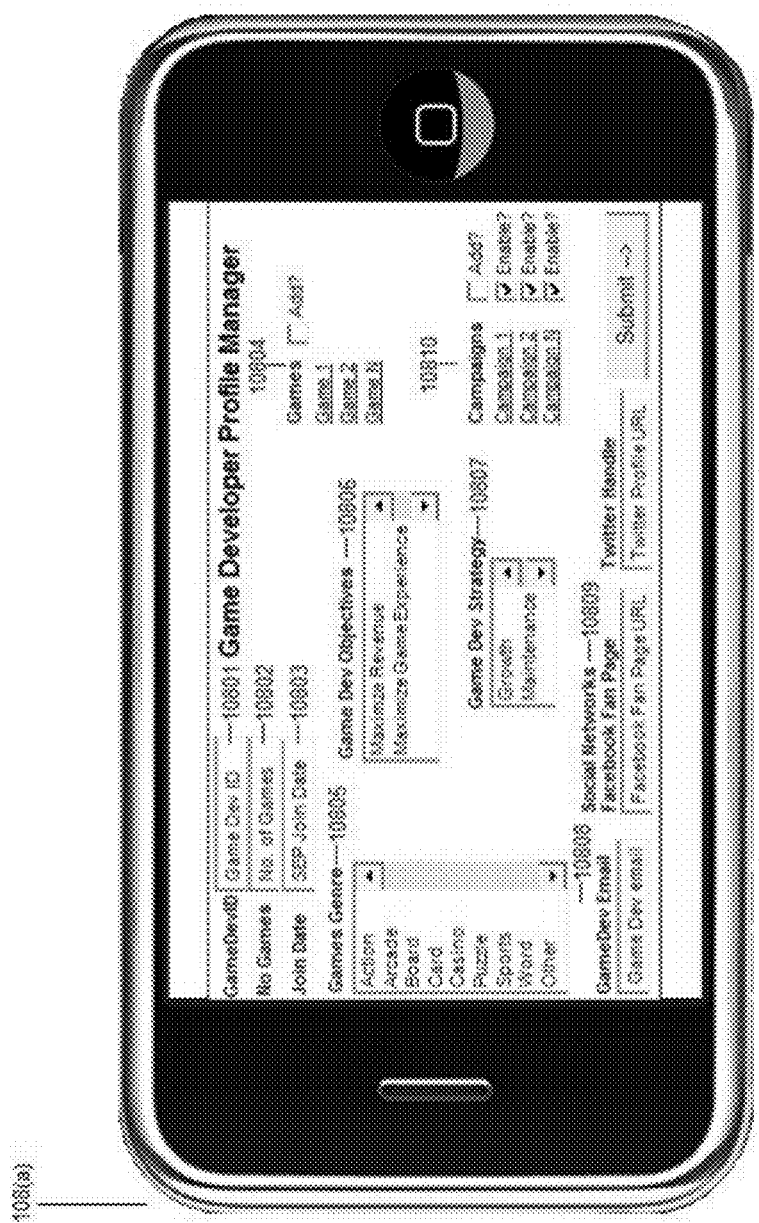
Figure 21:
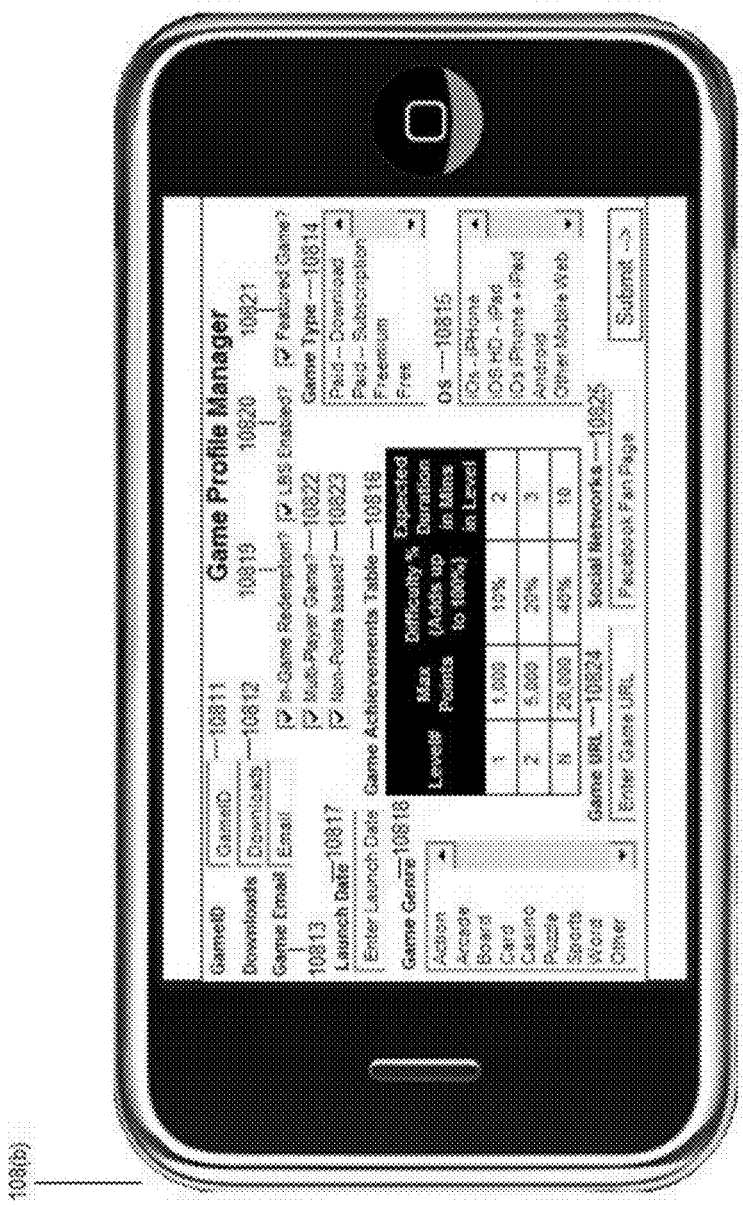

Step 3 in FIG. 1 shows that game developer will use this SEP SDK to connect their games to SEP ecosystem. In this step game developer will establish an account with the platform and registers games that will be integrated into the platform as shown in FIG. 20. After completing the game developer registration, they get a game developer ID from the site and will be prompted to register the game profile in SEP as shown in FIG. 21. SEP will then provide a Game ID to the game developer and enable the download of the latest SEP SDK. As shown in FIG. 20, game developers will then use the application program interfaces provided in the SEP SDK to enable several activities including: Let users register into the platform from the game; Invoke the start game, end game, and game transition APIs; Display user points, points for the current check in, and potential coupons user might be interested in; Integrate in game experience of browse and manage coupons; Provide a list and location of players who played the game; Provide a list of SEP points received by each gamer; Generate a List of coupons claimed by the users who played the game; Provide a mechanism for game developer to dispute the initial points conversion assigned for the game to initiate an audit; and Display Featured games.

Step 4 in FIG. 1 shows that game developers can choose several tools available in SEP SDK to create rich game experience to gamers by allowing value from their perishable game points into SEP Points or virtual goods. When the game developer releases the game using the application program interfaces in the SEP SDK, since the game was already registered with SEP, the newly released game will automatically start checking-in the game points of each gamer into SEP and keep prompting the gamer to register with SEP in case they have not already done so. Once the gamer is registered with SEP, the newly accrued SEP points can be used by gamer to benefit from the rewards and promotions available within SEP.

Step 5 in FIG. 1 shows how game developers can use SEP SDK to launch marketing and advertising campaigns for their games and provide desirable audience to the brands.

Figure 23:
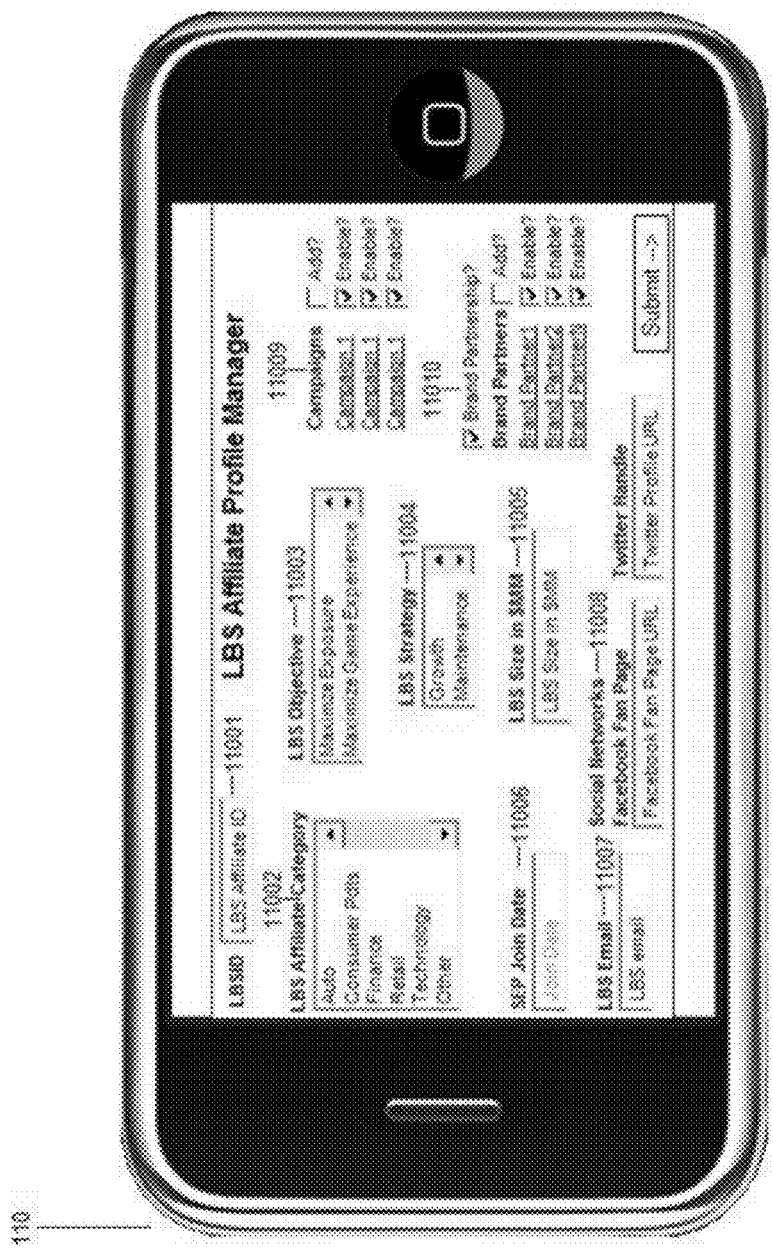
Figure 24:
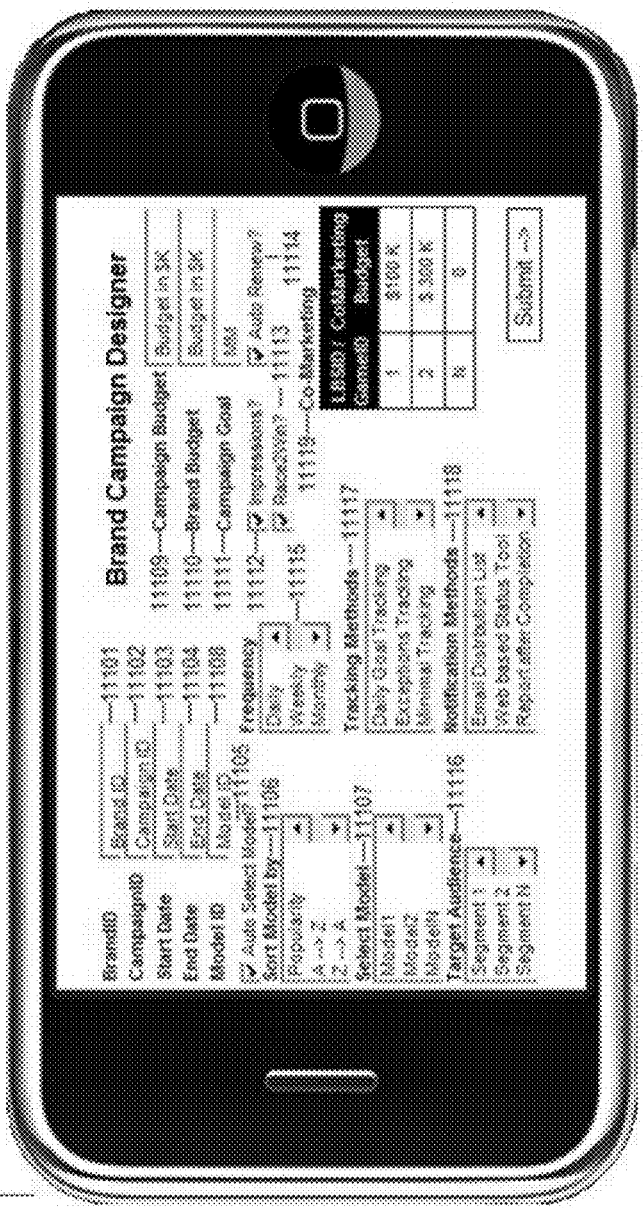
Figure 26:
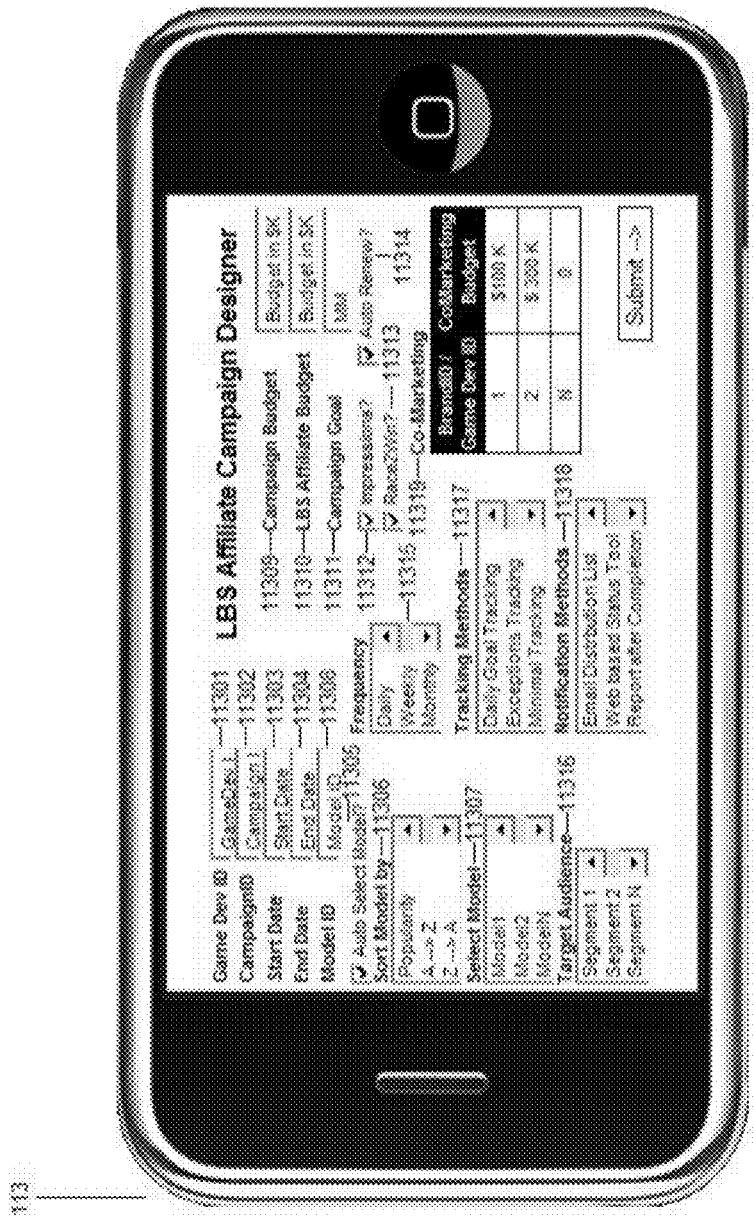
Figure 28:
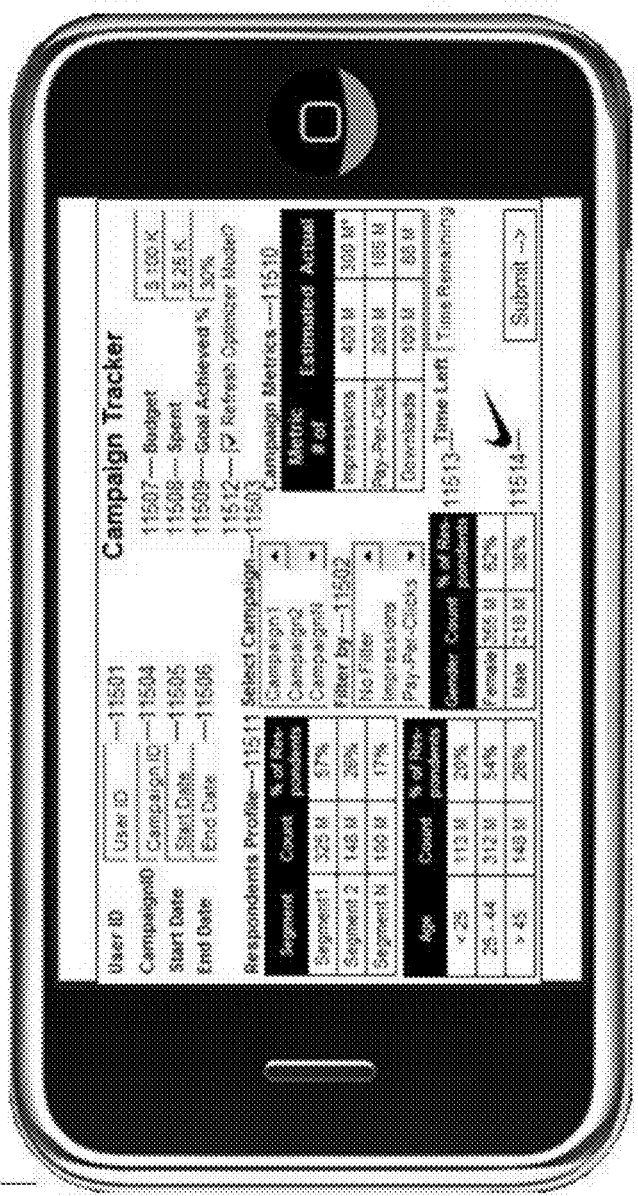

Step 6 in FIG. 1 shows how brands and LBS Affiliates can set up co-marketing campaigns with game developers using the tools of this invention: (a) Brand Profile Manager, as described in FIG. 22; (b) LBS Affiliate Profile Manager as shown in FIG. 23; (c) Brand Campaign Manger as shown in FIG. 24; (d) LBS Affiliate Manager as shown in FIG. 26; and (d) Campaign Tracker as shown in FIG. 28. These tools enable a brand or LBS Affiliate to register their rewards and promotion campaigns with SEP.

Figure 7:
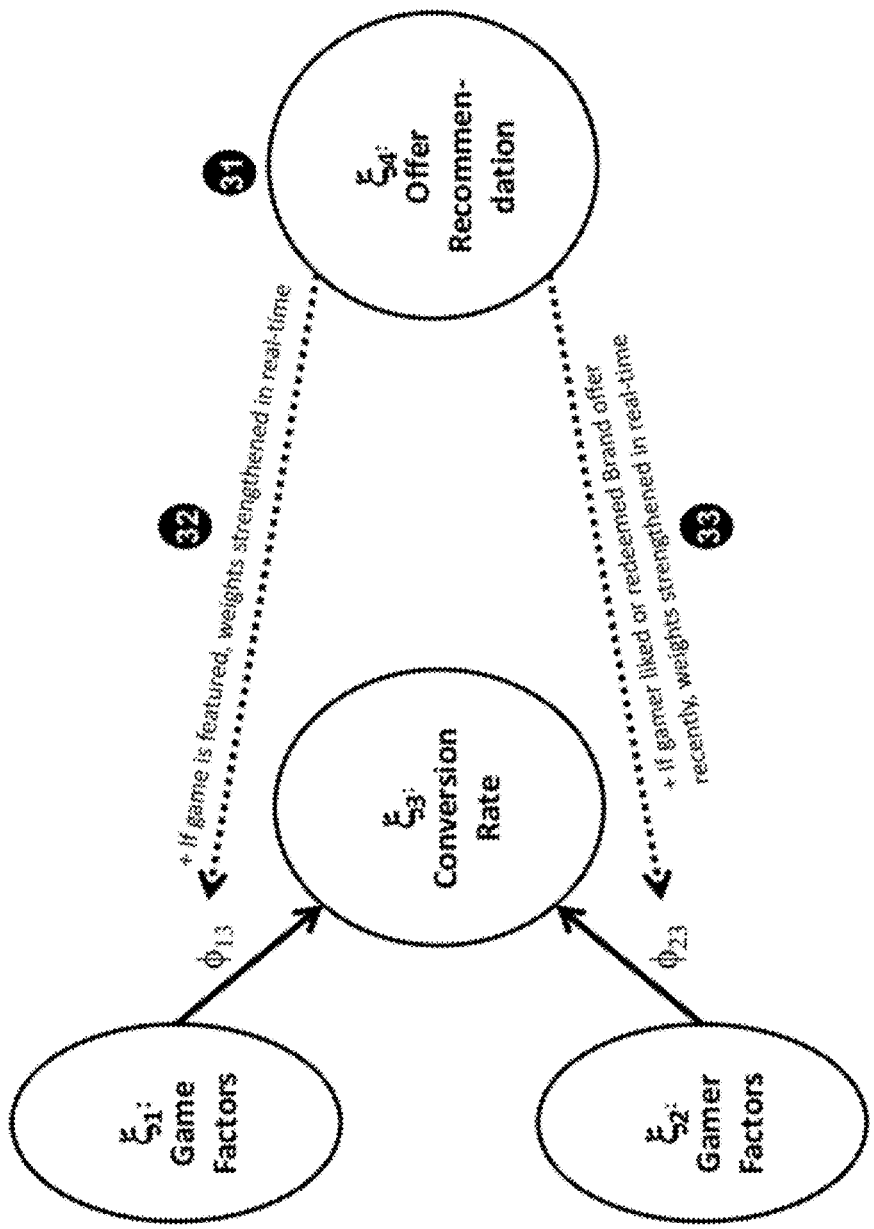
FIG. 7 shows the method step 'Learning in PCE with Feedback from Social Networking and ORE' using steps 31 through 33 how the PCE will modify its estimated factor loading coefficients in response to the feedback from social networking and ORE.

Step 7 in FIG. 7 shows that SEP, in turn, will provide tools for tracking the marketing and advertising campaigns as shown in FIG. 28 for receiving from SEP audience, campaign analytics, and revenue share from premium offers. Brands and LBS Affiliates can log into their account to review the available games, their respective gamer profiles, and make choices related to partnering with games for sponsorship or featured offers. SEP also shows the addition of new games into the ecosystem and allows brands and LBS Affiliates to socially network with other actors in the ecosystem. Brands can establish campaign performance goals, configure their featured rewards and promotions using the Campaign Tracker module as shown in FIG. 28. Campaign Tracker allows brands and LBS Affiliates to view their ongoing rewards/promotions, their performance, and most recent activity in redeeming those rewards/promotions using SEP points. The invention allows a brand or LBS Affiliate to tune the campaign midcourse based on the feedback of the Campaign Tracker by enabling re-estimation of the offer recommendation engine model attached to campaign. SEP also provides recommendations to brands on the games they can sponsor for featured rewards and promotions. FIG. 17 illustrates some analytics and operational reports provided by SEP to help brands manage their campaigns.

Figure 41:
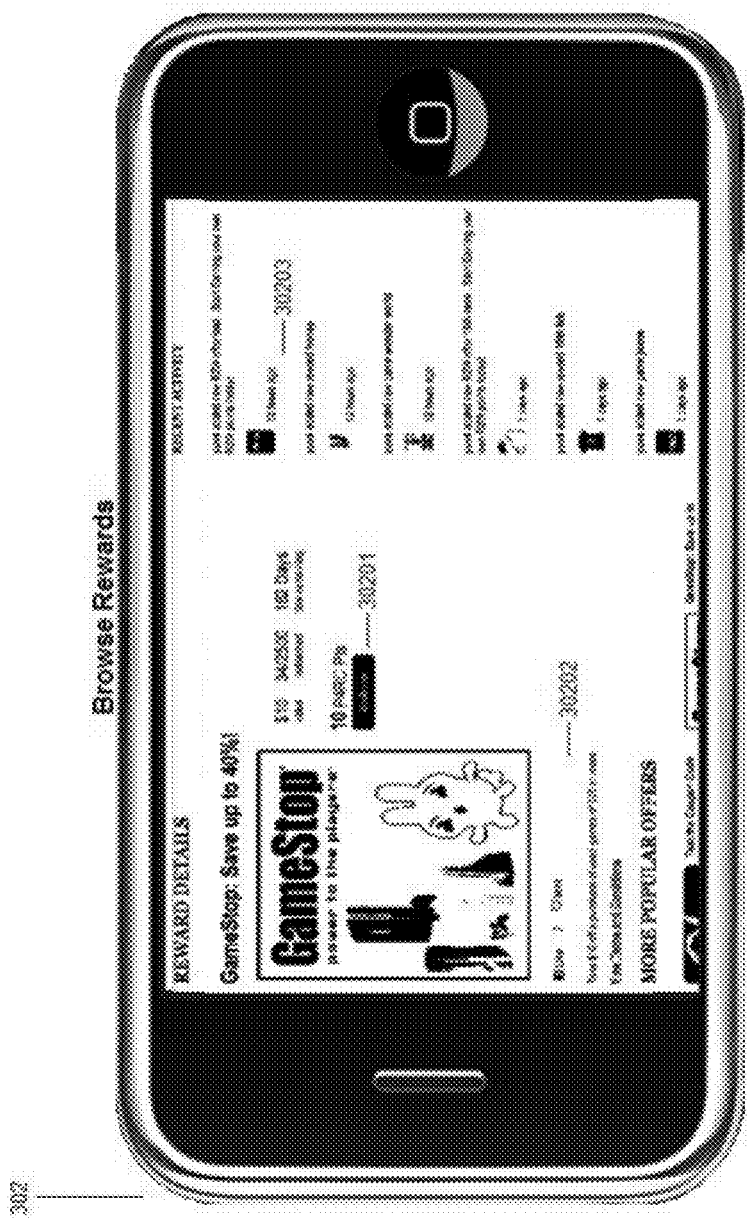

Step 8 in FIG. 1 shows that SEP can provides a range of services to gamers such as conversion of SEP points for game points, enable social networking with friends about game achievements, analytics of the social game challenges, and exposure to leaderboards of social game challenges. The platform allows gamers to review the available offers, eligible offers, almost eligible offers, and provides a range of analytic reports to help gamer make the best use of their points as shown in FIG. 41. A very important aspect of this step is the viral propagation of all game events and offer redemption events in the social networks in which the gamer participates. The platform allows a gamer to invite his or her friends to join the platform, for which they will be rewarded with SEP points. Gamer is encouraged by the platform to share the access to FACEBOOK and allow them to post status updates on their wall pages. Similarly, platform encourages all the brands to share the access to post to their FACEBOOK Fan Pages. In addition, the platform seeks permission of brands, game developers, and gamers to share their TWITTER account. Based on the social networking credentials the gamer, brand, and game developer share, the platform keeps broadcasting events of interest in the ecosystem and the social networking sites of the participants.

Some examples of business events broadcast in the SEP ecosystem include: Registration of new brands into the platform; Registration of LBS Affiliates into the platform; Registration of new games into platform; Broadcast to friends about the game achievement of gamer (e.g. leader board updates); Redemption of offers; Redemption of premium offers; Registration of a campaign and check-in of offers by brand into the market; Sponsorship of a game by brand; Registration of a Social Game Challenge; Closing of a Social Game Challenge; Closing of marketing campaigns; and gamers achieving point mile stones to become featured user on the site.

Figure 40:
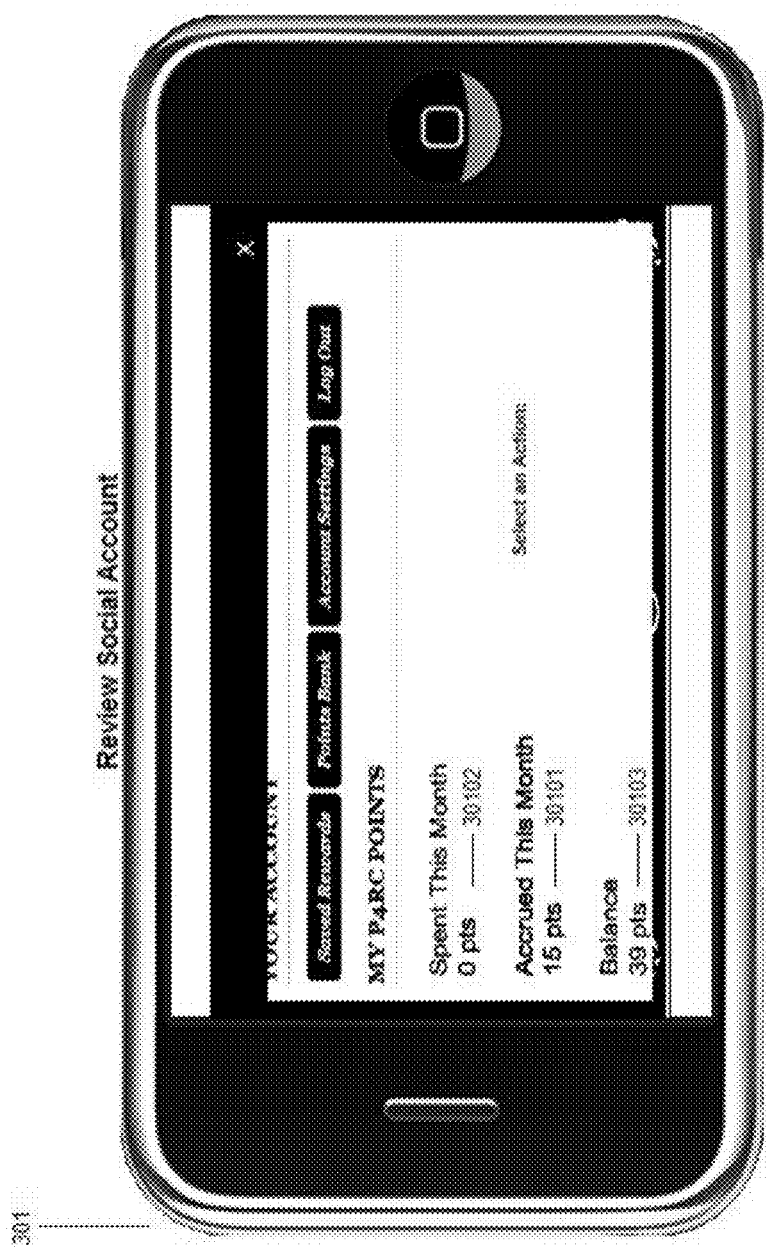
Figure 43:
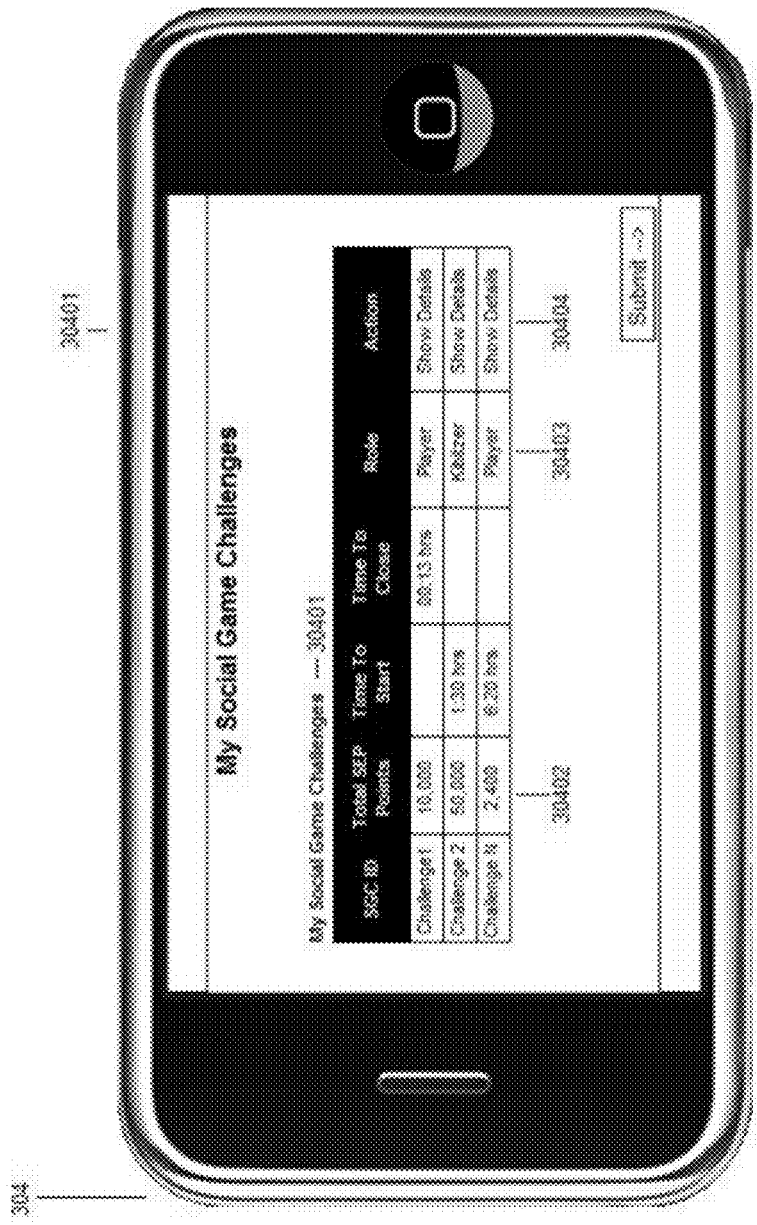
Figure 46:
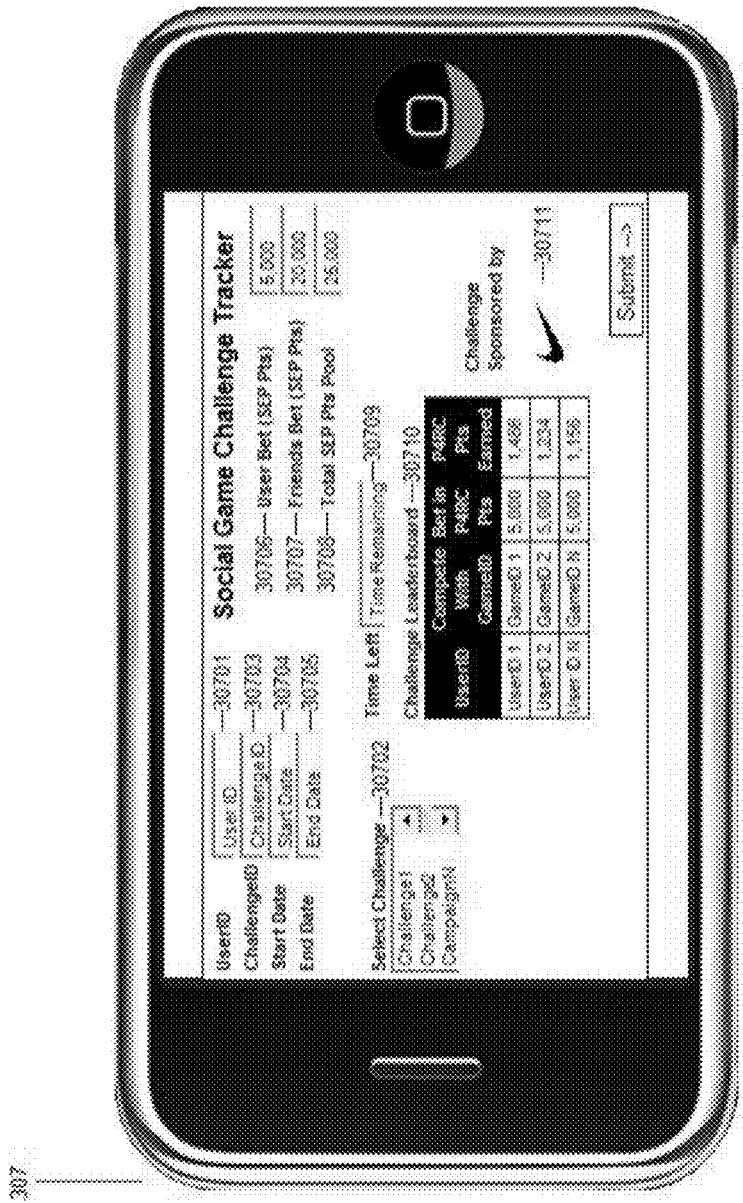

Step 9 in FIG. 1, in turn, shows that a gamer can exchange game points or achievements into SEP points and receive social events from SEP. A gamer can log into SEP to review his or her social account as shown in FIG. 40 to review SEP points accumulation and their utilization. Here, a gamer can review the premium rewards and promotions from brands and LBS Affiliates using a combination of cash and SEP points. The platform allows gamers to pool their credits and buy a higher impact and expensive offer item, by enabling the pooling of offers through gifts among friends in a social network. The platform allows members to check in their points into a shared escrow account with pre-specified amounts, and broadcasts to friends to participate in the shared redemption event. When sufficient points are realized in that escrow account, it enables the conversion of those pooled credits to acquire a valuable offer on behalf of the participating gamers. In addition to pooling, SEP allows Social Game Challenge (SGC) as shown in FIG. 43 and FIG. 46, where gamers can bet their SEP points into a pool of SEP points that is won by the winner of the SGC.

Figure 44:
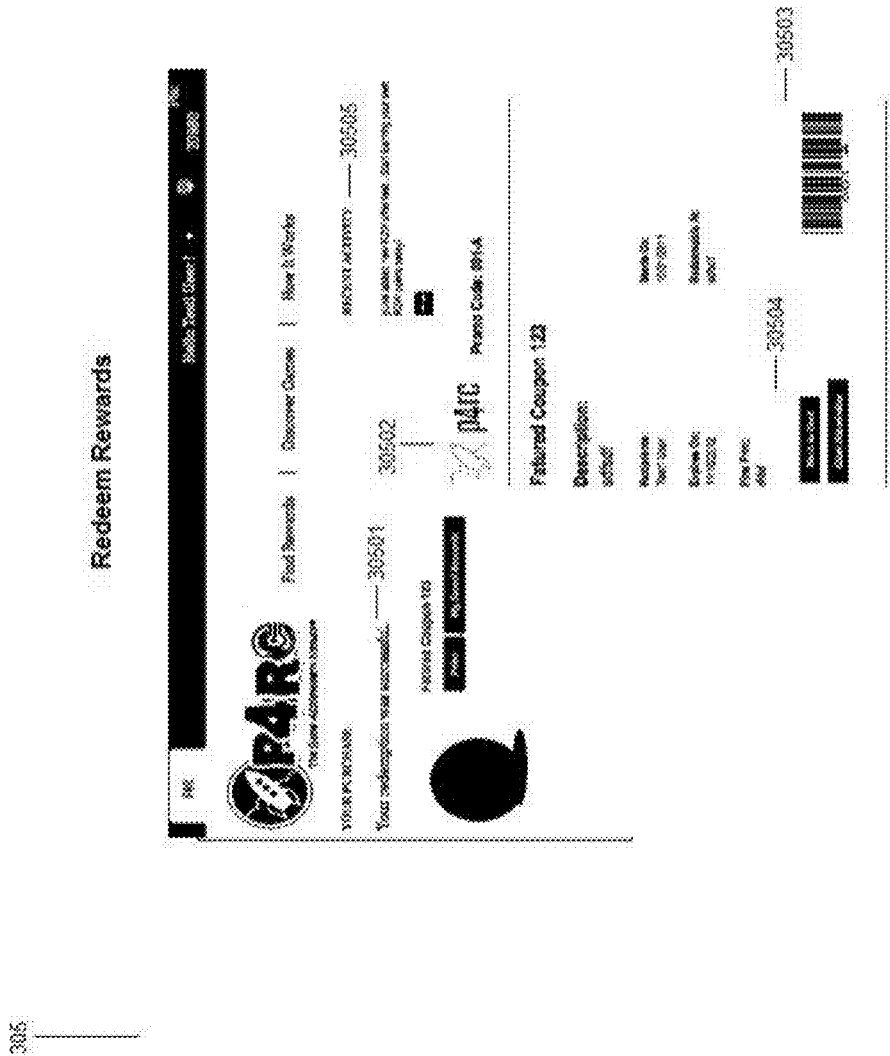

Step 10 in FIG. 1 shows how a gamer can exchange the SEP points earned as described in above paragraph to redeem rewards and promotions as shown in FIG. 44. In addition, a gamer can use SEP to invite friends to social game challenge, share social profile, and buy premium offers among other services that SEP might offer to gamers from time to time to earn additional SEP points, over and above those earned by playing casual games connected to SEP.

Step 11 in FIG. 1 shows how brands and LBS Affiliates, in turn, provide rewards and promotions that can be redeemed using SEP points. In this method step, a gamer can save the rewards and promotions redeemed through either regular offer redemptions using SEP points or premium offers purchased using money. A gamer can use these saved rewards and promotions in online stores or point of sale locations where brand items are sold. The present invention allows a gamer to print the offer or display on mobile phone with RFI bar codes that can be scanned at point of sale.

Step 12 of the invention shown in FIG. 1 also envisions creative uses of the SEP points that a gamer earns to make contributions to the non-profit entities of their choice or gift to friends in SEP. The platform provides an annual tax statement to gamers listing the monetary value of the donations to the non-profits. The non-profit entities, in turn, will redeem SEP points into rewards and promotions from Brand and LBS Affiliates.

Step 13 of the invention in FIG. 1 shows that non-profits can procure the needed resources from sponsoring brands or LBS Affiliates or governmental agencies using the SEP point credits. Brands receive the credits submitted by non-profit organizations and offer two types of participation options to non-profit organizations. Non-profit organizations can opt to convert all the credits into cash. In this case, brands will use the revenue share generated from participating in selling the premium offers on the platform to pay for such cash donations. If brands choose to match the contributions of the gamer, additional cash will be withdrawn from the revenue share account with brands and paid to the non-profit organizations. In such instances, the platform provides the tax statements that document the value of such donations made by gamer and brand to the non-profit organizations. The second participation option for a non-profit organization is to distribute the offers to its membership by asking them to join the platform. In such situations, each new member introduced by the non-profit to the platform will be rewarded by the platform with additional SEP point credits to the non-profit organization and the new members. Using these starter SEP points, the members introduced by the non-profit will be eligible to redeem the offer that non-profit received as a donation. The revenue share from redemption of the offers is paid to non-profit organization.

Figure 2:
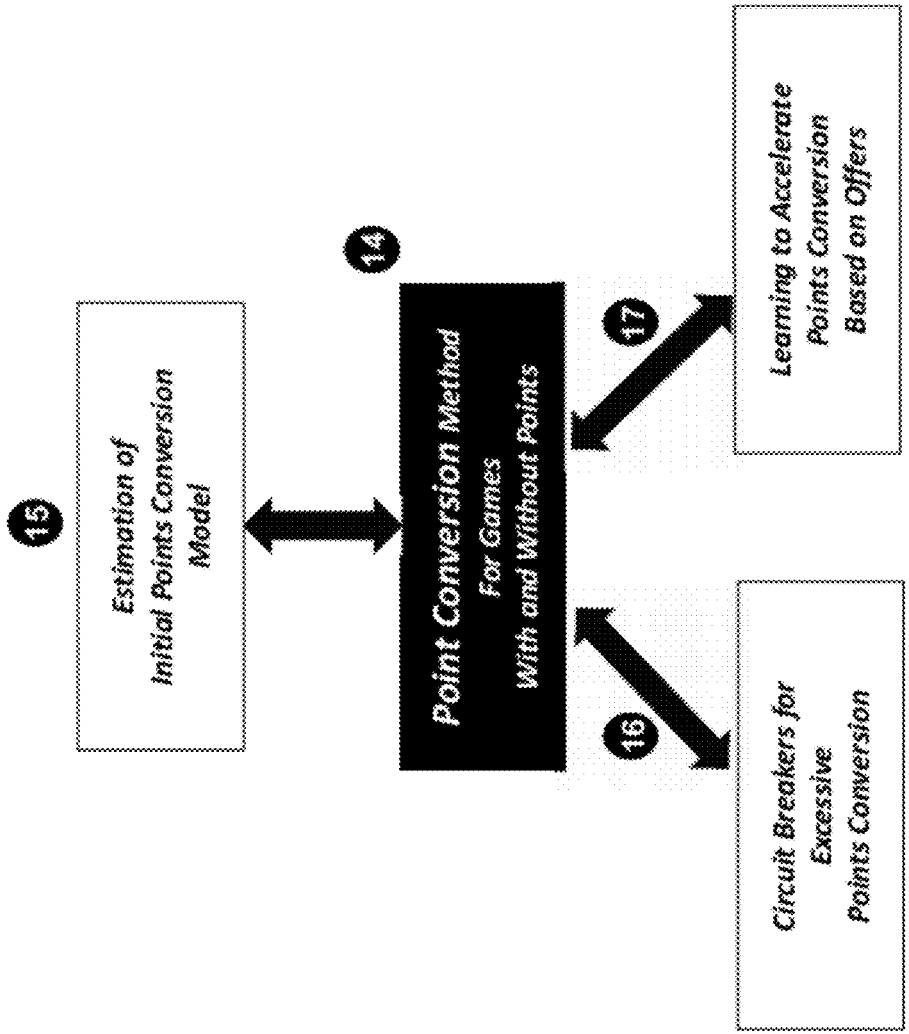
FIG. 2 is a diagram of the components of points conversion engine (PCE) method for optimizing Game points conversion using steps 14 through 17.
Figure 3:
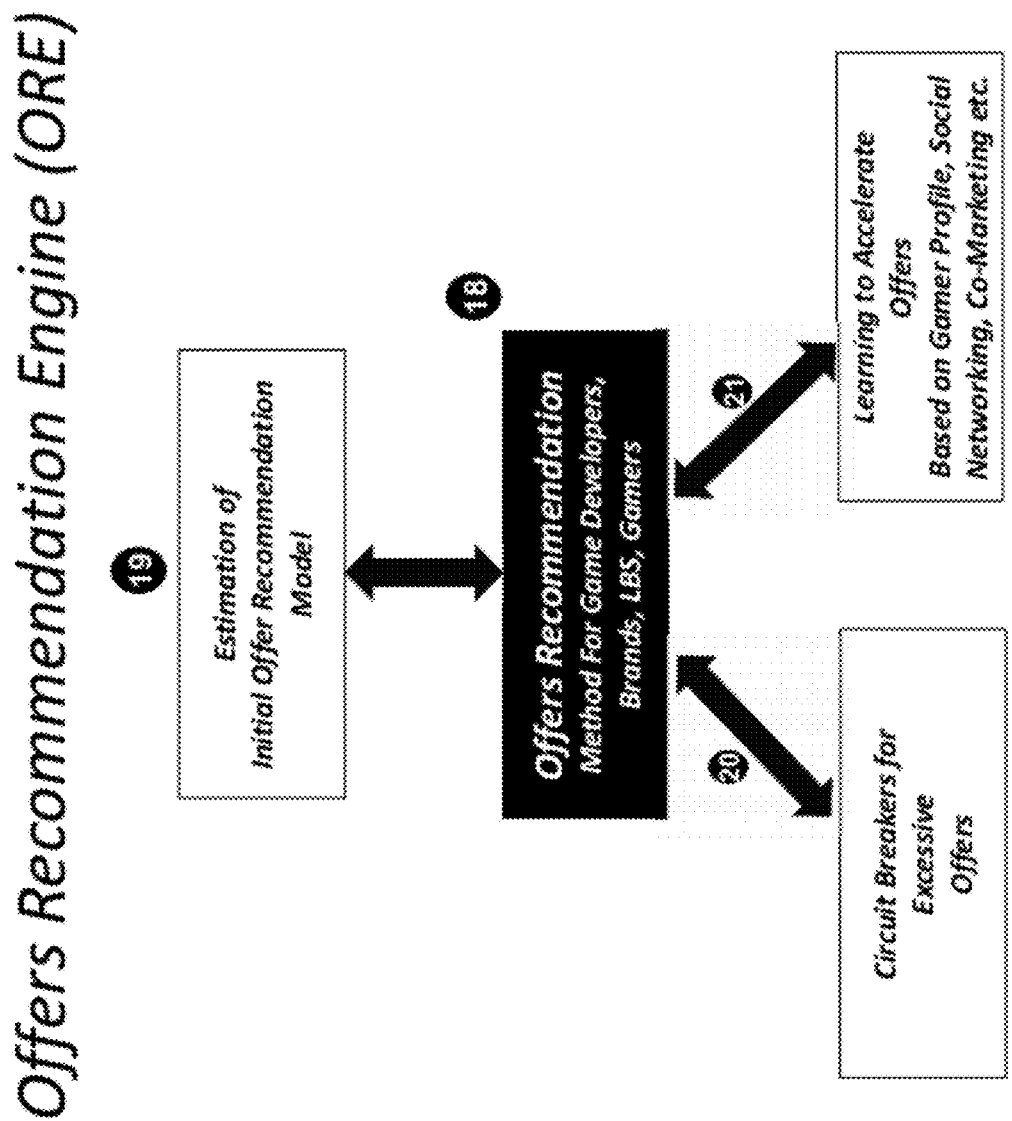
FIG. 3 is a diagram of the components of offer recommendation engine (ORE) method for optimizing Offer Recommendations for game developers, brands, LBS, SGC creators, and gamers using steps 18 through 21.
Figure 4:
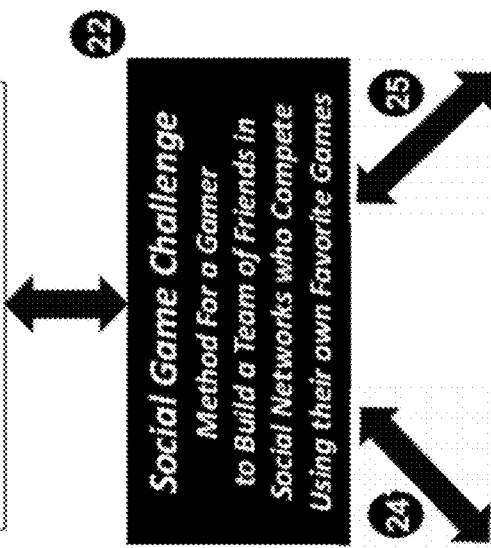
FIG. 4 is a diagram of the components of Social Game Challenge (SGC) method that leverages PCE and ORE to enable a casual gamer to create a higher-order social game from the amalgamation of the favorite casual games of the SGC participants to create novel ways of social engagement for gamers. Steps 22 through 25 describe this method.

The schematic overview shown in FIG. 1 illustrates the suggested ways in which these thirteen steps need to be orchestrated for the participants of the ecosystem to benefit from the present invention. While these thirteen steps in FIG. 1 are visible to the participants in the ecosystem, in order for this ecosystem to thrive, the platform needs to build three tools—a points conversion engine (PCE), an offers Recommendation Engine (ORE), and Social Game Challenge Engine (SGC)—that provide the intelligence needed for these participants to optimize their outcomes as they interact in the ecosystem. FIG. 2 shows step fourteen with its associated steps fifteen through seventeen for building the PCE. FIG. 3 shows step eighteen and its associated steps nineteen through twenty-one for building the ORE. FIG. 4 shows step twenty-two and its associated steps twenty-three through twenty-five for building the SGC.

Figure 5:
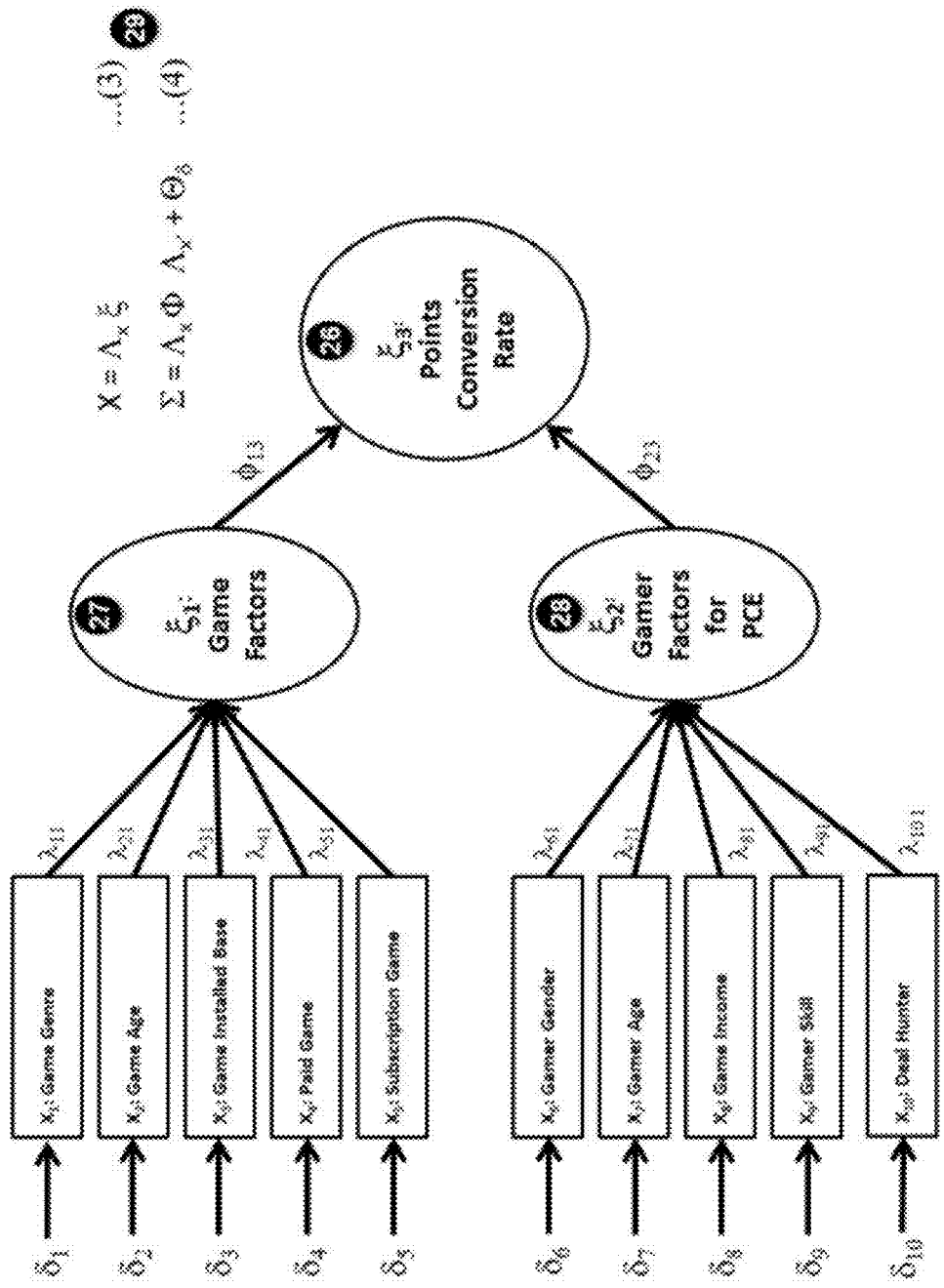
FIG. 5 shows the method step 'PCE Model Estimator' using steps 26 through 29 how the components of a PCE model and the confirmatory factor analysis technique using Joreskog & Sorbom's LISREL tool for estimating the PCE model factor loading coefficients that will be used to determine the optimal SEP points to be allocated for game points of a game as the game points are being checked-in into SEP over time.
Figure 33:
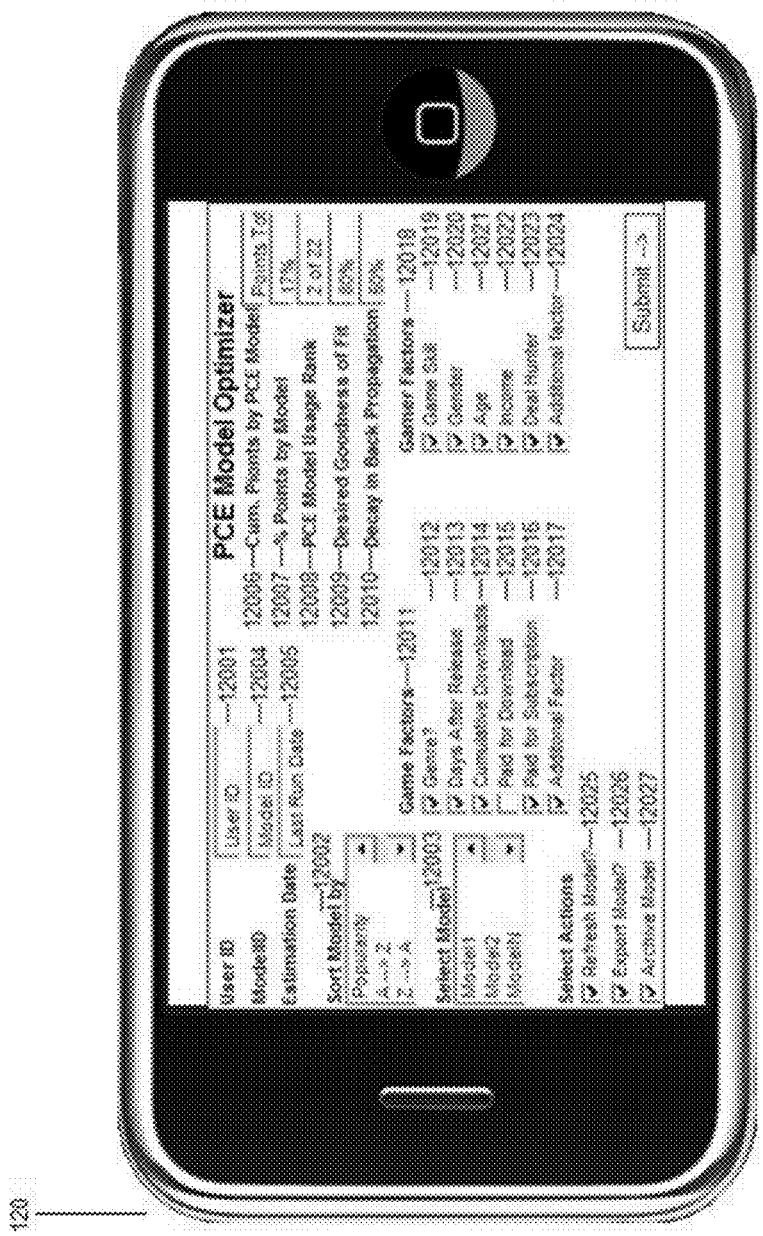

Step 14 in FIG. 2 now describes the proprietary method described in the present invention for converting game achievements of a gamer into SEP points using PCE model. Some games provide points for game achievement; whereas, other games provide non-point achievements such as reaching levels of increasing difficulty and experience. Step 14($a$) describes the method for converting the points based game achievement as illustrated in FIG. 2($a$) and FIG. 2($b$). Step 14(b) describes the method for converting non-points based achievements as shown in FIG. 2(c). Step 15 describes a statistical model used in this invention to generate the initial PCE model based on the game characteristics entered at the time of registering the game as shown in FIG. 5 and additional points conversion data collected when gamers start playing the game. In addition, FIG. 33 shows the configuration of the PCE model by the SEP researcher that will be used by the statistical tool to estimate the PCE model. Step 16 describes the circuit breaker policies described further in FIG. 6 for preventing excessive allocation of SEP points due to possible frauds by gamers or game developers to attempt to defraud the SEP exchange. However, the total number of points assigned has to be appropriate for the activities occurring in the ecosystem and maximize the benefits to all the participants in the ecosystem. Accordingly, Step 17 shows how the learning from social networking will be used to modify the factor loading coefficients estimated from Step 15, and is described further using FIG. 7.

Step 14(a) below describes points conversion method for points based games. Where, $$P = \xi_0 \cdot G/T;$$ Equation (1)

P=SEP points assigned for game achievement;

$\epsilon_0$=Game Normalization Factor, which will be modified from time to time to ensure each game generates similar SEP points when a gamer of average skill plays a game for a standard duration. For example, SEP might configure this parameter to yield 1 SEP point for playing any game connected to SEP for 1 minute by a gamer of average skill;

G=Game points earned by gamer in the game that participates in; and

T=Time period of game play in hours that generated the game points G.

FIG. 2(a) and FIG. 2(b) illustrate the application of the Equation (1) above for Game X and Game Y respective. The normalization factor $\xi_0$ for Game X is 1,000 and Game Y is 100,000. Once this normalization factor is computed for each game, the allocation of SEP points (P) is determined by multiplying this normalization factor with the games points earned divided by the minutes of game play for that game.

We now turn to estimating the SEP points for non-points based game achievements and illustrate the approach using the table shown in FIG. 2(c).

$$\text{Where, } P = \xi_0 \sum_{k=1}^{n} L^k S^k;$$ Equation (2)

P=points assigned for game achievement;

$\xi_0$=Game Normalization Factor, which will be modified from time to time to ensure each game generates similar SEP points when a gamer of average skill plays a game for a standard duration;

n=Maximum number of levels or achievements in a non-points based game k=current level of achievement, which ranges from k=1, 2, . . . , n;

$L^k$=Number of times the level or achievement 'k' is achieved during a standard duration of the game play (See Column 2 in Table 1); $L^k \geq L^{k-1}$ for each k=1, 2, . . . , n, indicating that the frequency of achievements will progressively get lower at higher levels.

$S^k$=Skill factor for achieving level $L^k$ once (See Column 4 in FIG. 2(c)); the sum of $S^k$ for all the levels of the game will add up to 100%.

and

T=Time period during which gamer achieved the $L^k$ levels. It turns out that T itself does not show in the Equation (2) above as the skill factor $S^k$ accounts for the number of achievements in a standard duration.

Column 2 in FIG. 2(c) shows the frequencies of achieving $L^k$ achievements for an illustrative game Z. More occurrences of $L^k$ in standard duration of game play imply lower difficulty and earn lower SEP points. To account for differences in difficulty across different levels, the method asks the game developer to allocate 100% across all possible achievement levels, as show in Column 3 of FIG. 2(c). A general business rule in this method is that the degree of difficulty in games does increase monotonically as the achievement levels increase. Column 4 in FIG. 2(c) then shows the allocated SEP points for each game level achievement. As more such game achievement levels are accomplished, more SPE points will be allocated as shown in Equation (2) above.

Step 15 of the invention describes a PCE Estimator method shown in FIG. 5 using additional steps 26 through 29 for further grounding the Game Normalization Factor $\xi_0$ in terms of the characteristics of the game and gamer, so that the overall goals of the SEP ecosystem described in FIG. 1 can be optimized for its participants. The Game Normalization Factor $\xi_0$ from the above Equation (1) for a points-based game or Equation (2) for a non-points-based game is calculated entirely based on the game achievements table entered by game developer and validated by SEP. We need independent and market-based validation of $\xi_0$ to realize the goals of SEP ecosystem stakeholders. Hence, Step 15 of this invention strives to model $\xi_0$ further in terms of the game factors and gamer factors using the confirmatory factor analysis (CFA), which is described by Joreskog K. G. and Sorbom D, 'LISREL 8: Structural Equations Modeling with SIMPLIS Command Language,' 1993, ISBN 0-89498-03305, Scientific Software International, Lincolnwood, Ill.

The Game Normalization Factor $\xi_0$ is proxied in the CFA as a second-order construct called $\xi_3$ termed as points conversion Rate shown in FIG. 5. Step 26 in this FIG. 5 suggests that the Point conversion Rate is a second-order construct that needs to be estimated as a dependent construct, which is then modeled to be a combination of factor loadings from two underlying first-order constructs—Game Factors $\xi_1$ and Gamer Factors $\xi_2$. Step 27 of the invention in FIG. 5 models Game Factors using five independent measurement variables X1 (Game Genre), X2 (Game Age), X3 (Game Installed Base), X4 (Paid Game), and X5 (Subscribed Game). Step 28 of the invention in FIG. 5 models Gamer Factors using five independent measurement variables X6 (Gamer Gender), X7 (Gamer Age), X8 (Gamer Income), X9 (Gamer Skill), and X10 (Deal Hunter). Step 29 is the method for using the LISREL statistical tool to estimate the factor loadings of overall PCE model shown in FIG. 5.

FIG. 5 illustrates the approach for progressively improving the PCE model by considering an increasing number of explanatory factors represented by a vector X. As illustrated in FIG. 5, X here is a [10×1] vector of five game factors and five gamer factors that will be used to estimate the PCE model by providing more weight to those games and gamers that are likely to benefit more from the platform. $\Lambda_x$ is a [3×3] factor loading matrix to capture second order concepts such as 'Game Factors' and 'Gamer Factors' that eventually determine the adjustments to be made to the Point conversion Rate ($\xi_3$).

To estimate the factor loading matrix $\Lambda_x$, the present invention uses the following equations:

$$X = \Lambda_x \xi$$ Equation (3)

$$\Sigma = \Lambda_x \Phi \Lambda_{x'} + \Theta_\delta$$ Equation (4)

where $\Sigma$ is the [10×10] covariance matrix of X vector, $\Phi$ is the [3×3] covariance matrix of the first-order factors (i.e. $\xi_1$, $\xi_2$, and $\xi_3$), and $\Theta_\delta$ is [10×10] covariance matrix of the error terms of the individual elements in X. LISREL model minimizes the error term $\Theta_\delta$ using maximum likelihood estimation method to estimate the optimal factor loadings in $\Lambda_x$ and the factor correlation matrix $\Phi$. LISREL method provides two indicators of the validity of the model estimated—Adjusted Goodness of Fit (AGFI) and p value. AGFI indicates the variance in X explained by the overall model and any value above 0.8 is considered a good fit. The p value indicates the probability that the observed model fit is due to random chance. Any value of p less than 0.1 indicates that the model is statistically significant enough to be generalized from this sample to the population. This estimation of this PCE model shown in Equation (3) and Equation (4) will be carried out periodically to optimize the points conversion Rates $\xi_3$ for each game.

The final output of the initial points conversion model will be the base line for each new game registered into the platform. While Step 14(*a*) and Step 14(*b*) ensure fairness to game developer and gamer in converting game points into the points, the focus of step fifteen is to make the game context of the Point conversion engine are understood in the context of the game characteristics and gamers profile, so that the ORE of the platform can provide data-driven guidance to game developers, brands, and LBS Affiliates to realize their marketing and advertisement goals.

A high degree of correlation between $\xi_3$ estimated from LISREL and $\xi_0$ estimated from Equation (1) or Equation (2) implies that it is now feasible to publish a PCE model that allows for the modification of Game Normalization Factor $\xi_0$ of a game based on the characteristics of individual gamer (i.e. targeting gamers based on their demographics, game skills, shopping behavior etc.) and individual game (i.e. game payment, installed base, genre etc.) while ensuring the allocation of SEP points for game achievements is done fairly for all gamers. So to speak, $\xi_0$ captures the supply-side estimate of points conversion rate based on the game achievements structure. Whereas, $\xi_3$ captures the demand-side estimate of the points conversion rate based on the needs of the SEP ecosystem stakeholders. SEP exchange acts as a market place where $\xi_0$ of a game from supply-side and $\xi_3$ of a game from demand-side are brought into balance with the help of another method of this invention called offers Recommendation Engine (ORE) described below as shown in FIG. 3.

As the gamers start interacting with the platform by checking-in SEP points and redeeming SEP points, this step fifteen is repeated periodically to validate if the model is still statistically valid. Periodically, the platform conducts $\chi^2$ statistical test of comparing pre and post factor loading matrices $\Phi$ to determine if any major changes occurred in the context of the game or gamer in the PCE model. If any such gross changes in the gaming trends are detected, an analysis of factor loadings in $\Phi$ is conducted to identify the specific trends, which in turn, will be shared with the game developers, brands, and LBS Affiliates so that they can tune their rewards and promotions within SEP.

Figure 6:
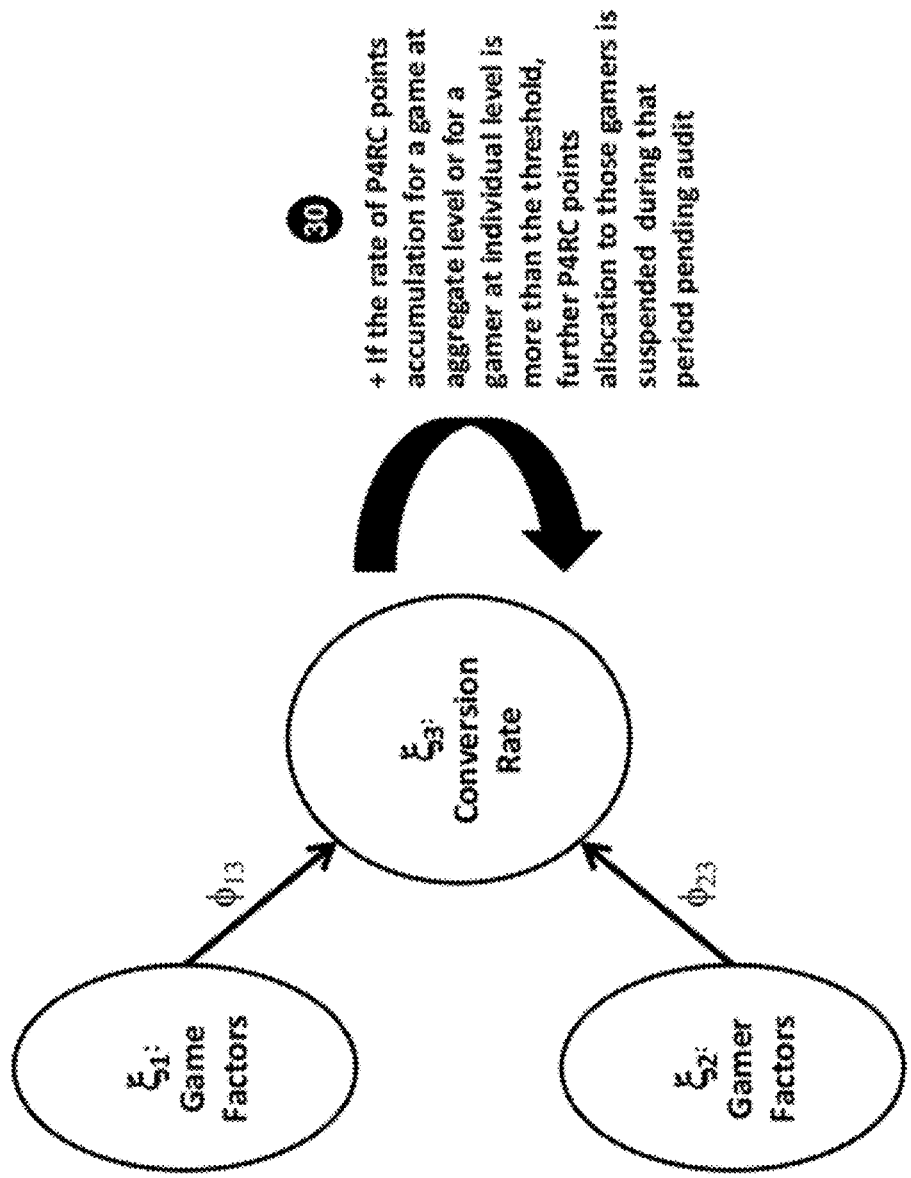
FIG. 6 shows the method step 'PCE circuit breakers' using step 30 how PCE will use circuit breaker policies to prevent excessive SEP points allocation under statistically suspicious conditions.

Step 16 of the invention is shown in FIG. 6 for designing circuit breakers for preventing excessive conversion of points by a gamer or game developer. Step 16 describes a method for detecting any fraudulent attempts by gamers to check in excess game points for a standard duration to obtain the points that have monetary value. At the time of registration of a new game, game developer estimates the typical points earned during a standard duration, typical levels or achievements earned during a typical duration, frequency of levels or achievements during a standard period, and degree of difficulty of each level or achievement in the game. Step 30 shown in FIG. 6 is further refined in terms of the enabling SEP administrator to configure the PCE circuit breakers using a range of PCE circuit breaker polices as shown in an illustrative embodiment of this invention in FIG. 34.

A fraud prevention background job will be running in the platform to check the aggregate level of SEP points allocated to each game and if the average games points earned per gamer of that game during a standard duration is within the min and max thresholds set for that game. Any statistically significant deviation will be flagged. The platform will then identify the gamers who are accumulating and transferring game points more than the max threshold established for that game. All such gamers will be sent a notification and their game points accumulation will be marked as provisional for a predetermined period during which an audit is triggered automatically to resolve the issue.

All such decisions will be made by the platform after taking the inputs from all the stakeholders involved and by employing a data-driven approach. If the circuit breaks are tripping too frequently, it is possible that the initial thresholds were too stringent and will be adjusted to make the circuit breakers trip less frequently.

Step 17 for accelerating the points conversion Rate ($\xi_3$ in FIG. 5) based on feedback from social networks is shown in FIG. 7. Step 17 in FIG. 2 and its accompanying Step 31 through Step 33 shown in FIG. 7 describe the influence of the social networking and Offer Recommendation engine on the factor loadings in the PCE model estimated in FIG. 5. Step 31 in FIG. 7 suggests that the behavior of offer recommendation engine (ORE) should impact the factor loadings $\phi_{13}$ and $\phi_{23}$ in the PCE model. When more rewards and promotions are available for the game or gamer, the both these factor loadings are adjusted upwards incrementally. When a gamer in such context earns more SEP points, it is quite likely that the increased points so earned might result in increased redemption of such offers. This is because, these offers are tailored for the game and gamer context. Step 32 of the invention in FIG. 7 suggests that if a game is being featured by a game developer, brand, or LBS affiliate, than the associated factor loading in PCE model—$\phi_{13}$—needs to be positively reinforced to assign higher SPE points for the same level of game play for the all the players of that game. Step 33 of the invention in FIG. 7 suggests that if a game is liked and socially shared by a gamer, brand, or LBS affiliate, than the associated factor loading in PCE model—$\phi_{23}$—needs to be positively reinforced to assign higher SPE points for the same level of game play for the all the players of that game.

Step 17 also uses a type of back propagation algorithm as described by Jayalakshmi T and Santhakumaran A, 'Improved Gradient Descent Back Propagation Neural Networks for Diagnoses of Type II Diabetes Mellitus,' in Global Journal of Computer Science and Technology, Volume 9(5): 94-97. Whenever business events of interest occur in the ecosystem, the platform evaluates that event to see if there is a need to modify the parameters in the PCE model to accelerate beneficial outcomes in the SEP ecosystem such as initiating new rewards in a game or increased rate of rewards redemption in that game. Some examples of business events of interest are shown in the above FIG. 7. If a brand decides to sponsor a game and initiates a new offer campaign with coupons or rewards, the points conversion engine responds by positively modifying the game factor loadings in the model as shown as Step 32 in FIG. 7. This results in creating higher rate of points allocation to the same level of aggregate activity by all the gamers playing that game. Since more points are allocated than before the modification, the gamers are more likely to use the higher number of points now available to redeem the offers showing up in that game due the sponsorship. This increases the likelihood of the campaign success, which results in higher monetization for brand, LBS Affiliate, game developer, and gamer.

The purpose of such factor loading modifications is to increase the capacity of the ecosystem. This role is similar to that of Federal Reserve Bank adjusting the money supply in the entire economy using strategies such as quantitative easing. The net result of such modification efforts is to increase the capacity to conduct more transactions in the ecosystem.

This method ensures that the platform does not discriminate against brands that actively participate versus those that do not. Instead, these modifications merely increase the capacity of the entire ecosystem to conduct more transactions.

Step 18 of the invention shown in FIG. 3 now describes the offers Recommendation method to support brands, LBS Affiliates, game developers, and gamers. The offers Recommendation Engine (ORE) is the heart of the intelligence of invention as embodied in SEP. It tracks the offers active in the ecosystem for their effectiveness. Based on that, ORE provides data-driven recommendations of rewards and promotions to brands, LBS Affiliates, game developers, and gamers in designing their marketing and advertising campaigns in SEP. ORE advises game developers on the top brands and LBS Affiliates they need to consider for game sponsorship based on the context of the brand/LBS and the effectiveness of the campaigns of the brand/LBS within the ecosystem. Finally, the ORE also advises gamer on the best offers to redeem for the amount of points available and selecting a sponsor for SGC they create. In addition, ORE tracks those offers that are almost within the reach of gamer and send alerts to the gamer. Armed with this information, gamer can accumulate the needed points in time to redeem the almost eligible offers. The ORE also recommends gamer similar games based on the success the gamers had in accumulating points from different games. By providing such timely recommendations, the ORE enhances the monetization potential of the entire ecosystem for the brands, LBS Affiliates, game developers, and gamers.

Figure 8:
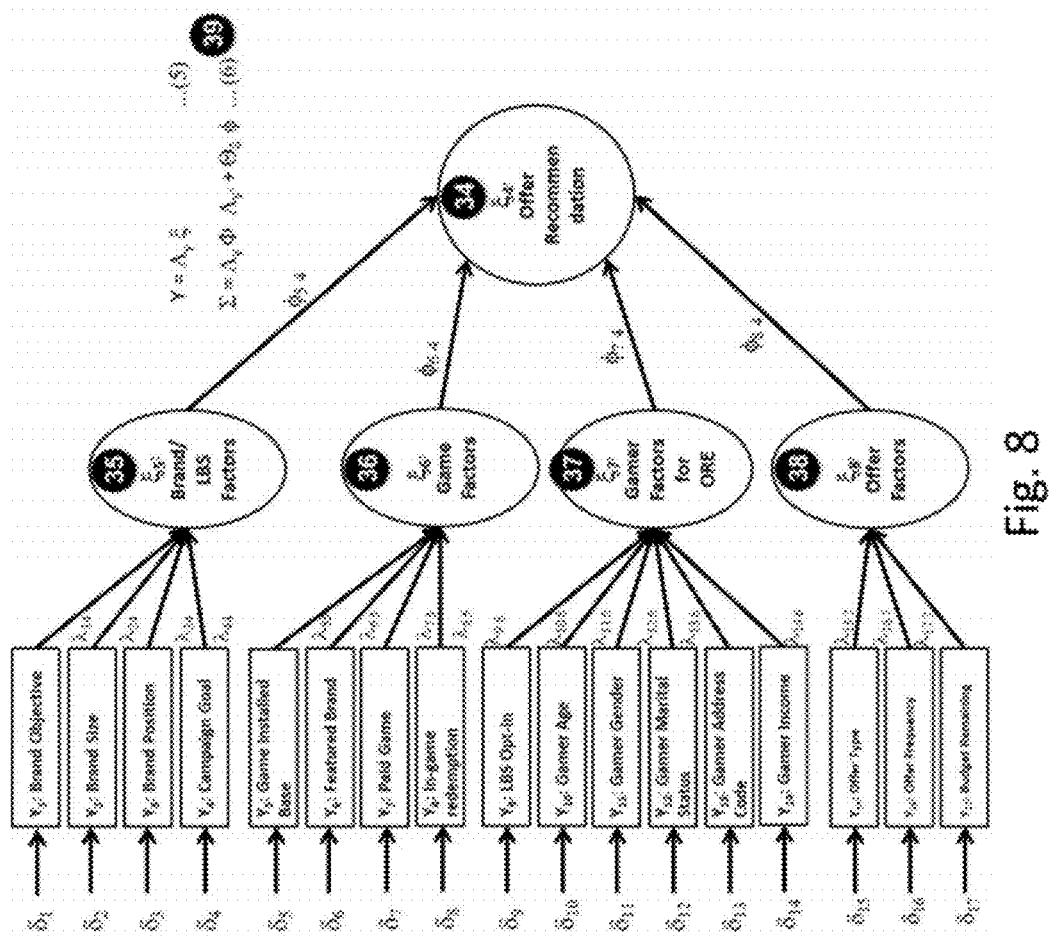
FIG. 8 shows the method step 'ORE Model Estimator' using steps 34 through 39 how different types of factors are used in the confirmatory factor analysis technique of Joreskog & Sorbom's for estimating the ORE model factor loading coefficients that will be used to determine the optimal offers to be recommended to a game developer, brand, LBS Affiliate, or gamer creating an SGC.

Step 19 of the invention describes an ORE Model Estimator method shown in FIG. 3 uses additional steps 34 through 39 shown in FIG. 8 for making recommendations of rewards and promotions using the characteristics of the game, gamer, brand/LBS, and offer so that the offer recommendations are optimized in the SEP ecosystem described in FIG. 1 for all its participants. Hence, Step 19 of this invention models recommendations for each gamer online, on mobile device, or in social networks using the confirmatory factor analysis (CFA), which is described by Joreskog K. G. and Sorbom D, 'LISREL 8: Structural Equations Modeling with SIMPLIS Command Language,' 1993, ISBN 0-89498-03305, Scientific Software International, Lincolnwood, Ill.

Step 34 in this FIG. 8 suggests that Offer Recommendation $\xi_4$ is a second-order construct that needs to be estimated as the dependent construct, which is then modeled to be a linear combination of factor loadings from four underlying first-order constructs—Brand/LBS Factors $\xi_5$, Game/LBS Factors $\xi_6$, Gamer Factors $\xi_7$, and Offer Factor $\xi_8$. Step 35 of the invention in FIG. 8 models Brand/LBS Factors using four independent measurement variables Y1 (Brand Objectives), Y2 (Brand Size), Y3 (Brand Position), and Y4 (Campaign Goal). Step 36 of the invention in FIG. 8 models Game Factors using four independent measurement variables Y5 (Game Installed Base), Y6 (Featured Brand), Y7 (Paid Game), and Y8 (In-game Redemption). Step 37 of the invention in FIG. 8 models Gamer Factors for ORE using six independent measurement variables Y9 (LBS Opt-in), Y10 (Gamer Age), Y11 (Gamer Gender), Y12 (Gamer Marital Status), Y13 (Gamer Address Code), and Y14 (Gamer Income). Step 38 of the invention in FIG. 8 models Offer Factors using three independent measurement variables Y15 (Offer Type), Y16 (Offer Frequency), and Y17 (Budget Remaining). Step 39 is the method for using the LISREL statistical tool to estimate the factor loadings of overall ORE model shown in FIG. 8.

FIG. 8 illustrates the approach for progressively improving the ORE model by considering an increasing number of explanatory factors represented by a vector X. As illustrated in FIG. 8, X here is a [17×1] vector of four brand/LBS measurements, four game measurements, six gamer measurements, and three offer measurements that will be used to estimate the ORE model by providing more weight to those brand/LBS, game, gamer, and offer that are likely to benefit the stakeholders of the SEP ecosystem. x is a [5×5] factor loading matrix to capture first-order concepts such as 'Brand/LBS Factors,' 'Game Factors,' 'Gamer Factors,' and 'Offer Factors' that eventually determine the Offer Recommendations (8).

To estimate the factor loading matrix X, the present invention uses the following equations:

$$Y = \Lambda_Y \xi \quad \text{Equation (5)}$$

$$\Sigma = \Lambda_Y \Phi \Lambda_Y' + \Theta_\delta \quad \text{Equation (6)}$$

where $\Sigma$ is the [17×17] covariance matrix of Y vector, $\Phi$ is the [5×5] covariance matrix of the first-order factors (i.e. $\xi_4$, $\xi_5$, $\xi_6$, $\xi_7$, and $\xi_8$), and $\Theta_\delta$ is [17×17] covariance matrix of the error terms of the individual elements in Y. LISREL model minimizes the error term $\Theta_\delta$ using maximum likelihood estimation method to estimate the optimal factor loadings in $\Lambda_Y$ and the factor correlation matrix $\Phi$. LISREL method provides two indicators of the validity of the model estimated—Adjusted Goodness of Fit (AGFI) and p value. AGFI indicates the variance in Y explained by the overall model and any value above 0.8 is considered a good fit. The p value indicates the probability that the observed model fit is due to random chance. Any value of p less than 0.1 indicates that the model is statistically significant enough to be generalized from this sample to the population. This estimation of this ORE model shown in Equation (5) and Equation (6) will be carried out periodically to optimize the points conversion Rates $\xi_3$ for each game.

The output of the initial Offer Recommendation model will be the base line for each new brand, LBS Affiliate, or game developer is registered into the SEP platform. The focus of step 19 is to make the SEP ecosystem context of the offer recommendation engine are understood in the context of the brand/LBS profile, game profile, gamer profile, and offer profile, so that the ORE of the platform can provide data-driven guidance to game developers, brands, and LBS Affiliates to realize their marketing and advertising campaigns. In addition, ORE will provide guidance to gamer in selecting appropriate sponsorship to meet his or her challenge goals.

As the gamers exchange SEP points to redeem rewards and promotions in SEP, this Step 19 is repeated periodically to validate if the model is still statistically valid. Periodically, the platform conducts $\chi^2$ statistical test of comparing pre and post factor loading matrix $\Lambda_Y$ and factor correlation matrix $\Phi$ to determine if any major changes occurred in the context of the brand, LBS, game or gamer in the ORE model. If any such gross changes in ORE model are detected, an analysis of factor loadings in $\Lambda_Y$ and $\Phi_{in}$ ORE is conducted to identify the specific trends, which in turn, will be shared with the game developers, brands, and LBS Affiliates so that they can tune their rewards and promotions within SEP.

Figure 9:
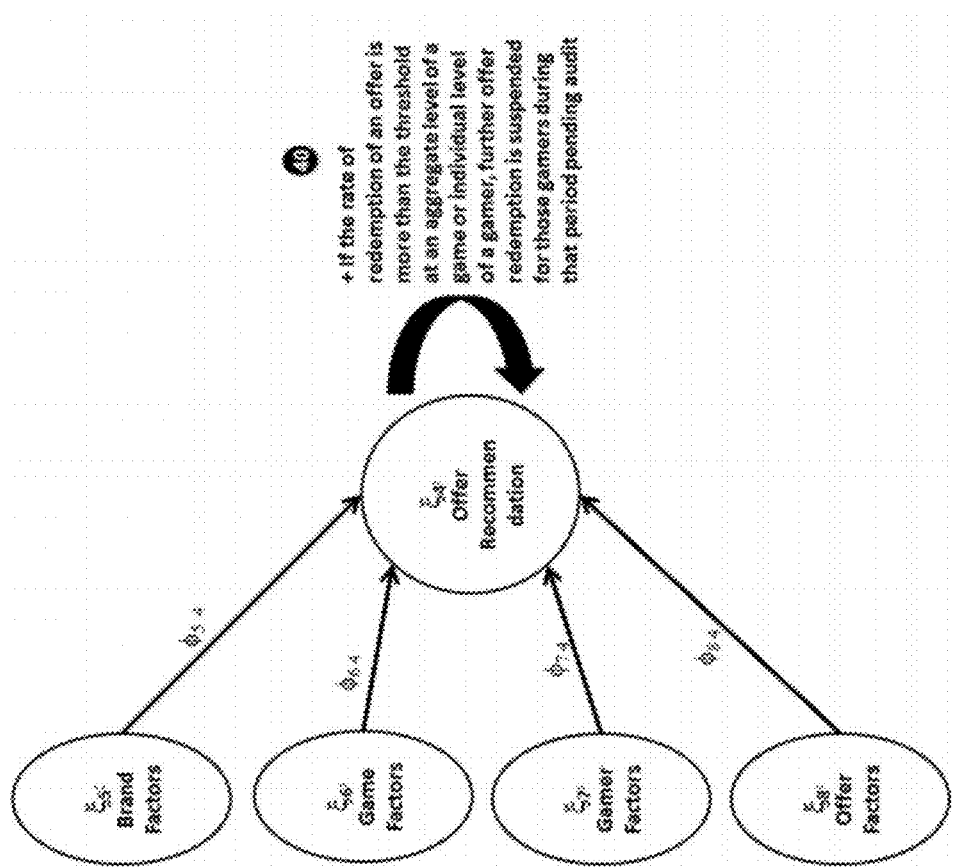
FIG. 9 shows the method step 'ORE circuit breakers' using step 40 how ORE will use circuit breaker policies to prevent excessive rewards redemption under statistically suspicious conditions.

Step 20 of the invention is shown in FIG. 9 for designing circuit breakers for preventing excessive redemption rewards and promotions by a gamer. Step 40 shown in FIG. 9 describes a fraud prevention background job that will be running periodically for detecting any fraudulent attempts by gamers to redeem rewards and promotions during a standard duration. At the time of registration of a new reward or promotion in a campaign, game developer, brand, or LBS Affiliate will budget certain rate redemptions in SEP. Step 40 shown in FIG. 6 is further refined in terms of the enabling SEP administrator to configure the ORE circuit breakers using a range of ORE circuit breaker polices as shown in an illustrative embodiment of this invention in FIG. 36. Any statistically significant deviation will be flagged. The platform will then identify the garners who are redeeming rewards and promotions over the max threshold established for that campaign. All such garners will be sent a notification and their redeemed rewards and promotions will be marked as provisional for a predetermined period during which an audit is triggered automatically to resolve the issue.

All such decisions will be made by the platform after taking the inputs from all the stakeholders involved and by employing a data-driven approach. If the circuit breaks are tripping too frequently, it is possible that the initial thresholds were too stringent and will be adjusted to make the circuit breakers trip less frequently.

Figure 10:
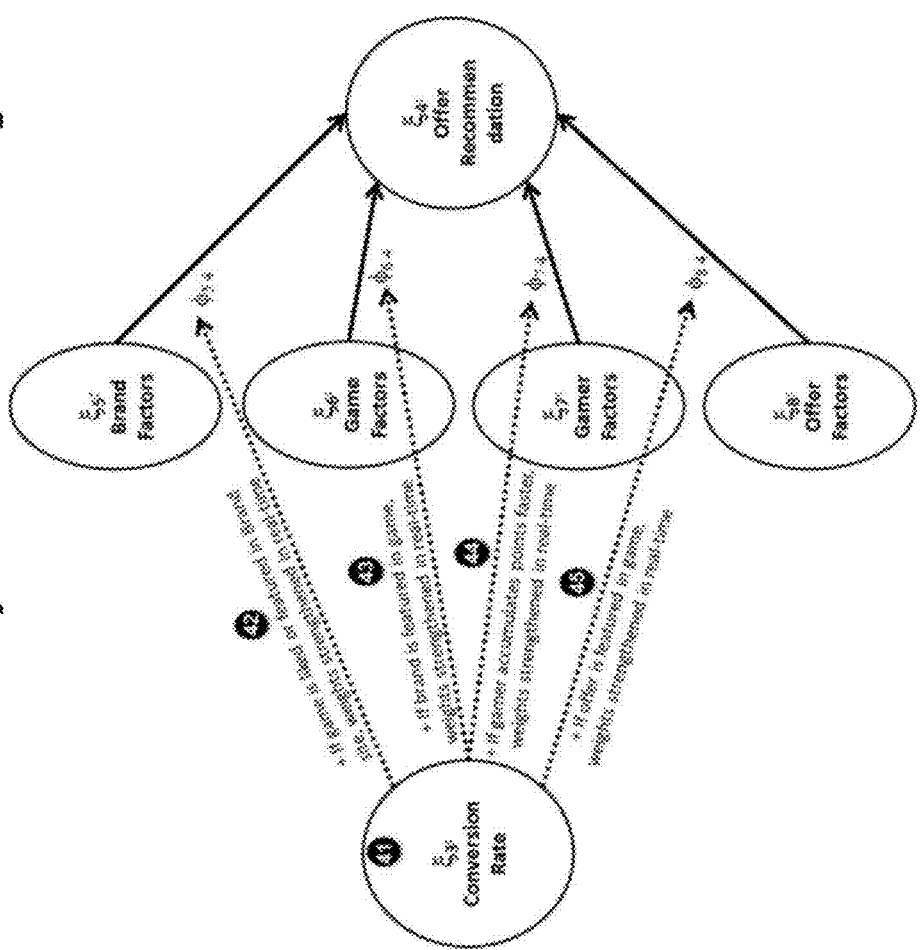
FIG. 10 shows the method step 'Learning in ORE with Feedback from Social Networking' using steps 41 through 45 how an ORE will modify its estimated factor loading coefficients in response to the feedback from social networking.

Step 21 in FIG. 3 for accelerating the offers Recommendation based on feedback from social networks is shown in FIG. 7. Step 21 in FIG. 3 and its accompanying Step 41 through Step 45 in FIG. 10 describe the influence of the social networking on the factor loadings in the ORE model estimated in FIG. 8. Step 41 of the invention in FIG. 10 suggests that the context of PCE needs to be considered using several offer acceleration policies to adjust the factor loadings $\phi_{5\_4}$, $\phi_{6\_4}$, $\phi_{7\_4}$, and $\phi_{8\_4}$ in the ORE model. Some examples of such policies include but not limited to: if the overall SEP points accruing to SEP ecosystem is at a faster rate than expected, then all the above four factor loadings shown in FIG. 10 will be adjusted upwards to cope with the increased SEP points in the SEP ecosystem. Step 42 of the invention in FIG. 10 suggests that if a brand is liked or socially shared by a gamer, or if a brand is newly featured in a campaign, the associated factor loading in ORE model—$\phi_{5\_4}$—needs to be increased so that offers for that brand will increase relatively for the same level of SEP points in the SEP ecosystem. Step 43 of the invention in FIG. 10 suggests that if a game is liked or socially shared by a gamer, or if a game is newly featured in a campaign, the associated factor loading in ORE model—$\phi_{6\_4}$—needs to be adjusted upwards so that offers in that game or for the download of that game will increase relatively for the same level of SEP points in the SEP ecosystem. Similarly, Step 44 of the invention in FIG. 10 suggests that if a gamer is accumulating SEP points at a faster clip than expected or redeeming rewards at a faster clip than expected, the associated factor loading in ORE model—$\phi_{7\_4}$—needs to be increased so that offers for that gamer will increase relative to other garners for the same level of SEP points in the SEP ecosystem. Finally, Step 45 of the invention in FIG. 10 suggests that if a reward or promotion is being redeemed at a faster rate than expected in the SEP ecosystem, the associated factor loading in ORE model—$\phi_{8\_4}$—needs to be adjusted upwards so that those rewards will increase relative to other rewards for the same level of SEP points in the SEP ecosystem.

Step 21 in FIG. 3 also uses a type of back propagation algorithm as described by Jayalakshmi T and Santhakumaran A, 'Improved Gradient Descent Back Propagation Neural Networks for Diagnoses of Type II Diabetes Mellitus,' in Global Journal of Computer Science and Technology, Volume 9(5): 94-97. Whenever business events of interest occur in the ecosystem, the platform evaluates that event to see if there is a need to modify the parameters in the Offer Recommendation model to accelerate beneficial outcomes such as favorable game factors (e.g. a game developer releasing an ANDROID game of its popular IPHONE game, or making a single player game into a multi-player game that are more beneficial for social networking effects in pushing the offers).

If a game decides to sponsor a brand and supports the new offer campaigns of that brand, the learning algorithm described here in the offer recommendation engine responds by positively modifying the game factor loadings in the model. This results in creating higher rate of exposing the offers to the garners to the same level of aggregate activity by all the garners playing that game. Since more offers are exposed than before the modification, the garners are more likely to redeem the offers. This increases the likelihood of the campaign success, which results in higher monetization for brand, game developer, and garner.

The purpose of such factor loading modifications is to increase the capacity for rewards redemption and a decrease of available SEP points in of the ecosystem. This role is similar to that of monetary tightening policy of the Federal Reserve Bank in the economy using strategies such as selling treasuries.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

Now, we turn to an important Step 22 of this invention, Social Game Challenge (SGC), as described in FIG. 4. SGC is designed to enhance social engagement of garners with the gamification of the game playing experience itself, and is implemented using Steps 23 through 25. In Step 23, a garner can invite from his or her social network or from the entire SEP, a SGC to play games for a competition of standard duration. Each participant will stake certain number of SEP points to enter the challenge. The rest of the participants can match those SEP points and pay into the SEP points pool of the challenge. Whoever scores the highest SEP points during the challenge period will win the pool of SEP points. This invention enumerates 24 illustrative patterns of SGC competitions in FIG. 47. These social challenge types listed in FIG. 47 are for illustration purpose only and the invention covers potentially any other social engagement pattern that allows for players to challenge one another within a game, within a game genre, or across any heterogeneous combination of game plays. Some popular patterns of SGC include snap duel, multi-round duels, multi-player knockouts, and multi-player multi-round tournaments. The SGC tournaments can also be entirely invitation-only or open to public to participate. The Step 23 also envisions followers of SGC, who are interested in the leaderboard of a SGC of their interest, without directly competing in that SGC. By allowing such kibitzing, the SGC events can virally propagate in social networks of the participants and kibitzers of an SGC.

Step 24 of the invention now leverages the PCE to normalize the game achievements, as potentially heterogeneous games can be played during a SGC. When certain number of garners are being played by the participants of a SGC, the feedback from social networking and ORE for those participating games in SGC are suspended to prevent extraneous optimization adjustments in SEP adversely impacting the outcomes of a SGC. Hence, SEP supports only short durations of game play such as a few minutes or hours for the competitions. However, once the challenge itself is concluded, all the games that participated in the SGC will be exhibiting higher activation levels in terms of the points generation, and potentially redemption of rewards and promotions show cased on those games.

Hence, the invention calls for Step 25, where ORE enhances SGC experience for the garners in several ways. This step uses ORE to recommend a brand and/or LBS Affiliate sponsor for a SGC based on the profile of the participating garners and games. The brand and/or LBS Affiliate sponsor rewards and promotions are highlighted along with the leaderboard during the SGC to the participating garners and kibitzers. The more SGC goes viral in social networks, the more effective will be the sponsorships in SGC. This step also envisions a possible revenue share from such rewards and promotions generated from SGC with the creator of SGC.

Now, Step 46 of the invention describes a software platform embodiment of SEP. The software platform uses the best practices in online software development field to deliver rich social engagement experience to the gamers of the casual games and a rich toolkit for the brands, LBS Affiliates, game developers, SGC initiators, and the SEP ecosystem administrators as shown in FIG. 11 through FIG. 46.

Figure 11:
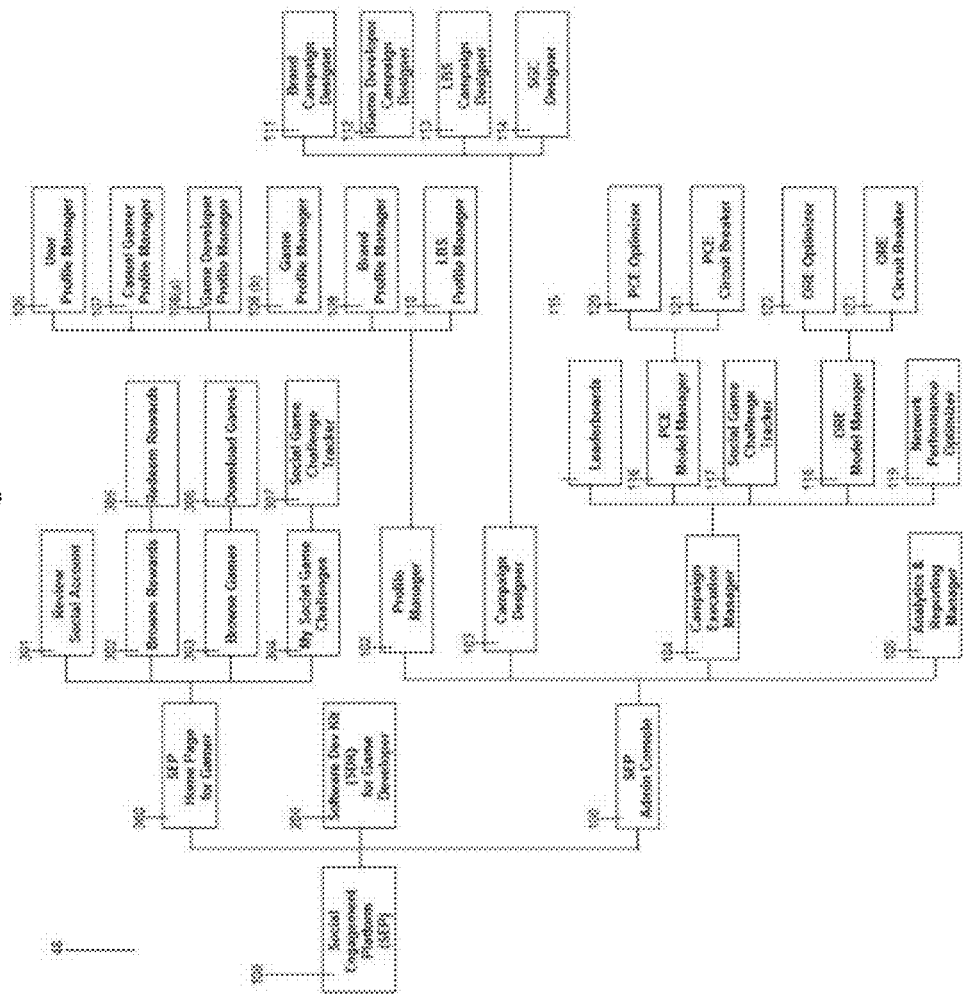
FIG. 11 shows the method step 46 of 'SEP online platform schematic overview' listing the SEP modules that can work on any computing device that has memory, processor, storage, display unit, and an input device including but not limited to personal computer or smart phone or personal digital assistant.

FIG. 11 provides an overview of the SEP software platform that can be accessed online using a web browser, on any mobile device that is capable of displaying a browser, or in any social network application that provides interfaces to show web pages. The illustrative software platform embodiment of SEP consists of 36 pages, and is organized into three sections—Gamer Experience, Game Developer Experience, and Administrator Experience.

Figure 12:
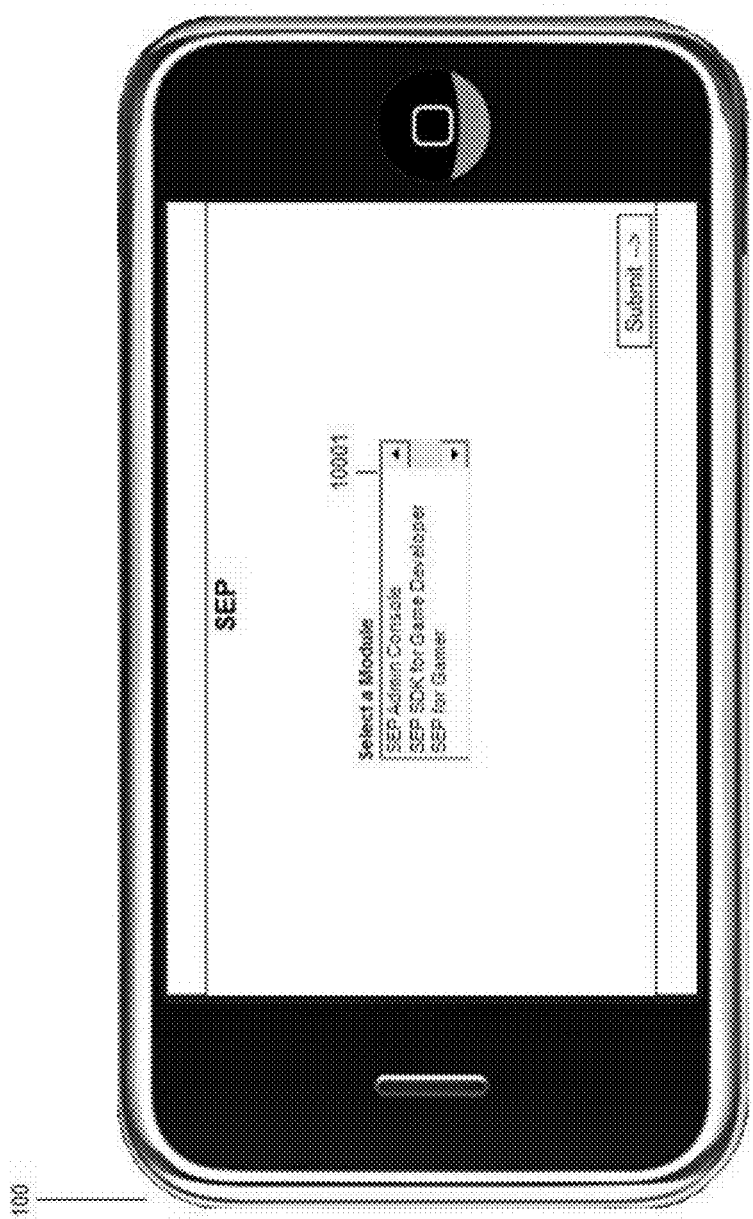
FIGS. 12 through 46 below depict a possible embodiment of the invention described in the method step 46 further as an illustration, though the scope of this method does potentially include several other technically feasible ways of building a web enabled software platform as practiced in the field.

Page 100 in FIG. 12 is the main menu (10001) of the platform where a user can select one of the gamer, game developer, or administrator experience based on the role assigned to the user.

Figure 13:
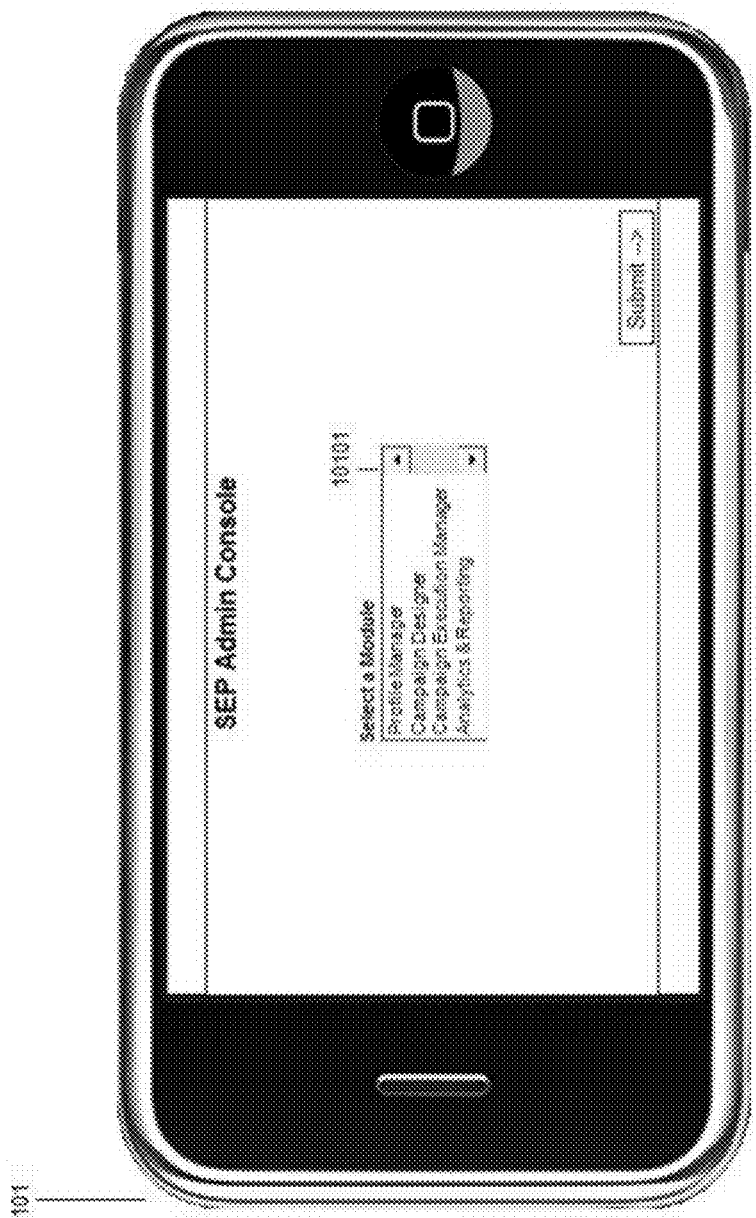

Page 101 in FIG. 13 shows the Admin Console main menu (10101) from which the administrator can access the User Profile Manager, Campaign Designer, Campaign Execution Manager, or Analytics & Reporting modules.

Figure 14:
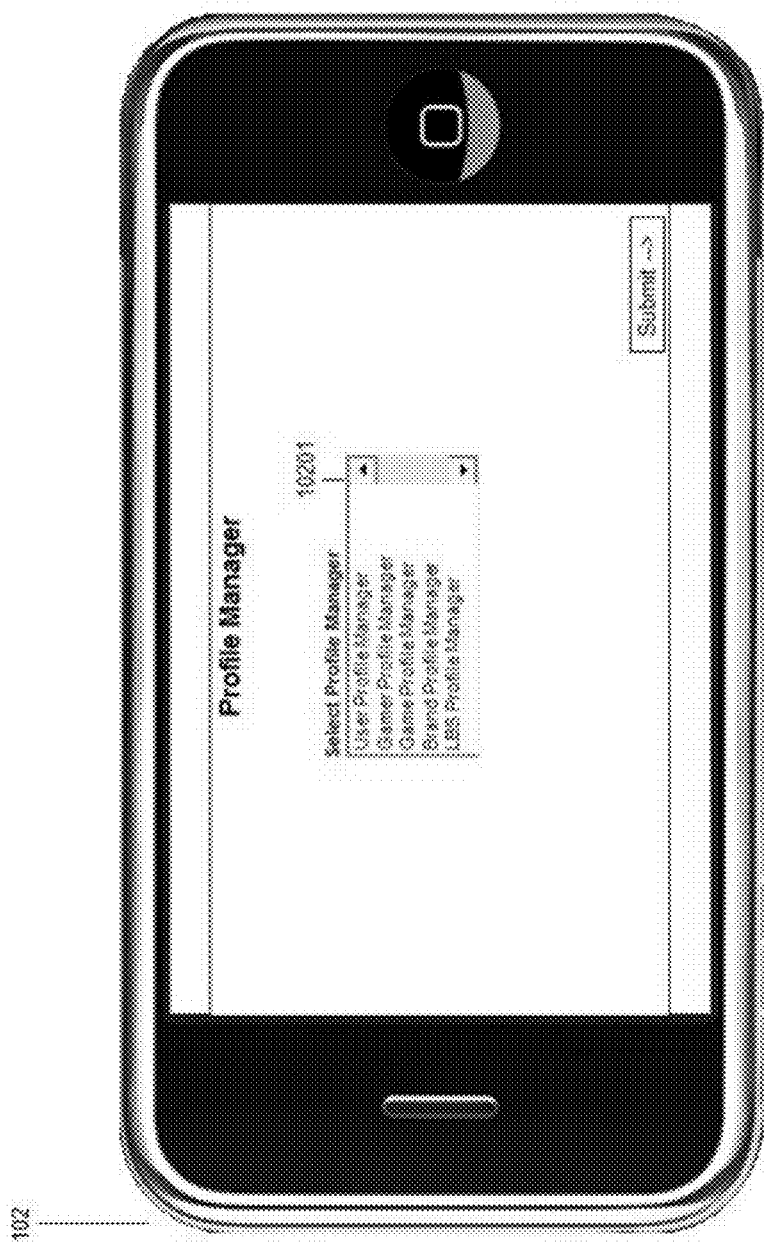

Page 102 in FIG. 14 shows the Profile Manager menu (10201) from which an SEP administrator first needs to create and manage users with different roles using User Profile Manager, Game Developer Profile Manager, Game Profile Manager, Brand Profile Manager, and LBS Affiliate Manager modules.

Figure 15:
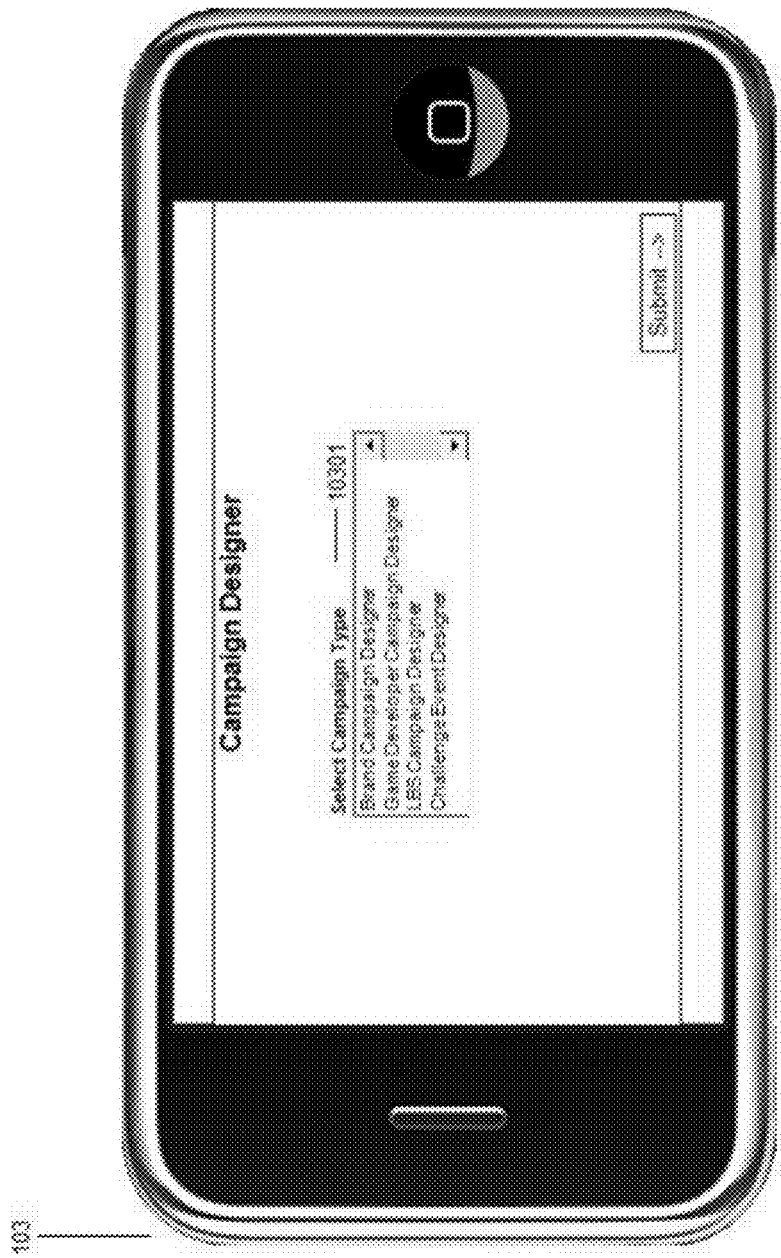

Page 103 in FIG. 15 shows the Campaign Designer menu (10301) from which a user with proper role can access Brand Campaign Designer, Game Developer Campaign Designer, LBS Campaign Designer, or Challenge Event Designer modules.

Figure 16:
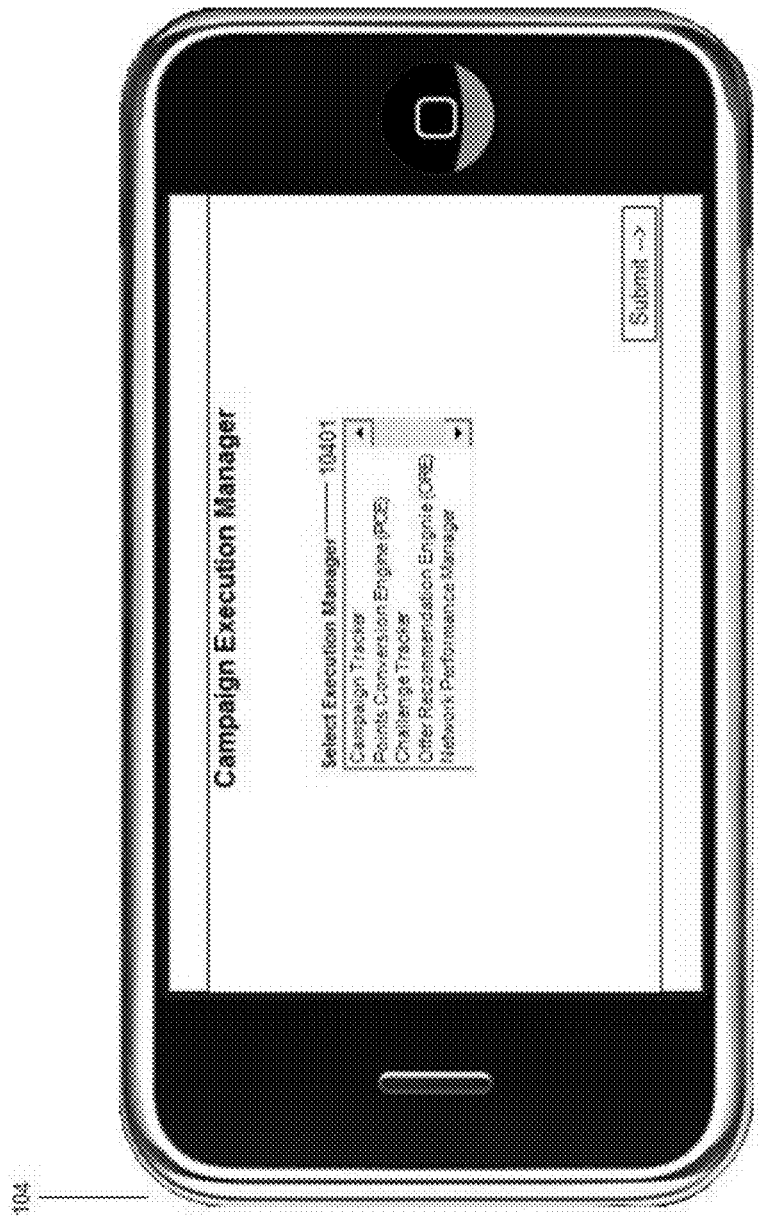

Page 104 in FIG. 16 shows the Campaign Execution Manager menu (10401) from which user with proper role can access Campaign Tracker, points conversion engine (PCE), Challenge Tracker, offers Recommendation Engine (ORE), or Network Performance Manager modules.

Page 105 in FIG. 17 shows the Analytics & Reporting module of SEP. The field 10501 shows the UserID. Based on the role of the user, only the reports that are accessible to the roles of the user will be displayed on this page for access. Field 10502 allows the user to select from a list of operational reports below. Some illustrative operational reports include but not limited to SEP Ecosystem Operations Summary 10503, Game Developer Campaigns Summary 10504, Brand Campaigns Summary 10505, LBS Affiliates Campaigns Summary 10506, My Game Challenges Summary 10507, Brand Campaign Details 10508, Game Developer Campaign Details 10509, LBS Affiliate Campaign Details 10510, Game Challenge Details 10511, and User Activity Details 10512. The user with SEP administrator role can access the available Optimization Reports 10513 including but not limited to the following reports: PCE Models Summary 10514, PCE Model Details 10515, ORE Models Summary 10516, ORE Model Details 10517, and Network Performance 10518.

Figure 18:
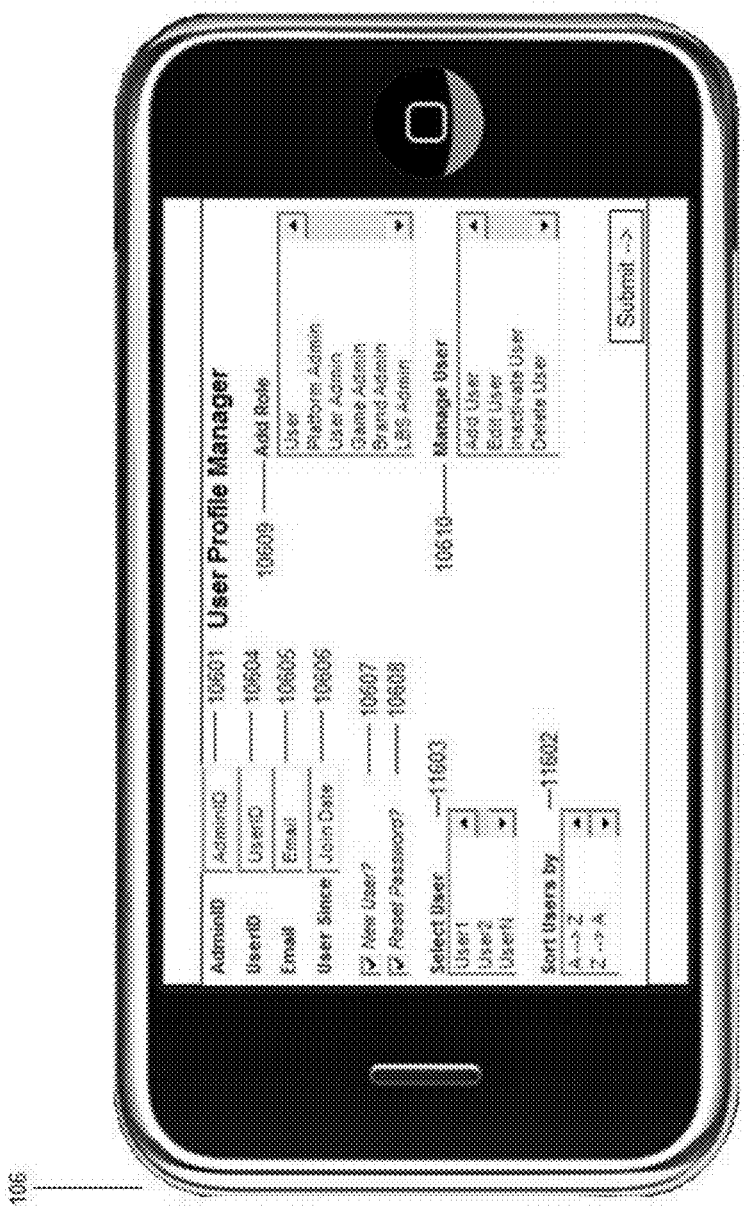

Page 106 in FIG. 18 shows the User Profile Manager module of SEP with AdminID field 10601 identifying the administrator. The administrator can sort the list of users from the selection box 11602 and select a user from the list in the selection box 10603. The SEP platform will then show User ID 10604, User Email 10605, and User Since date 10606. The admin then reset the password of the selected user by checking the field 10608. Instead, the user administrator can check on New User field 10607, and the SEP platform will fill in the fields of User ID and User Since fields. The administrator has to manually enter the email of the new user, add one or more roles from the multi-selection menu 10609. The administrator can also change the status of a user in the single select menu 10610 to edit user profile such as email, inactivate user, or delete user.

Figure 19:
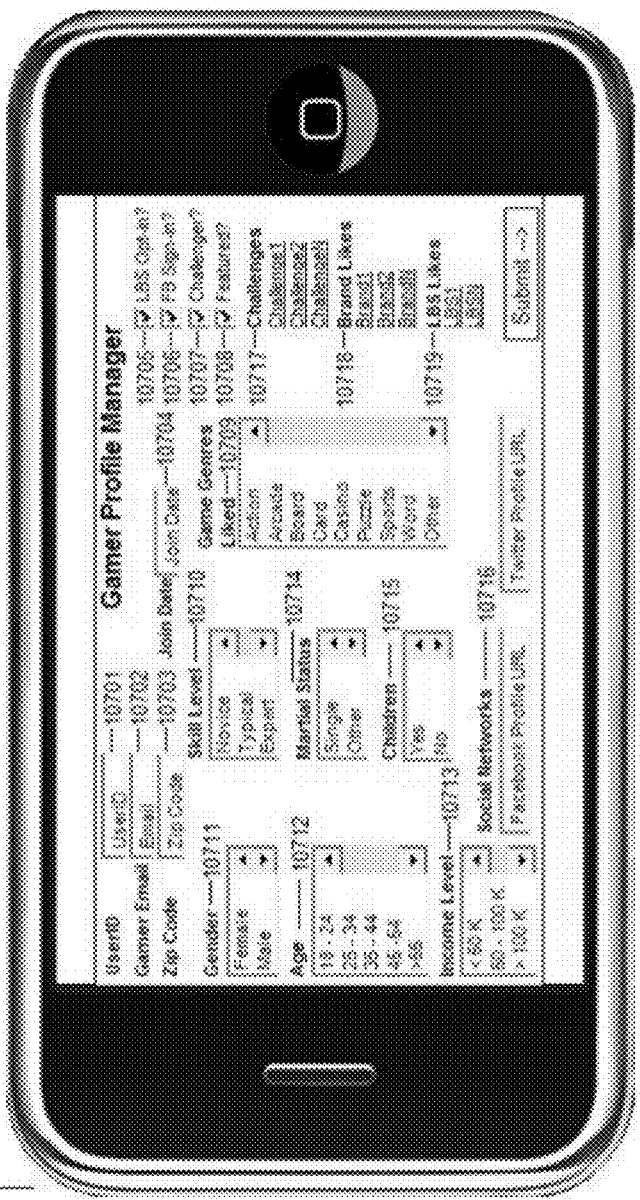

Page 107 in FIG. 19 shows Gamer Profile Manager module of SEP. A new user is by default treated as a simple user, which is a gamer. Once a user admin assigns the User role to the new user, the application control automatically moves to page 107, which enables the capture of gamer profile. SEP platform will display the UserID and Join Date automatically. The gamer can then enter Gamer Email 10702 and Zip code 10703. Gamer can then opt-in for several user features such as LBS opt-in 10705, Facebook sign-in 10706, ability to launch SGC 10707, and choose to be considered for featured gamer status 10708. Gamer will then be required to select from a multi-select menu 10709 Game Genres of interest. The gamer is also requested to self-identify Game Skill Level 10710, Gender 10711, Age Range 10712, Income Level 10713, Marital Status 10714, and Children 10715. In addition, gamer is requested to enter social networking information 10716 by entering Facebook Profile URL and Twitter Profile URL. The SEP platform over time will keep updating the Gamer Profile page of a gamer whenever a gamer initiates or participates or kibitzes in a SGC 10717. In addition, whenever a gamer likes a brand or LBS Affiliate, the SEP platform will display the list of such brands and LBS affiliates in the gamer profile page.

Page 108(*a*) in FIG. 20 shows the Game Developer Profile Manager module of SEP. By entering the Game Developer ID or email, a SEP Administrator or the game developer can access this module. Based on the game developer ID, the SEP platform will display Game Developer ID 10801, No of Games registered in SEP by that game developer 10802, and the date on which the game developer joined SEP. In addition, SEP platform will display the list of games registered in SEP by this game developer 10804. If no game of the game developer is yet registered, the game developer can check the Add game box 10804, which will prompt the user to go to Page 109 described below. The game developer is then asked identify the game genres their games belong to in the multi-select menu 10805. Next, the game developer is asked to identify the Objective 10806, Strategy 10807, Contact Email 10808, and social networks 10809. The game developer can enter Facebook fan page and twitter handle of the game developer. If a game developer has set up marketing and advertising campaigns in SEP, the list of such campaigns show up in the game developer page 10810.

Page 108(*b*) in FIG. 21 now shows the Game Profile Manager module of SEP. Game developer or SEP administrator can access this module by entering GameID 10811 or Game Email 10813. The game developer then enters the cumulative downloads for this game 10812, the launch date of the game 10817, Game Genre 10818, Game Payment Type 10814, the operating systems supported by the game 10815, the game URL 10823, and social network info 10824 such as Facebook fan page URL. In addition, the game developer discloses the intentions related to the level of embeddedness of the game within SEP ecosystem such as whether the game allows In-game Redemption 10819, is LBS Enabled 10820, is open to being a Featured Game, and whether it is a multi-player game. Finally, the game developer has to provide the details related to the game achievements in a table 10816 such as maximum number of levels, maximum points assigned in each game level, typical game playing duration for the maximum points in each level, and the degree of difficult of each level. The degrees of difficulty assigned each of the levels in the game need to add up to 100%. This data ensures that PCE computes Game Normalization Factor 0 for all points based game. In case the game is non-points based, the game developer has to check the filed 10823. In such a case, SEP platform will display an additional column for each game level—the frequency of occurrence of game level achievements per 1 minute of game play. Using this data, as described in FIG. 2(*c*), SEP can provide the needed inputs to estimate PCE model. In addition, the game developer has to enter the game URL 10824 and the social networking information related to the game such as Facebook fan page of the game.

Figure 22:
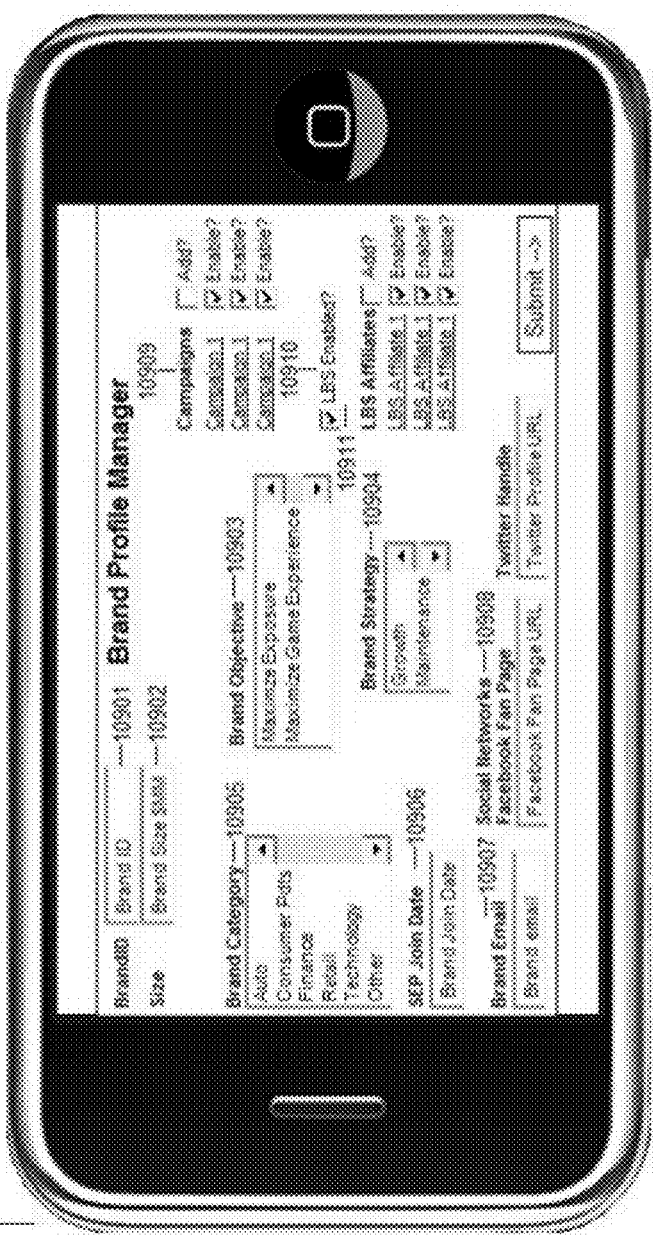

Page 109 shown in FIG. 22 describes the Brand Profile Manager module of SEP. Brand manager or SEP administrator needs to enter BrandID 10901 or Brand Email 10907 to access this module. The brand manager can enter Brand Objective 10903, Brand Strategy 10904, Brand Category 10905, Join Date 10906, Brand Email 10907, and Social Networks of Brand 10908 such as Facebook fan page or twitter handle. If brand has already set up marketing and advertising campaigns, the SEP platform will display those campaigns 10909. If brand managers wants to initiate a new campaign, brand manager can check a box in 10909 to go to Campaign Designer page 111 described below. If the brand is interested in partnering with LBS Affiliates, it can indicate so by checking the box 10910. If a brand manager wants to add a LBS Affiliate partner, it can check a box 10911 to select from a list of LBS Affiliates in SEP. The SEP platform will then list all the LBS Affiliates with whom brand has partnerships.

Page 110 shown in FIG. 23 is the LBS Affiliate Profile Manager module of SEP and is very similar to that of the Brand Profile Manager module. LBS Affiliate manager or SEP administrator can access this module by enter LBS AdminID or email. The LBS Affiliate manager can then identify LBS Affiliate category 11002, LBS Objective 11003, LBS Strategy 11004, LBS Size 11005, SEP Join Date 11006, LBS Email 11007, and its Social Networks 11008 such as its Facebook fan page and Twitter handle. The LBS Affiliate manage can add brand partners 11010 by checking the box and select a brand from the list of brands participating in SEP. After that, the LBS Affiliate manager can check on Campaign Add box 11009 to go the LBS Affiliate Campaign Designer Page 113. SEP platform will automatically display on this page the existing campaigns and brand partnerships of the LBS Affiliate.

Page 111 shown in FIG. 24 is the Brand Campaign Manager module of SEP. A brand manager or SEP administrator can access this module using brand ID or brand email. The SEP platform will display the Brand ID 11101 and Campaign ID 11102. Brand manager then needs to enter campaign Start Date 11103, End Date 11104, Brand Budget 11110, Co-Marketing Budget for campaign 11119, Campaign Goal 11111, Campaign Frequency 11115, and if the campaign auto renews 11114. The brand manager needs to complete the commitments of co-marketing partners such as game developers or LBS Affiliates in the table 11119 for the campaign. SEP platform will calculate the total campaign budget 11109. The brand manager also indicates if this campaign is PPC (Pay Per Click or Action) or delivery of impression. The default is PPC but if the brand manager selects the Impressions check box 11112 the campaign will be designated as impressions based. The brand manager also needs to indicate if this campaign is a Race2Win contest by checking on the box 11113. Now, brand manager makes a very important determination by associating an ORE model with the campaign by sorting available ORE models in SEP 11106 and selecting from that list an ORE model 11107. The sorting of ORE models can be based on popularity or alphabetic. Once a model is selected, SEP platform will display ModelID 11108. Brand manager can keep the default check mark in box 11105 to allow SEP to auto select an ORE model for the campaign. Next, brand manager needs to select from available campaign tracking methods 11117 and notification methods 11118. Finally, brand manager needs to associate the campaign to one or more segments defined in SEP 11116.

Figure 25:
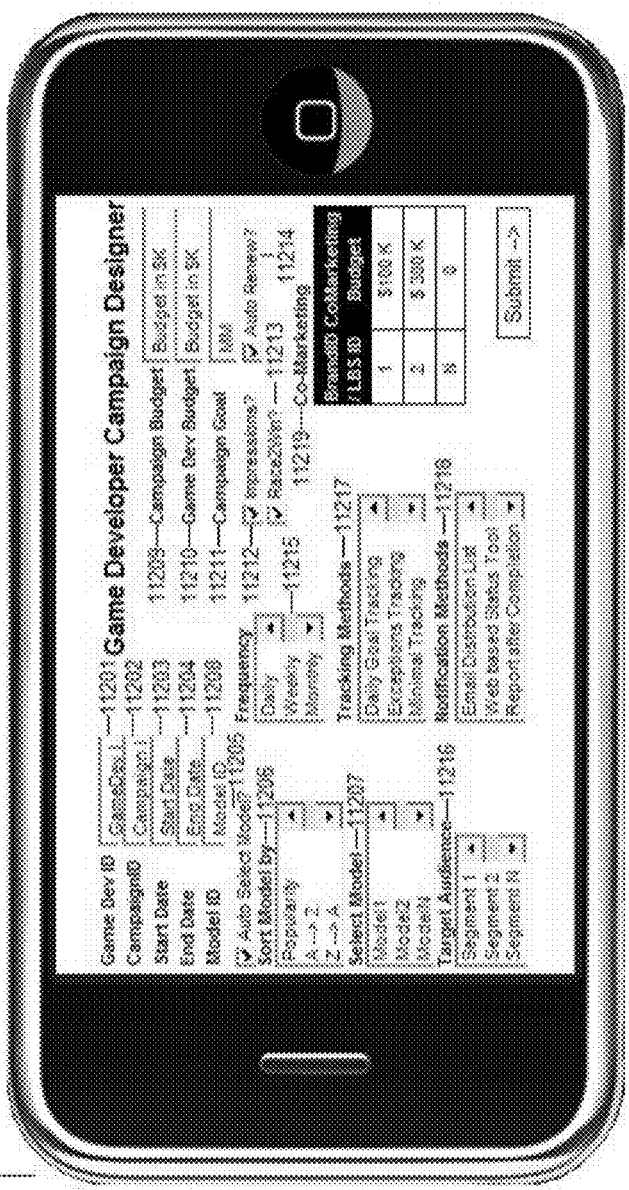

Page 112 shown in FIG. 25 is the Game Developer Campaign Manager module of SEP. A game developer or SEP administrator can access this module using game developer ID or email. The SEP platform will display the game developer ID 11201 and Campaign ID 11202. Game developer then needs to enter campaign Start Date 11203, End Date 11204, Game Developer Budget 11210, Co-Marketing Budget for campaign 11219, Campaign Goal 11211, Campaign Frequency 11215, and if the campaign auto renews 11214. The brand manager needs to complete the commitments of co-marketing partners such as brands or LBS Affiliates in the table 11219 for the campaign. SEP platform will calculate the total campaign budget 11209. The game developer also indicates if this campaign is PPC (Pay Per Click or Action) or delivery of impression. The default is PPC but if the game developer selects the Impressions check box 11212 the campaign will be designated as impressions based. The brand manager also needs to indicate if this campaign is a Race2Win contest by checking on the box 11213. Now, the game developer makes a very important determination by associating an ORE model with the campaign by sorting available ORE models in SEP 11206 and selecting from that list an ORE model 11207. The sorting of ORE models can be based on popularity or alphabetic. Once a model is selected, SEP platform will display ModelID 11208. Game developer can keep the default check mark in box 11205 to allow SEP to auto select an ORE model for the campaign. Next, game developer needs to select from available campaign tracking methods 11217 and notification methods 11218. Finally, game developer needs to associate the campaign to one or more segments defined in SEP 11216.

Page 113 shown in FIG. 26 is the LBS Affiliate Campaign Manager module of SEP. An LBS Affiliate manager or SEP administrator can access this module using brand ID or brand email. The SEP platform will display the LBS ID 11301 and Campaign ID 11302. LBS Affiliate manager then needs to enter campaign Start Date 11303, End Date 11304, LBS Affiliate Budget 11310, Co-Marketing Budget for campaign 11319, Campaign Goal 11311, Campaign Frequency 11315, and if the campaign auto renews 11314. The LBS Affiliate manager needs to then complete the commitments of co-marketing partners such as game developers or brands in the table 11319 for the campaign. SEP platform will calculate the total campaign budget 11309. The LBS Affiliate manager also indicates if this campaign is PPC (Pay Per Click or Action) or delivery of impression. The default is PPC but if the LBS Affiliate manager selects the Impressions check box 11312 the campaign will be designated as impressions based. The LBS Affiliate manager also needs to indicate if this campaign is a Race2Win contest by checking on the box 11313. Now, LBS Affiliate manager makes a very important determination by associating an ORE model with the campaign by sorting available ORE models in SEP 11306 and selecting from that list an ORE model 11307. The sorting of ORE models can be based on popularity or alphabetic. Once a model is selected, SEP platform will display ModelID 11308. LBS Affiliate manager can keep the default check mark in box 11305 to allow SEP to auto select an ORE model for the campaign. Next, LBS Affiliate manager needs to select from available campaign tracking methods 11317 and notification methods 11318. Finally, LBS Affiliate manager needs to associate the campaign to one or more segments defined in SEP 11316.

Figure 27:
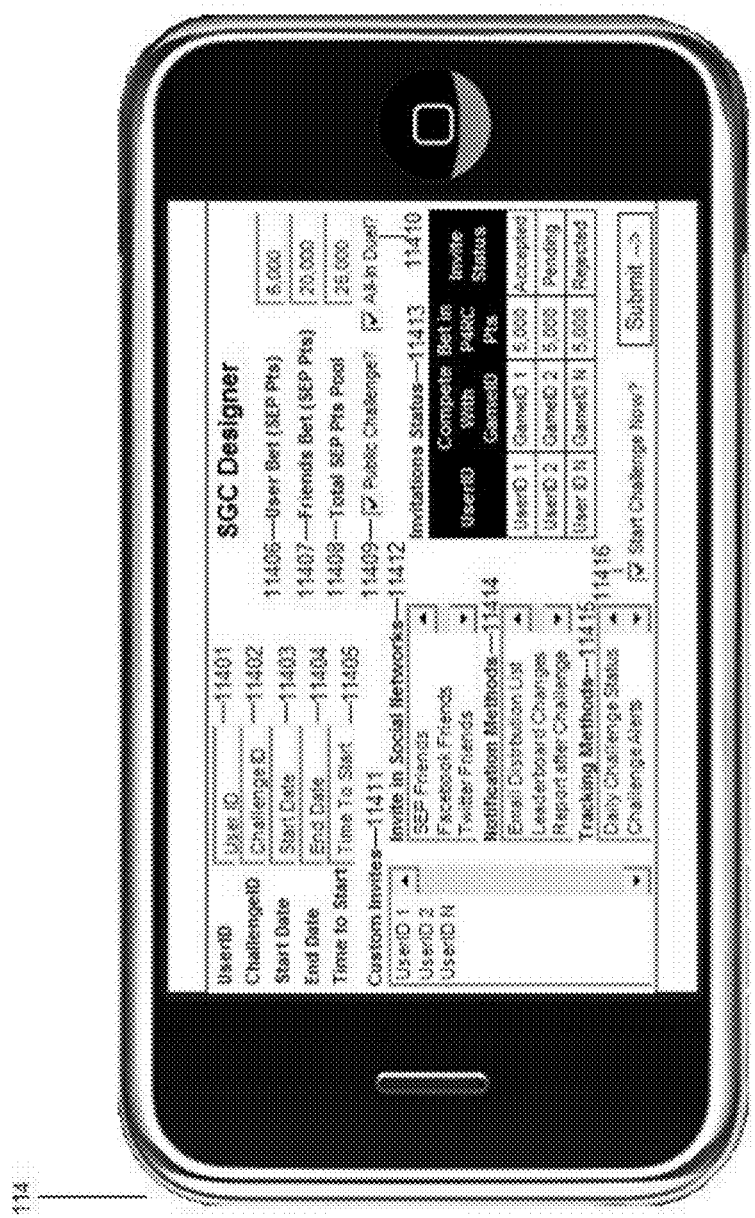

Page 114 shown in FIG. 27 is the SGC Designer module of SEP. Any gamer can initiate a SGC campaign using this module, which is accessed by entering user ID or email. The SEP platform will auto fill UserID 11401 and Challenge ID 11402. The gamer needs to enter the SGC Start Date 11403, End Date 11404, and Gamer bet of SEP points for the challenge 11406. The gamer will also indicate if the SGC is a public challenge 11409 and if it is an All-in duel 11410. The gamer can then send invitations to his or her friends in social networks such as Facebook, Twitter, or SEP 11412. In addition, the gamer can send individual invitations to his or her friends in SEP 11411. The table 11412 is updated in real time to provide a status of accepts or rejects or pending for the all the users to whom the invitations have been sent. If enough accepts are received, the gamer can check on 11416 to confirm the launch of SGC, and after that action, no new invitees to that SGC are allowed. However, any invitee can potentially choose to become a kibitzer and track the SGC leaderboard to follow the SGC.

Page 115 shown in FIG. 28 is the Campaign Tracker module of SEP. Any brand manager or LBS Affiliate or game developer can use this module to track the execution of his or her campaign. They can access this page by entering the User ID 11501. SEP platform will allow the user to filter their campaigns 11502 and select a campaign 11503 for tracking. The SEP platform will now display Campaign ID 11504, Start Date 11505, End Date 11506, Budget 11507, Amount Spent so far 11508, and % of Goal Achieved 11509. The user can now review the campaign metrics 11510 that shows campaign's actual outcomes against the estimated for the duration for the campaign since launch. In addition, SEP platform will display the profile of respondents 11511 in terms of Segments, Age Range, and Gender. If the user is not satisfied with the performance of the campaign, the user can request SEP to re-estimate the ORE Model 11512, which hopefully, will yield better results.

Figure 29:
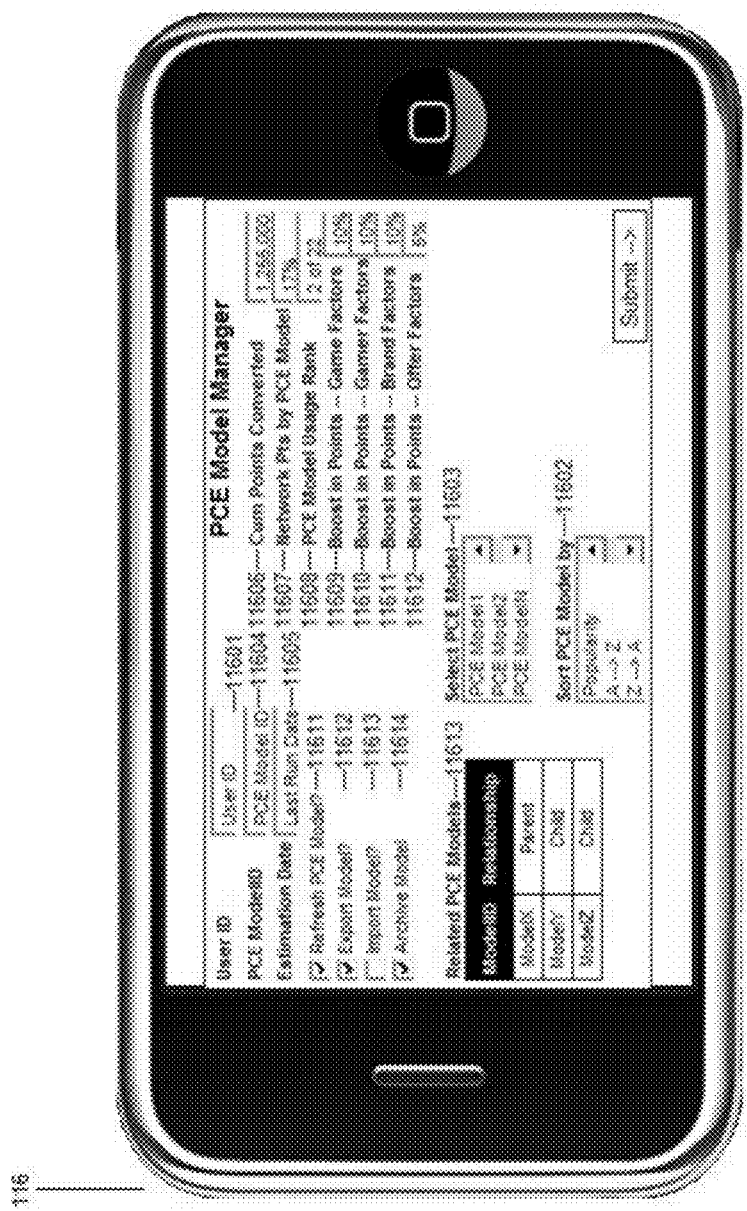

Page 116 shown in FIG. 29 is the PCE Model Manager module of SEP. Only SEP administrator will have access to this module by entering User ID 11601. The SEP administrator can sort available PCE models 11602 by popularity, alphabetically ascending, or alphabetically descending order, and select a PCE model 11603 for further scrutiny. SEP platform will now display PCE Model ID 11604 and the last optimization date for the PCE model 11605. In addition, this page displays the cumulative points converted in the ecosystem by this PCE model 11606, % of SEP points in the ecosystem allocated by this PCE model 11607, and rank of this PCE model in SEP in terms of the cumulative points allocated in the SEP ecosystem 11608. This page also allows SEP administrator to set up global PCE policies such as the maximum boost in PCE model due to game factor 11609, gamer factors 11610, brand/LBS factors 11611, and offer factors 11612. The Related PCE Models table in this page 11613 also indicated relationship of this PCE model to other related PCE models. The SEP administrator can now perform typical administrative task such as exporting the PCE model 11612, import the PCE model 11613, and archive the PCE model 11614. Periodically, SEP admin also might refresh 11611 and re-estimate the PCE model to ensure that it remains relevant as the market conditions in SEP ecosystem evolve over time.

Figure 30:
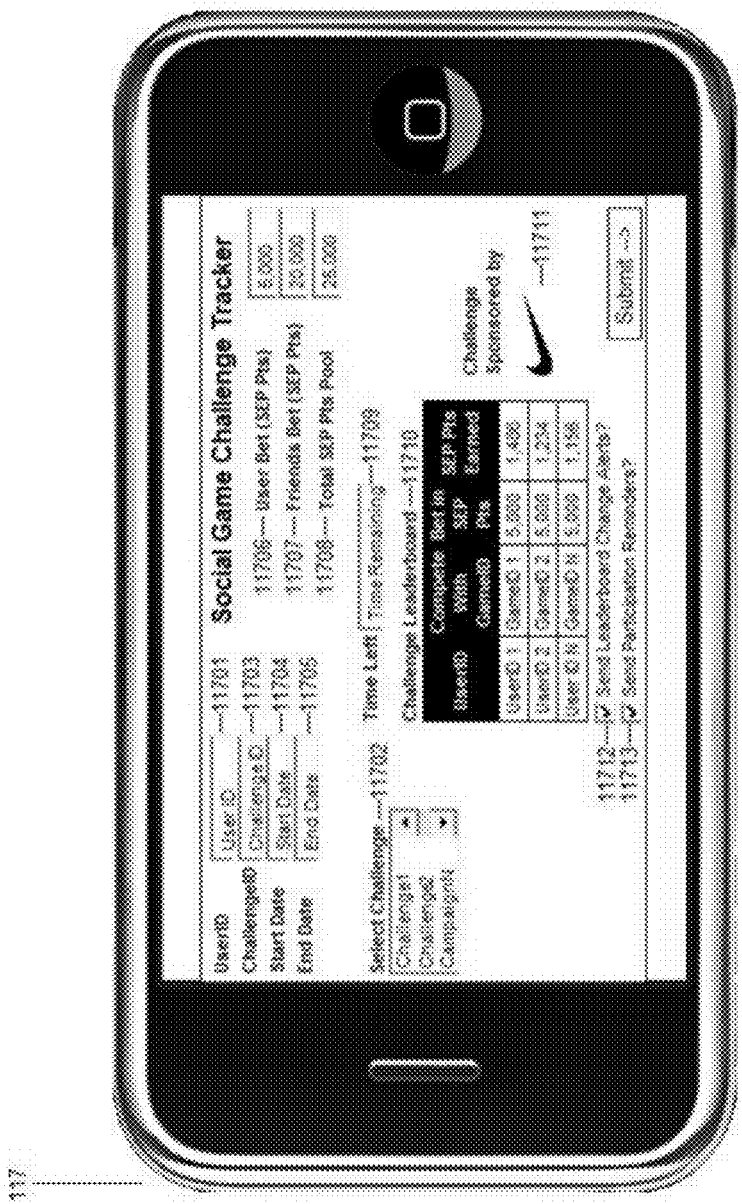

Page 117 in FIG. 30 is the Social Game Challenge (SGC) Tracker module of SEP. The gamer who created the SGC can access this module by entering UserID 11701. The gamer can then select a challenge from the list of his or her challenges 11702. SEP platform will now display Challenge ID 11703, Start Date 11704, End Date 11705, User Bet 11706, Friends Bets 11707, Total SEP points Pool 11708, Time Left in SGC 11709, Challenge Leaderboard 11710, and a reward or promotion by the sponsor of the SGC. The SGC creator has the option to suppress or reinitiate alerts related to SGC Leaderboard changes 11712 and send participation reminders 11713 to ensure all participants are actively participating in SGC.

Figure 31:
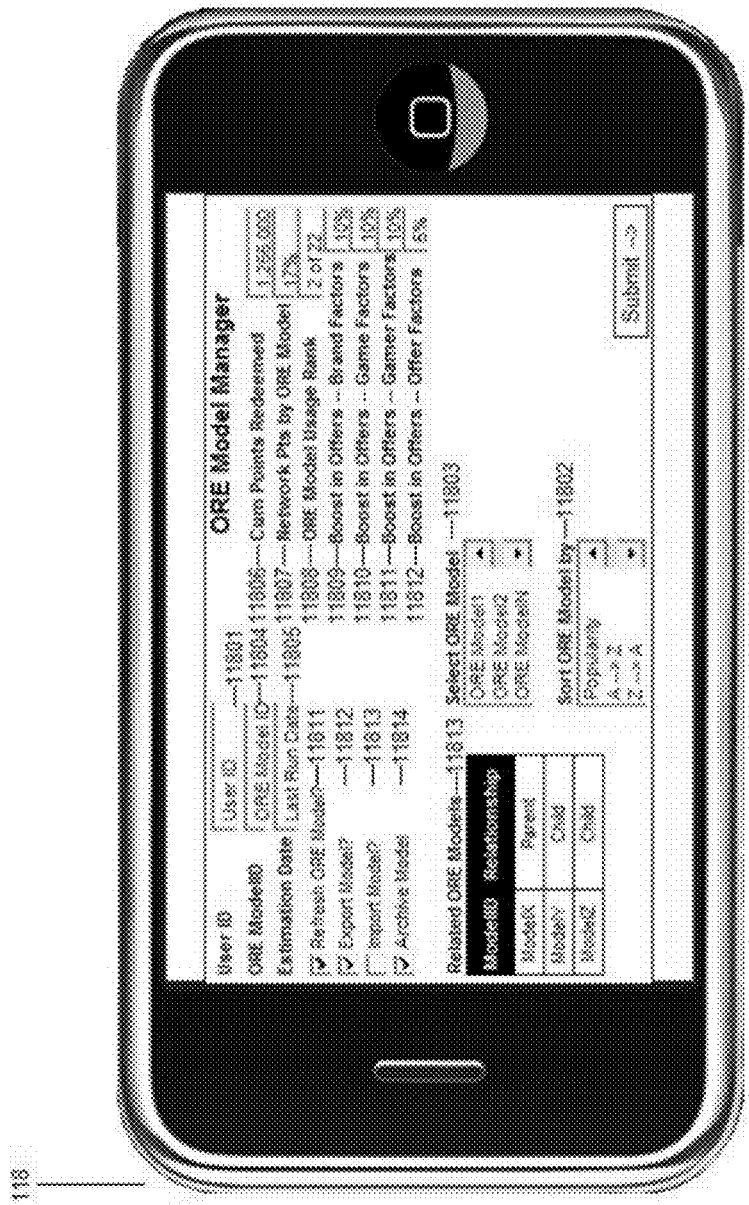

Page 118 shown in FIG. 31 is the ORE Model Manager module of SEP. Only SEP administrator will have access to this module by entering User ID 11801. The SEP administrator can sort available ORE models 11802 by popularity, alphabetically ascending, or alphabetically descending order, and select an ORE model 11803 for further scrutiny. SEP platform will now display ORE Model ID 11804 and the last optimization date for the ORE model 11805. In addition, this page displays the cumulative points redeemed in the ecosystem by this ORE model 11806, % of SEP points in the ecosystem redeemed by this ORE model 11807, and rank of this ORE model in SEP in terms of the cumulative points redeemed 11808. This page also allows SEP administrator to set up global ORE policies such as the maximum boost in ORE model due to brand/LB S factors 11809, game factors 11810, gamer factors 11811, and offer factors 11812. The Related ORE Models table in this page 11813 also shows the relationship of this ORE model to other related ORE models. The SEP administrator can now perform typical administrative task such as exporting the ORE model 11812, import the ORE model 11813, and archive the ORE model 11814. Periodically, SEP admin also might refresh 11811 and re-estimate the ORE model to ensure that it remains relevant as the market conditions in SEP ecosystem evolve over time.

Figure 32:
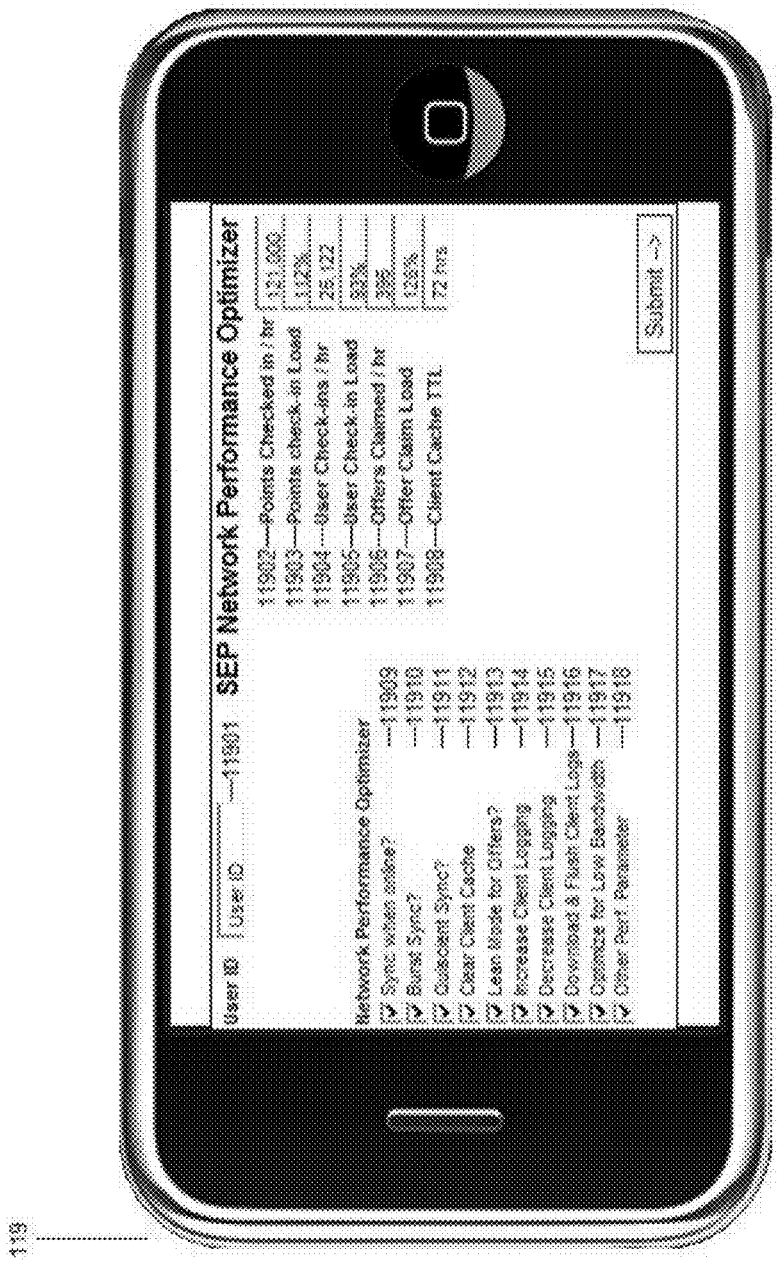

Page 119 shown in FIG. 32 is the SEP Network Performance Optimizer module. Only SEP administrator will have access to this module by entering User ID 11901. This module will display a list of real time heartbeat metrics of SEP ecosystem such as: points Checked-in per hour 11902, points Check-in Load compared to rated metric 11903, User Check-ins per hour 11904, User Check-in Load compared to rated metric 11905, offers Claimed per hour 11906, Offer Claims Load compared to rated Metric 11907 and Client Cache TTL 11908. This module also displays Network Performance Optimizer parameters that a SEP administrator can change as needed including: Sync when offline 11909, burst sync 11910, Quiscient Sycn 11911, Clear Client Cache 11912, Lean Mode for offers 11913, Increase Client Logging level 11914, Decrease Client Logging level 11915, Download & Flush Client Logs 11916, and Optimize for Low Bandwidth 11917. As and when needed, the SEP administrator can add additional performance tuning parameters by clicking 11918 check box and adding the parameter. The newly added parameter can be a binary flag or a rated value with minimum and maximum thresholds for that variable. This approach ensures that SEP platform matures gradually over time to cope with the increasing performance management needs as the transactions volume in SEP grows.

Page 120 shown in FIG. 33 is the PCE Model Optimizer module that can only be accessed by SEP administrator by entering UserID 12001. The administrator can sort available PCE models 12002 and select a PCE model 12003 for optimization. SEP platform then displays Model ID 12004, the last model estimation date 12005, cumulative points converted by the model in SEP ecosystem 12006, % of SEP points by this PCE model 12007, and popularity of PCE model compared to other PCE models 12008. SEP administrator now can specify the accuracy of the PCE model in terms of the Adjusted Goodness of Fit index 12009 and speed of learning in PCE model estimation using back propagation algorithm 12010. This module allows the SEP administrator to include or exclude certain game factors 12011 and gamer factors 12018. Gamer factors can include but not limited to Game Genre 12012, Age of Game in days after release 12013, Game Downloads after release 12014, if the game is paid for download 12015, and if the game is paid as subscription 12016. In addition, this module allows a SEP administrator to include or exclude some gamer factors including but not limited to Gamer Skill 12019, Gamer Gender 12020, Gamer Age 12021, Gamer Income 12022, whether gamer is a Deal Hunter 12023. The SEP platform allows for learning by SEP administrators so that they can add additional game factors 12017 or additional gamer factors 12014. This approach ensures that SEP platform matures gradually over time to cope with the increasing complexity of the PCE models as the transactions volume in SEP grows.

Figure 34:
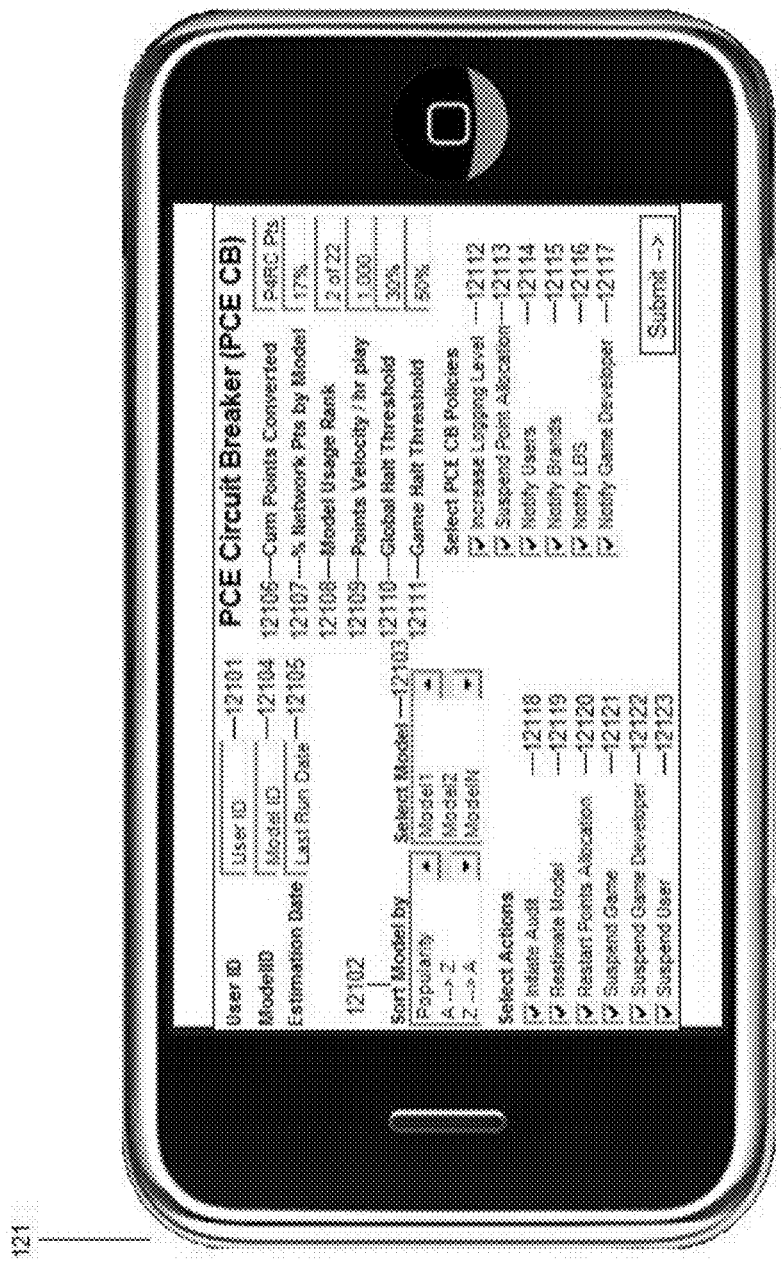

Page 121 shown in FIG. 34 is the PCE circuit breaker (PCE CB) module that can only be accessed by SEP Administrator by entering UserID 12101. The SEP administrator can sort models by popularity or alphabetic order 12102, and select a model 12203 for tuning its PCE CB. The SEP platform now shows PCE Model ID 12104, last date on which PCE model was estimated 12105, Cumulative points Converted 12106, % of SEP ecosystem points by this PCE Model 12107, PCE Model Popularity compared to the other models based on the cumulative number of points converted 12108. SEP administrator can configure a few important global parameters and PCE CB policies in this module. The global parameters that can be set up include points Velocity per hour of Play of a game in SEP 12109, Global Halt Threshold % 12110 and Game Halt Threshold 12111. Each of these thresholds indicates that if the SEP points allocation velocity in the model is more than the parameter 12110 or 12111, then PCE model will be halted. During such halts, all PCE points allocated to gamers in exchange of the game points checked-in will be provisional subject to an audit. The PCE CB policies including but not limited to the following will help SEP administrator mange the fraud in the SEP ecosystem: Increase Logging Level 12112, Suspend points Allocation 12113, Notify Users 12114, Notify brands 12115, Notify LBS Affiliates 12116, Notify Game Developer 12117, any other policy that is appropriate in the future. In addition to setting PCE CB policies, SEP administrator can also initiate some actions to prevent fraud including but not limited to the following: Initiate Audit 12118, Re-estimate Model 12119, Restart points Allocation 12120, Suspend Game 12121, Suspend Game Developer 12122, Suspend User 12123, and any other action that is appropriate in the future.

Figure 35:
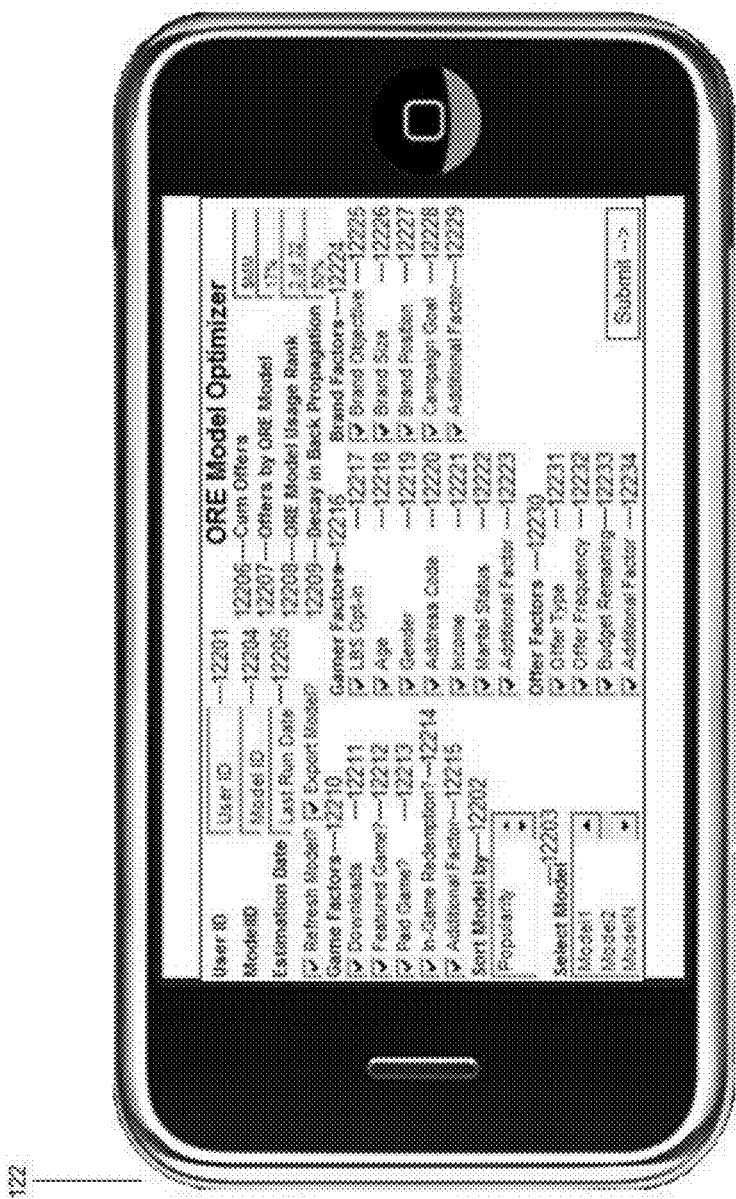

Page 122 shown in FIG. 35 is the ORE Model Optimizer module that can only be accessed by SEP administrator by entering UserID 12201. The administrator can sort available ORE models 12202 and select a ORE model 12203 for optimization. SEP platform then displays Model ID 12204, the last model estimation date 12205, cumulative points converted by the model in SEP ecosystem 12206, % of SEP points by this ORE model 12207, and popularity of ORE model compared to other ORE models 12208. SEP administrator now can specify the speed of learning in ORE model estimation using back propagation algorithm 12209. This module allows the SEP administrator to include or exclude certain game factors 12210, gamer factors 12218, brand factors 12224, and offer factors 12230. Gamer factors can include but not limited to Game Downloads 12211, Featured Game 12212, Paid Game 12213, In-game Redemption 12214 and additional factor 12215 that can be added later as our understanding of SEP ecosystem and ORE model optimization improve over time. Next, SEP administrator can include or exclude some gamer factors 12216 including but not limited to LBS opt-in 12217, Gamer Age 12218, Gamer Gender 12219, Gamer Address Code 12220, Gamer Income 12221, Game Marital Status 12222, and any additional factor 12223 that can be added later based on the learning. The SEP administrator can now include or exclude brand factors 12224 including but not limited to following brand factors: Brand Objective 12225, Brand Size 12226, Brand Position 12227, Campaign Goal 12228, and any other factor 12229. Finally, SEP administrator can include or exclude some offer factors 12230 including but not limited to: Offer Type 12231, Offer Frequency 12232, Budget Remaining 12233, and an additional factor 12234.

Figure 36:
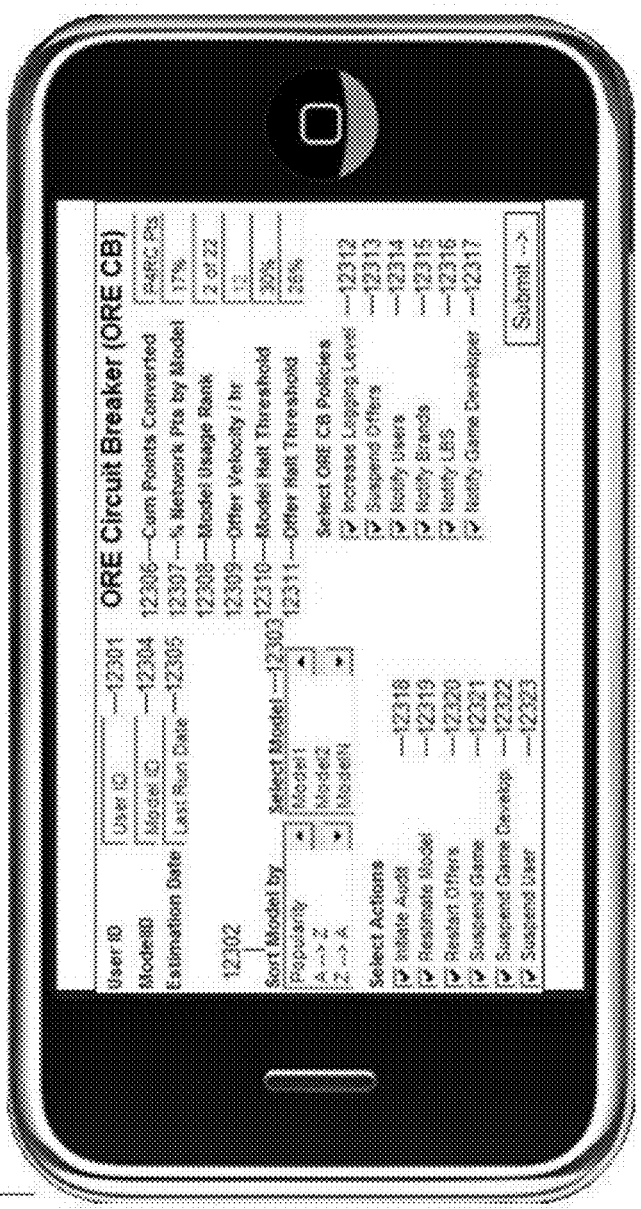

Page 123 shown in FIG. 36 is the ORE circuit breaker (ORE CB) module that can only be accessed by SEP Administrator by entering UserID 12301. The SEP administrator can sort models by popularity or alphabetic order 12302, and select a model 12203 for tuning its ORE CB. The SEP platform now shows ORE Model ID 12304, last date on which ORE model was estimated 12305, Cumulative points Converted 12306, % of SEP ecosystem points by this ORE Model 12307, ORE Model Popularity compared to the other models based on the cumulative number of points converted 12308. SEP administrator can configure a few important global parameters and ORE CB policies in this module. The global parameters that can be set up include offers Velocity per hour in SEP 12309, Global Halt Threshold % 12310 and Offer Halt Threshold 12311. Each of these thresholds indicates that if the offer velocity in the model is more than the parameter 12310 or 12311, then ORE model will be halted. During such halts, all offers will be made provisional subject to an audit. The ORE CB policies including but not limited to the following will help SEP administrator mange the fraud in the ORE: Increase Logging Level 12312, Suspend offers 12313, Notify Users 12314, Notify brands 12315, Notify LBS Affiliates 12316, Notify Game Developer 12317, any other policy that is appropriate in the future. In addition to setting ORE CB policies, SEP administrator can also initiate some actions to prevent fraud including but not limited to the following: Initiate Audit 12318, Re-estimate Model 12319, Restart offers 12320, Suspend Game 12321, Suspend Game Developer 12322, Suspend User 12323, and any other action that is appropriate in the future.

The next paragraphs describe the second section of the SEP online application that helps a game developer download SEP SDK and integrate the game into SEP. Page 200(a) shown in FIG. 37 provides four groups of parameters that a game developer can use in integrating the game into SEP: SEP Client configuration 20002, the embeddedness of game in SEP 20003, configuration of SGC 20004, and configuration of SEP access to gamer 20005. The SEP Client parameters include but not limited to: Allow Encryption in Client 20006, Allow Burst points in Check-in 20007, Clear Client Cache 20008, Bulk Export gamers 20009, Invite to SEP after Bulk Import 20010, Register to SEP after Bulk Export 20011, Optimize for Low Bandwidth 20012, and any other SEP client configurations that may be appropriate in the future. The SEP emeddedness parameters include but not limited to: Show Featured Brand Rewards 20013, Show Featured LBS Rewards 20014, Show Featured Games 20015, Show interstitial SEP Banners 20016, Show In-game SEP Banners 20017, Embed Brand Icons in Game 20018, Embed LBS icons in game 20019, and any other embeddeness factor that may be relevant in the future. The SGC parameters that SEP administrator can configure for SGC experience include but not limited to the following: Show SGC Invitees 20020, Allow SGC Invite Acceptance 20021, Show SGC Leaderboard 20022, Allow SGC Leaderboard Alerts, and any other SGC factors that may be relevant it the future. In addition, SEP administrator can configure the following SEP Access parameters to enable a gamer: Member Registers with SEP 20024, Member Redeems Rewards 20025, and Member sees SEP Account 20026, and any other parameters that might be relevant in the future to configure the access to SEP to gamer.

Page 200(b) in FIG. 38 provides an illustrative embodiment of the SDK within a game to connect that game with SEP. The focus of this invention is to help game developers monetize the interstitial media between game level transitions 20028. As soon as the congratulatory screen after a successful completion of a game level happens 20029, a gamer sees the game points accrued 20030 and corresponding SEP points allocated 20031 for those game points. An interface icon 20032 is provided on this game level transition screen. When a gamer presses the SEP icon, a pop up screen opens in which the SEP platform related services are made available to gamer on a mobile web browser. Gamer can then visit SEP mobile site on mobile device or on desktop or any personal digital assistant to review the Social Account of SEP points, the rewards available for redemption, and redeem rewards. Once this popup browser is closed, the gamer is seamlessly return to the game playing context to the next game level. In fact, the background music of game can still continue when gamer in interacting with SEP platform screens during such game level transitions.

Page 300 shown in FIG. 30 provides an illustrative embodiment of the SEP platform from the perspective of gamer. The gamer will have to select from a menu 30001 from one of the choices of Review Social Account, Browse Rewards, Browse Games, and Browse Social Challenges. The home page also includes several interesting social features such as featured offers, featured gamers, and featured games.

Page 301 shown in FIG. 40 provides an illustrative embodiment of the Social Accounts of the gamers in SEP. The account statement shows the number of SEP points accrued this period 30101, the number of SEP points exchanged to redeem rewards 30102, and SEP points balance 30103. The Social account also allows a gamer to filter points that are eligible for SGC, Race2Win, and other contents. If some SGC or Race2Win contests are within feasible range given the SEP points of the gamer, the SEP platform will alert gamer to earn the small amount of points quickly so that they can early the rewards and promotions.

Page 302 shown in FIG. 41 provides an illustrative embodiment of the Browse Rewards feature of the SEP platform. The page show cases a few featured rewards 30201, popular rewards, and provides a social activity feed 30203 that provides a rich context for the gamer to consider redemption of rewards using the SEP points earned by the gamer. Once a gamer is interested in a reward or promotion, gamer can click on that reward link to review the full details of the reward or promotion.

Page 305 as shown in FIG. 44 provides an illustrative embodiment of the Redeem Rewards feature of the SEP platform. Once the gamer clicks on the redeem button in the offer 30201 above, he or she gets a confirmation 30501 and the reward is added to the Saved Rewards wallet of the gamer. The gamer can view the saved rewards any time 30502 or print any redeemed reward. Both the printed reward and online reward 30502 contain RFID bar code 30503. In addition, the gamer is encouraged to press a 'Reward Used at POS' button on the saved Reward 30504. If by mistake a gamer pressed this button on mobile device, the gamer can reset this button. The SEP platform automatically tracks the number redemptions reported by gamers at point of sale and provide a report to the supply chain systems of the Location Based Service providers and brands in their operational reports. In addition, the reward redemption screen propagates this reward redemption business into the social networks of the gamer and updates the social activity feed 3050 that every gamer sees who has social affinity to this business event.

Figure 42:

Page 303 shown in FIG. 42 provides an illustrative embodiment of the Browse Games feature of the SEP platform. The page show cases a few featured games 30301, popular games, and provides a social activity feed to prod a gamer to review the game further. Once a gamer is interested in a game, gamer can click on that game details link to review the full details as described in Page 306 below for further action such as the actual download of a new game.

Figure 45:
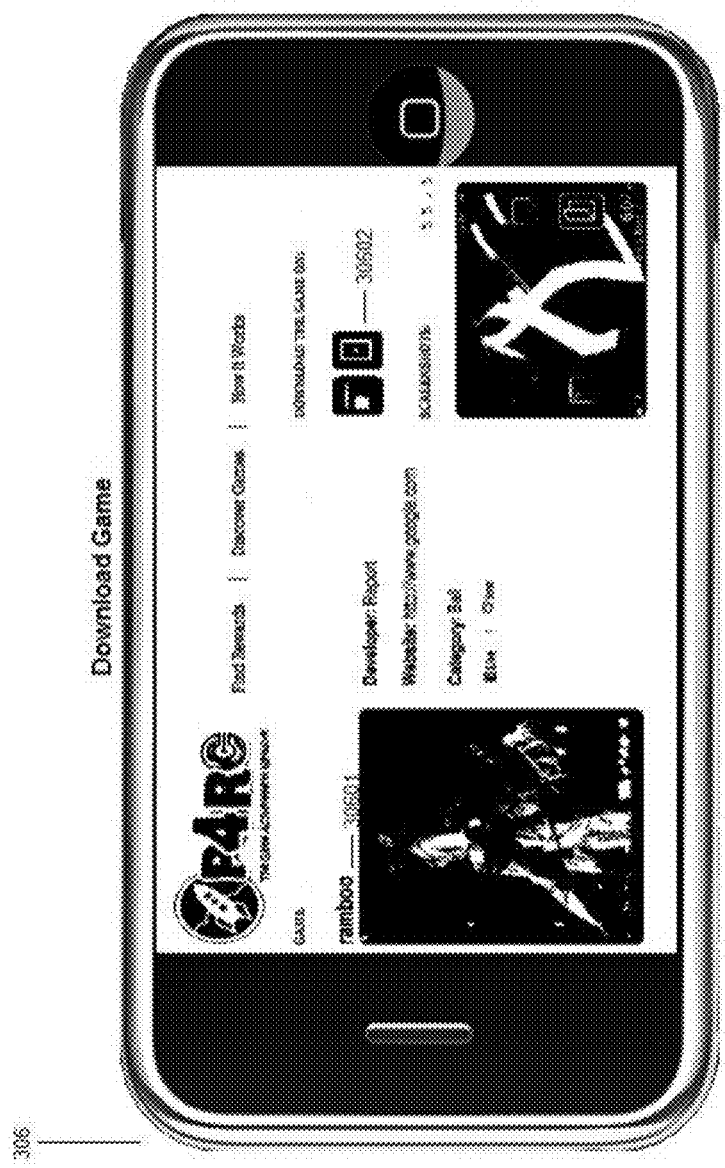

Page 306 as shown in FIG. 45 provides an illustrative embodiment of the Download Game feature of the SEP platform. Once the gamer clicks on game icon, the detailed game description page 30601 appears. This game details page includes the guidance for the gamers to click on the game download links 30602. The SEP platform tracks the number referrals made that led to the clicks on the game download icons and bills the game developer on Pay Per Clicks (PPC) basis. When a gamer downloads a new game, the social activity feeds of all the friends of the gamer will be notified of the game download.

Page 304 shown in FIG. 43 provides an illustrative embodiment of the Browse My Social Game Challenges feature of the SEP platform. The page lists all the SCGs the gamer is either participating in or kibitzing 30403, the total SEP points pool of each SGC 30402, and a link that allows the gamer to track individual SGC.

Page 307 as shown in FIG. 46 provides an illustrative embodiment of the Track Social Game Challenge feature of SEP platform. A Gamer can come to this page by either clicking on the SCG detail link on Page 304 described above or entering the UserID 30701. When a gamer enters this page by entering User ID, a list of participating social game challenges are listed in selection list 30702. Once a gamer selects a challenge, SEP platform will fill in Challenge ID 30703, Start Date 30704, End Date 30705, User Bet 30706, Friends Bet 30707, Total SEP points Pool 30708, and Time Left in the challenge 30709. This page also shows the SGC Leaderboard 30710 and a sponsored reward link 30711 for that SGC.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for social enablement of mobile casual games enabling mobile users to connect within and outside games with other mobile users, brands, game developers, and others online, on mobile devices, and in social networks using a social enablement platform (SEP) recorded on computer-readable medium and capable of execution by a computer executable by a computer and rendered on the display of the computer comprising the steps of:
   providing SEP for brands, location based services providers (LBS), game developers, and gamers;
   using a social engagement platform software development kit (SEP SDK) consisting of computer software code embedded into a software code of the game,
      connecting existing and future games of game developer to the SEP using SEP SDK;
      registering with SEP;
      exchanging game points into SEP points using a points conversion engine in SEP (PCE);
      allowing a gamer to exchange SEP points accrued into the purchase of games sponsored by the game developer;
      exchanging SEP points accrued into redemption of rewards and promotions by brands that have high affinity to the gamer's profile as determined by an offer recommendation engine in SEP (ORE);
      exchanging SEP points accrued into redemption of rewards and promotions by LBS that have high affinity to the gamer's profile as determined by ORE;
      staking SEP points to participate in a challenge and gain additional SEP points from the challenge if the gamer wins that challenge;
      staking SEP points into a challenge; and
      starting a challenge by inviting friends in SEP and other social networks to stake their SEP points on the challenge, where in, the winner of the challenge gains all the SEP points staked by the participants of the challenge; and
      distributing rewards, coupons, and previews from a web site or a software application.

2. The method of claim 1 wherein the SEP is used to design and execute marketing and advertising campaigns to promote the loyalty of the gamers to its games comprising the steps of:
   creating a pull based alternate monetization approach for engaging a game player socially during a transition period between levels of game play;
   earning SEP points by promoting SEP within his/her social networks to increase membership of SEP;
   earning SEP points by promoting the game within his/her social networks including SEP to increase the game purchases;
   earning SEP points by promoting the games sponsored by game developer within his/her social networks including SEP to increase game purchases;
   earning SEP points by being an active and long standing player of the game; and
   earning SEP points by being an active and long standing participant of rewards and promotions sponsored by game developer in SEP.

3. The method of claim 2 further comprising the steps of:
   using SEP to connect its games with brands;
   developing joint marketing and advertising campaigns to expose brand rewards and promotions to the gamers within the game; and
   exchanging SEP points accrued into redemption of rewards and promotions by brands that are sponsored by the game developer.

4. The method of claim 3 further comprising the steps of:
   using SEP to connect games with LBS;
   developing joint marketing and advertising campaigns;
   using SEP to expose LBS rewards and promotions to the gamers within the game; and
   exchanging SEP points accrued into redemption of rewards and promotions by LBS merchants that are sponsored by the game developer.

5. The method of claim 4 further comprising the steps of:
   allowing a brand using SEP to connect with game developers and LBS;
   developing joint marketing and advertising campaigns to expose brand rewards and promotions to the gamers within the game; and
   exchanging SEP points accrued into redemption of rewards and promotions by brands.

6. The method of claim 5 further comprising the steps of:
   allowing a LBS using SEP to connect with game developers and brands;
   developing joint marketing and advertising campaigns to expose LBS rewards and promotions to the gamers within the game; and
   exchanging SEP points accrued into redemption of rewards and promotions by LBS.

7. The method of claim 6 further comprising the steps of:
   registering a brand using SEP to its rewards and offers with SEP;
   registering a brand using SEP; and
   exchanging SEP points accrued into redemption of rewards and promotions by the brand.

8. The method of claim 7 further comprising the steps of:
   registering a LBS using SEP with its rewards and offers with SEP;
   allowing a LBS using SEP to design and execute marketing and advertising campaigns targeted at the gamers of all the games connected to SEP; and
   exchanging SEP points accrued into redemption of rewards and promotions by the LBS.

9. The method of claim 8 further comprising the step of setting up campaigns for offers in SEP based on gamer demographics.

10. The method of claim 8 further comprising the steps of setting up campaigns for offers in SEP based on the profile and interactions of a gamer on mobile devices.

11. The method of claim 8 further comprising the steps of setting up campaigns for offers in SEP based on the profile and interactions of a gamer in SEP and other social networks.

12. The method of claim 8 further comprising the step of setting up campaigns for offers in SEP based on the location of a gamer.

13. The method of claim 8 further comprising the step of allowing a gamer to transfer transferring game points into SEP Accounts online, on mobile devices, or in social networks.

14. The method of claim 8 further comprising the step of redeeming offers in SEP using the SEP points online, on mobile devices, or in social networks.

15. The method of claim 8 further comprising the step of providing Rewards, Credits, Social Networking, and Analytics.

16. The method of claim 8 further comprising the step of providing Premium Rewards and Promotions to gamers online, on mobile devices, and in social networks when gamers purchase credits towards such premium offers in SEP.

17. The method of claim 8 further comprising the step of delivering Premium Rewards and Promotions to the gamers and offer/rewards fulfillment partners.

18. The method of claim 8 further comprising the step of allowing donations of SEP points for Non-Profit Causes for exchange to redeem the rewards and promotions within SEP.

19. The method of claim 8 further comprising the steps of:
determining a points conversion method for points Based Games in SEP;
determining a points conversion method for non-points Based Games in SEP;
estimating initial points using a points conversion engine (PCE) in SEP; and
determining the acceleration of points by the PCE in SEP.

20. The method of claim 8 further comprising the steps of:
providing a circuit breaker for excessive points conversion by the PCE in the SEP;
providing an Estimation of initial offers by offer recommendation engine (ORE) in the SEP;
determining the acceleration of offers in the SEP using the ORE; and
providing a circuit breaker for excessive offer redemption in the SEP.

* * * * *